(12) United States Patent
Ohta et al.

(10) Patent No.: US 7,697,088 B2
(45) Date of Patent: Apr. 13, 2010

(54) OPTICAL ELEMENT PACKAGE, BACKLIGHT, AND LIQUID CRYSTAL DISPLAY DEVICE

(75) Inventors: Eiji Ohta, Miyagi (JP); Toru Abiko, Miyagi (JP); Yasuyuki Kudo, Miyagi (JP); Hirokazu Odagiri, Miyagi (JP); Satoshi Sato, Miyagi (JP); Andrew Chakchung Yu, Miyagi (JP); Masayasu Kakinuma, Miyagi (JP); Fumiko Sasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 12/027,722

(22) Filed: Feb. 7, 2008

(65) Prior Publication Data

US 2009/0059119 A1    Mar. 5, 2009

(30) Foreign Application Priority Data

Sep. 2, 2007  (JP) .............................. 2007-031365
Dec. 28, 2007  (JP) .............................. 2007-341463

(51) Int. Cl.
    *G02B 5/00* (2006.01)
    *G02B 6/36* (2006.01)
(52) U.S. Cl. ............................. 349/62; 349/58; 349/96; 349/113; 349/114; 349/115; 349/116; 349/117; 349/118; 349/119; 359/894

(58) Field of Classification Search ..................... 428/1; 349/58, 62, 96, 113, 114, 115, 116, 117, 349/118, 119, 120, 121; 359/511, 894, 619, 359/628; 362/362, 311, 627
See application file for complete search history.

(56) References Cited

U.S. PATENT DOCUMENTS 7,085,061 B2    8/2006  Watanabe
2009/0079896 A1*    3/2009  Hayashi et al. ................ 349/58

FOREIGN PATENT DOCUMENTS

| JP | 08-248209 | 9/1996 |
| JP | 2001-272509 | 10/2001 |
| JP | 2005-212900 | 8/2005 |
| JP | 2005-301147 | 10/2005 |
| JP | 2006-328266 | 7/2006 |
| JP | 2007-017995 | 1/2007 |

* cited by examiner

*Primary Examiner*—D. Lawrence Tarazano
*Assistant Examiner*—Camie S Thompson
(74) *Attorney, Agent, or Firm*—K&L Gates LLP

(57) ABSTRACT

An optical element covering member capable of improving insufficiency in rigidity of the optical element while an increase in thickness of a liquid crystal display device or deterioration of display characteristics of the liquid crystal display device is reduced, a backlight provided with the optical element covering member, and a liquid crystal display device are provided. The optical element covering member includes at least one optical element, a support medium for supporting the at least one optical element, and a covering member for covering the at least one optical element and the support medium. The at least one optical element and the support medium constitute a stack.

19 Claims, 45 Drawing Sheets

US 7,697,088 B2

OPTICAL ELEMENT PACKAGE, BACKLIGHT, AND LIQUID CRYSTAL DISPLAY DEVICE

CROSS REFERENCES TO RELATED APPLICATIONS

The present application claims priority to Japanese Patent Application No. 2007-031365 filed on Feb. 9, 2007 and Japanese Patent Application No. 2007-34 1463 filed on Dec. 28, 2007, the entire contents of which being incorporated herein by reference.

BACKGROUND OF THE INVENTION

1. Field of the Invention

The present invention relates to an optical element covering member, a backlight provided with the optical element covering member, and a liquid crystal display device. In particular, the present invention relates to an optical element covering member for improving display characteristics of a liquid crystal display device.

2. Description of the Related Art

In liquid crystal display devices, many optical elements have been used previously for the purpose of improving the viewing angle, the luminance, and the like. As for these optical element, elements in the shape of a film or a sheet, e.g., diffusion films and prism sheets, have been used.

FIG. 1 shows the configuration of a liquid crystal display device according to a related art. As shown in FIG. 1, this liquid crystal display device is provided with an illumination device 101 for emitting light, a diffusion plate 102 for diffusing the light emitted from the illumination device 101, and a plurality of optical elements 103, for example, for collecting or diffusing the light diffused by the diffusion plate 102, and a liquid crystal panel 104.

There are tendencies of the self weight and the size of an optical element to increase with upsizing of an image display device in recent years. If the self weight and the size of the optical element increase, the rigidity of the optical element becomes insufficient and, thereby, deformation, e.g., wrinkling, bending, or warping, of the optical element occurs. Such deformation of the optical element exerts an influence on the optical directivity toward a display surface so as to cause a serious luminance irregularity problem.

Consequently, it has been proposed that the insufficiency in rigidity of the optical element is improved by increasing the thickness of the optical element. However, the liquid crystal display device becomes thick and, thereby, advantages of the liquid crystal display device in being low-profile and light-weight are impaired. Then, it has been proposed that the insufficiency in rigidity of the optical element in the shape of a sheet or a form is improved by bonding optical elements to each other with a transparent adhesive (refer to Patent Document 1: Japanese Unexamined Patent Application Publication No. 2005-301147, for example).

Furthermore, since the application range of display devices has been extended in recent years, further thickness reduction and weight reduction have been proposed for the purpose of wall-mounting or installation in the vicinity of a ceiling. Regarding this thickness reduction and weight reduction, a diffusion function for equalizing irregularity in light source, e.g., fluorescent tubes, does not accompany. Therefore, technologies for reducing irregularity in light source by increasing the thickness of the diffusion plate, using a plurality of diffusion sheets, i.e. increasing the number of sheets than ever, increasing the number of light sources, and the like have been studied.

SUMMARY OF THE INVENTION

However, regarding the technology described in Patent Document 1, since optical elements are bonded to each other with the transparent adhesive, the thickness of the optical element increases, and the thickness of the liquid crystal display device itself increases. Moreover, regarding exertion of the optical function indispensable for the liquid crystal display device, since the adhesive is used, the space between surface structured members, i.e. between a light collecting functional layer, a diffusion functional layer, or the like and an adjacent optical functional layer, is filled. As a result, the optical function is impaired, and the display characteristics deteriorate.

If many diffusion function members are used in order to reduce irregularity in light source, the cost may become high as the number of the member increases, or the luminance may be reduced as a large number of diffusion function members increase. In the case where many light source members are used, an effect is exerted on irregularity in light source, but the cost increases and the power consumption increases with an increase in the number of members.

Accordingly, it is an object of the present invention to provide an optical element covering member capable of improving insufficiency in rigidity of the optical element while an increase in thickness of a liquid crystal display device or deterioration of display characteristics of the liquid crystal display device is reduced, a backlight provided with the optical element covering member, and a liquid crystal display device.

It is another object of the present invention to provide an optical element covering member capable of reducing the thickness and weight of a display device while an increase in weight and cost due to an increase in component members based on an increase in optical elements for diffusion and an increase in light sources are reduced, a backlight provided with the optical element covering member, and a liquid crystal display device.

In order to solve the above-described problems, a first invention of the present invention is an optical element covering member characterized by including at least one optical element, a support medium for supporting the at least one optical element, and a covering member for covering the at least one optical element and the support medium, wherein the at least one optical element and the support medium constitute a stack, and the covering member has an opening portion.

A second invention of the present invention is an optical element covering member characterized by including a support medium and a covering member for covering the support medium, wherein the covering member includes a first region through which the light incident into the support medium passes, and a second region through which the light transmitted from the support medium passes, at least one of the first region and the second region is provided with an optical function, and the covering member has an opening portion.

A third invention of the present invention is a backlight characterized by including
a light source for emitting light and
an optical element covering member for improving the characteristics of the light emitted from the light source and transmitting the light toward a liquid crystal panel,
wherein the optical element covering member includes
at least one optical element,
a support medium for supporting the at least one optical element, and
a covering member for covering the at least one optical element and the support medium,
the at least one optical element and the support medium constitute a stack, and
the covering member has an opening portion.

A fourth invention of the present invention is a backlight characterized by including
a light source for emitting light and
an optical element covering member for improving the characteristics of the light emitted from the light source and transmitting the light toward a liquid crystal panel,
wherein the optical element covering member includes
a support medium and
a covering member for covering the support medium,
the covering member includes
a first region through which the light incident into the support medium passes and
a second region through which the light transmitted from the support medium passes,
at least one of the first region and the second region is provided with an optical function, and
the covering member has an opening portion.

A fifth invention of the present invention is a liquid crystal display device characterized by including
a light source for emitting light,
an optical element covering member for improving the characteristics of the light emitted from the light source and transmitting the light toward a liquid crystal panel, and
a liquid crystal panel for displaying an image on the basis of the light having the characteristics improved by the optical element covering member,
wherein the optical element covering member includes
at least one optical element,
a support medium for supporting the at least one optical element, and
a covering member for covering the at least one optical element and the support medium,
the at least one optical element and the support medium constitute a stack, and
the covering member has an opening portion.

A sixth invention of the present invention is a liquid crystal display device characterized by including
a light source for emitting light,
an optical element covering member for improving the characteristics of the light emitted from the light source, and
a liquid crystal panel for displaying an image on the basis of the light having the characteristics improved by the optical element covering member,
wherein the optical element covering member includes
a support medium and
a covering member for covering the support medium,
the covering member includes
a first region through which the light incident into the support medium passes and
a second region through which the light transmitted from the support medium passes,
at least one of the first region and the second region is provided with an optical function, and
the covering member has an opening portion.

In the present invention, since at least one optical element and a support medium are covered with a covering member, the at least one optical element and the support medium can be integrated. Alternatively, the support medium can be covered and integrated with the optical element covering member provided with the optical function on one of or both surfaces of the covering member. Therefore, insufficiency in rigidity of the optical element can be made up with the support medium. Furthermore, the optical element can be simplified by providing the optical function on the surface of the covering member. Moreover, the covering member itself is allowed to have a tension and, thereby, the covering member can be disposed without bending, so that bending of the optical element disposed on the covering member can be prevented.

As described above, according to the present invention, deformation of the optical element and insufficiency in rigidity of the optical element can be improved while an increase in thickness of the liquid crystal display device or deterioration of display characteristics of the liquid crystal display device is reduced. Furthermore, the thickness can be reduced as compared with the thickness of an optical film according to a related art by making up the optical function with the covering member, and a configuration with no bending can be provided.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

The embodiments according to the present invention will be described below with reference to the drawings. In all

(1) First Embodiment

(1-1) Configuration of Liquid Crystal Display Device

Figure 1:
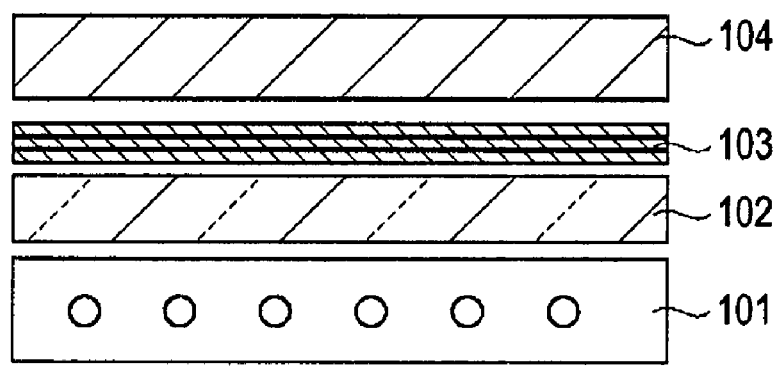
FIG. 1 is a schematic diagram showing the configuration of a liquid crystal display device according to a related art.
Figure 2:
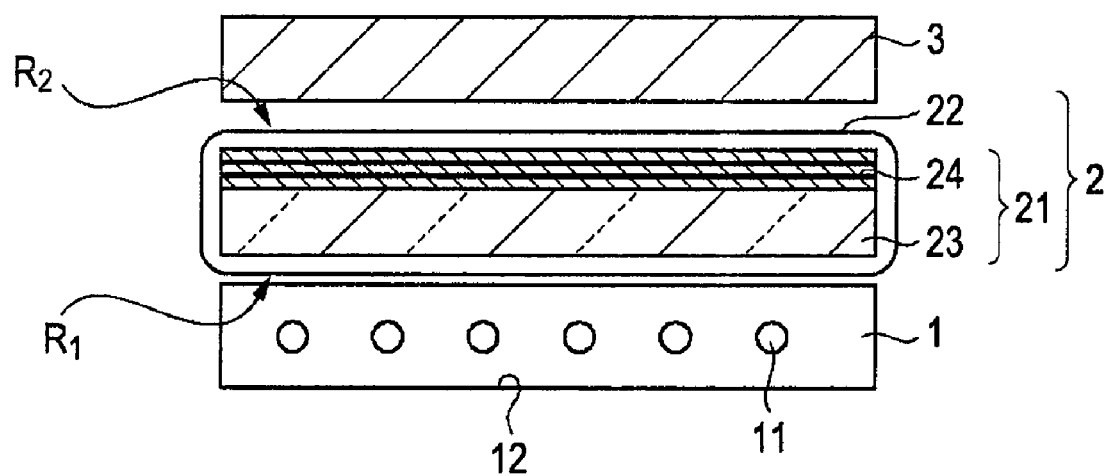
FIG. 2 is a schematic diagram showing a configuration example of a liquid crystal display device according to a first embodiment of the present invention.

FIG. 2 shows a configuration example of a liquid crystal display device according to the first embodiment of the present invention. As shown in FIG. 2, this liquid crystal display device includes an illumination device 1 for emitting light, an optical element covering member 2 for improving the characteristics of the light emitted from the illumination device 1, and a liquid crystal display device 3 for displaying an image on the basis of the light having the characteristics improved by the optical element covering member 2. The illumination device 1 and the optical element covering member 2 constitute a backlight. Among surfaces of optical members, e.g., the optical element covering member 2, hereafter, the surface into which the light from the illumination device 1 enters is referred to as an incident surface, the surface which transmits the light incident from the incident surface is referred to as a transmission surface, and the surface located between the incident surface and the transmission surface is referred to as an end surface. The incident surface and the transmission surface are appropriately, collectively referred to as principal surfaces.

The illumination device 1 is, for example, a direct-lighting type illumination device and is provided with a light source 11 for emitting light and a reflection plate 12 for reflecting the light emitted from the light source 11 to direct the light in the direction of the liquid crystal panel 3. As for the light source 11, for example, a cold cathode fluorescent lamp (CCFL), a hot cathode fluorescent lamp (HCFL), organic electroluminescence (OEL) or light emitting diode (LED), and inorganic electroluminescence (IEL) can be used. For example, the reflection plate 12 is disposed in such a way as to cover the bottom and the side of at least one light source 11, and reflects the light emitted from the at least one light source 11 downward, toward the sides, and the like to direct the light in the direction of the liquid crystal panel 3.

For example, the optical element covering member 2 is provided with at least one optical element 24 for changing the characteristics of the light emitted from the illumination device 1 by subjecting the light to a treatment, e.g., diffusion or light collection, a support medium 23 for supporting the at least one optical element 24, and a covering member 22 for covering and integrating the at least one optical element 24 and the support medium 23. Hereafter, the structure in which the support medium 23 and the at least one optical element are stacked is referred to as an optical element stack 21. The covering member 22 includes a first region $R_1$, through which the light incident into the optical element stack 21 passes, and a second region $R_2$, through which the light transmitted from the optical element stack 21 passes.

The number and the type of the optical elements 24 are not specifically limited and can be appropriately selected in accordance with the characteristics of a desired liquid crystal display device. As for the optical element 24, for example, an element having an optical function and at least serving as a support medium or an element including a support medium and an element having at least one optical function can be used. As for the optical element 24, for example, a light diffusion element, a light collection element, a reflective polarizer, a polarizer, or a light splitting element can be used. For example, a film-shaped element, a sheet-shaped element, or a tabular element can be used as the optical element. The thickness of the optical element 24 is, for example, 5 to 1,000 μm.

For example, the support medium 23 is a transparent plate for transmitting the light emitted from the illumination device 1 or an optical plate for changing the characteristics of the light emitted from the illumination device 1 by subjecting the light to a treatment, e.g., diffusion or light collection. For example, a diffusion plate, a phase difference plate, or a prism plate can be used as the optical plate. Preferably, the thickness of the support medium 23 is 500 to 100,000 μm, and more preferably 1,000 to 50,000 μm. Preferably, the thickness, the cross-section width, the length, and the rigidity (modulus of elasticity) of the support medium 23 are appropriately selected in consideration of the tension of the covering member 22.

Regarding the check of the presence or absence of tension and the measurement of tension, ascertainment can be conducted by, for example, the following means.

The tension of the covering member is measured by using TMA (heat-stress-strain measuring apparatus EXSTAR6000 TMA/SS) produced by Seiko Instruments Inc., as described below.

In the state in which a tension is applied to a covering member, a test piece of 5 mm×50 mm is cut from the center portion of an optical element covering member with a rectangle die. At this time, the test piece is cut in such a way that the long side and the short side of the test piece become parallel to the long side and the short side, respectively, of a diffusion plate serving as a support medium. The test piece is sandwiched by glass plates so as to remove the slack and, thereafter, the length is measured with a tool makers' microscope produced by TOPCON CORPORATION. The cut test piece is in the state in which the stress is released and, therefore, is in the state of being shrunk from 50 mm. The dimension is converted in such a way that the state of being shrunk is returned to the initial state of 50 mm. A test piece for TMA is cut again and is set. The tension at an initial temperature of 25° C. is measured. Any tension measuring apparatus, which can apply a tensile stress to obtain a predetermined length and measure the stress, can be used, so that the presence or absence of tension can be checked.

Specifically, in the case where the backlight is of direct-lighting type, as for the support medium 23, a resin plate having a size of a diagonal of about 2 inches to 100 inches and a thickness of 1 mm to 4 mm and including a diffusion filler or an optical plate for diffusion provided with a shape having a diffusion function or a layer containing a filler on a glass surface can be used. In the case where the backlight is of side-light type, a transparent resin plate having a size of a diagonal of 1 inch to a few tens of inches and a thickness of about 0.5 to 10 mm, a resin plate including a filler, a resin plate provided with a shape on the surface, and a resin plate including a filler and provided with a shape on the surface can be used.

In consideration of the facts that in the case where a liquid crystal display device is preserved in a high temperature environment at 40° C., the temperature in the device increases up to about 60° C. when the liquid crystal display device is lit up (refer to Example 1 described later) and that an actual liquid crystal television and the like is provided with a temperature increase prevention function in order to avoid deterioration of a polarizer at 70° C., it is preferable that the support medium 23 has the rigidity exhibiting small changes up to 70° C. and has the elasticity to some extent. Examples of materials for the support medium 23 having such characteristics can include materials containing polycarbonate (modulus of elasticity 2.1 GPa), polystyrene (modulus of elasticity 2.8 GPa), ZEONOR resin (modulus of elasticity 2.1 GPa) as cycloolefin resin, and acrylic resin (modulus of elasticity 3 GPa), and the like as primary components. It is preferable that a material having a modulus of elasticity (2.1 GPa or more) larger than or equal to the modulus of elasticity of the polycarbonate resin, which has the lowest modulus of elasticity among the above-described materials, is contained as a primary component.

Preferably, the support medium 23 is composed of, for example, a polymer material, and the transmission factor thereof is 30% or more. The order of stacking of the optical element 24 and the support medium 23 is selected in accordance with, for example, the functions provided to the optical element 24 and the support medium 23. For example, in the case where the support medium 23 is a diffusion plate, the support medium 23 is disposed on the incident side of the light from the illumination device 1. In the case where the support medium 23 is a reflective polarizer, the support medium 23 is disposed on the side of transmission of the light toward the liquid crystal panel 3. Furthermore, for example, a form in which an optical functional layer having a light splitting or diffusion function is disposed on the side nearer to the light source than is the transparent plate or the diffusion plate serving as the support medium 23 may be combined, a light diffusion functional layer may be disposed after transmission of the transparent plate or the diffusion plate, or a light collection functional layer may be used in combination. The shapes of the incident surface and the transmission surface of the optical element 24 and the support medium 23 are selected in accordance with the shape of the liquid crystal display device 3, and are, for example, in the shape of rectangles having different aspect ratios.

Preferably, the principal surfaces of the optical element 24 and the support medium 23 are subjected to a roughing treatment or are allowed to contain fine particles. This is because rubbing off and friction can be reduced. If necessary, the optical element 24 and the support medium 23 are allowed to contain additives, e.g., a light stabilizer, an ultraviolet absorber, an antistatic agent, a flame retardant, and an antioxidant, and thereby, an ultraviolet absorption function, an infrared absorption function, an antistatic function, and the like may be provided to the optical element 24 and the support medium 23. Furthermore, diffusion of the reflection light or the reflection light itself may be reduced by subjecting the optical element 24 and the support medium 23 to a surface treatment, e.g., an anti-reflection treatment (AR treatment) or an anti-glare treatment (AG treatment). The surfaces of the optical element 24 and the support medium 23 may be provided with a function of reflecting ultraviolet rays or infrared rays.

The covering member 22 covers the optical element stack 21 almost entirely. The covering member 22 has at least one opening. In the case where, for example, the optical element stack 21 is covered with the covering member 22, the air in the covering member 22 is exhausted to the outside by providing such an opening, so that the optical element stack 21 and the covering member 22 are adhered to each other and, thereby, an occurrence of a defective image can be reduced. Furthermore, in the case where constituent materials of the support medium 23 and the optical element 24 covered with the covering member 22 volatilize, the volatilized components are exhausted to the outside of the optical element covering member 2 by providing such an opening, so that condensation, solidification, or the like of the volatilized components in the covering member 22 is restricted and, thereby, an occurrence of a defective image can be reduced. In the case where a plurality of openings are disposed in the covering member 22, preferably, an opening is disposed in each of end surfaces opposite to each other or in the vicinity thereof. This is because the above-described volatilized components are exhausted efficiently to the outside of the optical element covering member 2, condensation, solidification, or the like of the volatilized components in the covering member 22 is further restricted and, thereby, an occurrence of a defective image can be further reduced.

It is preferable that the opening is disposed at a position corresponding to the outside of the display area of the optical element stack 21, and it is more preferable that the opening is disposed at a position corresponding to the end surface of the optical element stack 21 or in the vicinity thereof. Deterioration in image quality due to the opening can be prevented by disposing the opening at such a position. In the case where the optical element stack 21 has a corner portion, it is preferable that an opening is disposed at the position corresponding to the corner portion of the optical element stack 21 so as to expose the corner portion at this opening. Specifically, in the case where the optical element stack 21 is in the shape of a rectangle as a whole, it is preferable that the covering member 22 is provided with an opening disposed at each of the positions corresponding to four corner portions of the optical element stack 21 so as to expose the corner portions of the optical element stack 21 at the respective openings. Preferably, the size and the shape of the opening are selected in consideration of the air exhaustion performance in the manufacturing process of the optical element covering member 2, the shape of the optical element stack 21, the durability of the covering member 22, and the like. Examples thereof includes a circular shape, an elliptical shape, a semicircular shape, a triangular shape, a quadrangular shape, a rhombic shape, and a slit-like shape, although not limited to these shapes.

The covering member 22 is in the shape of, for example, a single-layer or multilayer film, sheet, or bag, having transparency. The covering member 22 is provided with at least one covering member and is formed by joining the peripheral portion of the covering member. Preferably, the position of the junction of the covering member is located in the outside of the display area of the optical element stack 21, and more preferably is located at the end surface of the optical element stack 21.

The thickness of the covering member 22 is selected from, for example, 5 to 5,000 µm. The thickness of the covering member 22 on the incident surface side and the thickness on the transmission surface side may be different from each other. In this case, it is preferable that the thickness on the incident surface side is larger than the thickness on the transmission surface side. This is because changes in shapes of the support medium 23 and the optical element 24 due to the heat generated from the light source 11 can be reduced by increasing the thickness on the incident surface side.

However, the thickness on the transmission surface side may be made larger than the thickness of the incident surface side depending on the purposes. Preferably, the covering member 22 covers 50% or more of the principal surface of the optical element stack 21 in terms of an area ratio. Preferably, the screen display region is covered, or one of or both the screen display region principal surfaces are opened. The covering member 22 may include a surface structured member serving as a support medium. The covering member 22 has, for example, uniaxial anisotropy or biaxial anisotropy. For example, in the case where the covering member 22 is in the shape of a rectangle, the uniaxial anisotropy with a positive or negative refractive index characteristic in a longitudinal direction of the covering member 22 is provided or the biaxial anisotropy with a positive or negative refractive index in a longitudinal direction of the covering member 22 is provided.

In the case where the covering member 22 has the anisotropy, it is preferable that the anisotropy is a low level. Specifically, it is preferable that the retardation thereof is 50 nm or less. Alternatively, in the case where the optical axis of the optical anisotropy is synchronized with a longitudinal or short axis of an included member, the retardation is not limited to 50 nm or less insofar as, for example, the color characteristics due to the viewing angle fit the purpose of uses satisfactorily. Furthermore, it is possible to use without limiting the anisotropy of the covering member 22 by providing a diffusion function on the transmission side of the covering member 22, allowing the covering member 22 to be provided with a function of effecting diffusion after passing through the principal surface of the first region $R_1$, or providing optical functions of effecting diffusion and the like on the transmission side of the optical element covering member 2.

It is preferable that a uniaxially drawn, sequentially biaxially drawn, or simultaneously biaxially drawn sheet or film is used as the covering member 22. In the case where such a sheet or film is used, since the covering member 22 is allowed to shrink in a drawing direction by application of heat, the adhesion between the covering member 22 and the optical element stack 21 can be enhanced. Moreover, an extendable film or sheet is used as the covering member 22 and is extended primarily in a desired direction of covering through extension and shrinkage, the inclusion is sandwiched by the extendable films or sheets, the surrounding of the inclusion is joined by adhesion or fusion, and thereafter, the tension of the extendable films or sheets is relieved, so that the adhesion to the included support medium or/and the optical element can be enhanced.

Preferably, a heat shrinkable polymer material is used as the material for the covering member 22. More preferably, a polymer material which shrinks by application of heat from ambient temperature to 85° C. can be used. Examples of heat shrinkable polymer materials include polyolefin resins, e.g., polyethylene (PE) and polypropylene (PP); polyester resins, e.g., polyethylene terephthalate (PET) and polyethylene naphthalate (PEN); vinyl bond systems, e.g., polystyrene (PS) and polyvinyl alcohol (PVA); polycarbonate (PC) resins; cycloolefin resins; urethane resins; vinyl chloride resins; natural rubber resins; and artificial rubber resins. They can be used alone or in combination.

The heat shrinkage of the covering member 22 is preferably 0.2% or more, more preferably 5% or more, further preferably 10% or more, and most preferably 20% or more. This is because the adhesion between the covering member 22 and the optical element stack 21 can be enhanced by employing the values within this range. Preferably, the heat distortion temperature of the covering member 22 is 80° C. or higher, and desirably 90° C. or higher. This is because deterioration of the optical characteristics of the optical element covering member 2 due to the heat generated from the light source 11 can be reduced. Preferably, the drying loss of the covering member 22 is 2% or less. The refractive index of the material for the covering member 22 (refractive index of the covering member 22) is preferably 1.6 or less, and more preferably 1.55 or less for the purpose of reducing the interface reflection loss to increase the light transmittance and is 1.45 or more, and desirably 1.5 or more in the case where optical function factors, e.g., a light collection effect, a light splitting effect, and the like, are added.

It is preferable that the covering member 22 contains at least one type of filler for the purpose of the scratch resistance of the surface, prevention of adhesion to a display panel of the liquid crystal panel, prevention of sticking on the included optical element and the support medium, or prevention of scratching by a pin (stud) for regulating the gap between the direct-lighting type light source and the optical element because of vibration during transportation and the like.

Furthermore, for the purpose of providing a function of diffusion as an optical function to the covering member 22, a filler may be included in the entire covering member 22; one surface layer; both surface layers; or a surface layer and one surface, and/or any one of both surfaces. The included particles may present in the vicinity of the surface layer.

In addition to the above-described inclusion of the filler into the covering member 22, a method in which a mixture of a resin and particles is molded into the surface layer of the covering member 22 or a filler is contained by applying a paint composed of a resin, particles, and a solvent to the surface layer of the covering member 22 and drying the solvent, a method in which film formation and molding are conducted by using an energy curable system (UV curing, visible light curing, electron beam curing, or the like) containing a filler, or a method in which the filler-containing layer prepared as described above is allowed to transfer, and the like are mentioned.

For example, at least one type of organic fillers and inorganic fillers can be used as the filler. For example, at least one type selected from the group consisting of acrylic resins, styrene resins, fluorine, and cavities can be used as the material for the organic filler. For example, at least one type selected from the group consisting of silica, alumina, talc, titanium oxide, and barium sulfate can be used as the inorganic filler. These organic and inorganic fillers can be used alone or both types can be used. Regarding the shape of the filler, various shapes, e.g., a needle-like shape, a spherical shape, an elliptical shape, a tabular shape, and a scale-like shape, can be employed. For example, at least one type of diameter is selected as the diameter of the filler.

For the same purpose as that of inclusion of the filler into the covering member 22 described above, a shape may be provided to the covering member 22. For example, it is also possible to provide a shape to one surface and/or both surfaces of the thermoplastic resin covering member 22 by an operation of thermal stacking, embossing, or the like. A heat shrinkable film may be obtained by conducting drawing and heat-fixing after the shape is provided. Alternatively, a heat shrinkable film may be provided with a shape by the operation of thermal stacking, embossing, or the like so as to obtain a film.

Since the shape can be provided by the above-described methods, e.g., thermoforming and mechanical embossing, film inclusion type molding, energy curable resins, or the like, it is possible to provide a light control means, e.g., light collection, diffusion, or light splitting, on one of and/or both principal surfaces on the light incident side and the light transmission side.

For example, an effect of increasing luminance can be obtained by providing a lens shape on the light transmission side of the covering member 22. Likewise, an effect of reducing irregularity in light source can be obtained by providing a diffusion function shape and an effect of light collection function can be obtained by a microlens shape. Furthermore, an effect of reducing irregularity in light source can also be obtained by providing a lens shape or a diffusion function to the covering member 22 on the light source side.

In the case where the optical function is provided on the covering member 22, at least one of the principal surface on the light incident side and the principal surface of the light transmission side can be provided with the optical function depending on the purpose of the optical function. The optical function of each principal surface may be different from each other and, therefore, different functions may be provided. For example, transparency, light collection, light diffusion, light splitting, and the like may be combined or be employed alone. The same functions as the included optical functions may be used for them, and selection is conducted depending on the purpose of use.

If necessary, the covering member 22 is allowed to further contain additives, e.g., a light stabilizer, an ultraviolet absorber, an antistatic agent, a flame retardant, and an antioxidant, and thereby, an ultraviolet absorption function, an infrared absorption function, an antistatic function, and the like may be provided to the covering member 22. Furthermore, diffusion of the reflection light or the reflection light itself may be reduced by subjecting the covering member 22 to, for example, a surface treatment, e.g., an anti-glare treatment (AG treatment) or an anti-reflection treatment (AR treatment). Moreover, a function of transmitting the light in a specific wavelength region, e.g., UV-A light (about 315 to 400 nm), may be provided.

An uneven surface structured member serving as an optical function may be formed on the surface of the covering member 22. Furthermore, the surface structured member may include waviness for preventing sticking and for the scratch resistance. The waviness in a ridge direction is added to, for example, parallel arranged lenses serving as a light collection function and, thereby, contact between top portions of the lenses is reduced. In addition to one surface, the optical function or the surface structured member for preventing sticking and for the scratch resistance may also be provided on a back surface.

The liquid crystal panel 3 controls the light supplied from the light source 11 so as to display the information. As for the operational mode of the liquid crystal panel 3, for example, a twisted nematic (TN) mode, a vertically aligned (VA) mode, an in-plane switching (IPS) mode, or an optically compensated birefringence (OCB) mode is employed.

(1-2) Configuration of Optical Element Covering Member (1-2-1) First Configuration Example The first configuration example of an optical element covering member 2 according to the first embodiment of the present invention will be described below in detail with reference to FIGS. 3 to 6.

Figure 3:
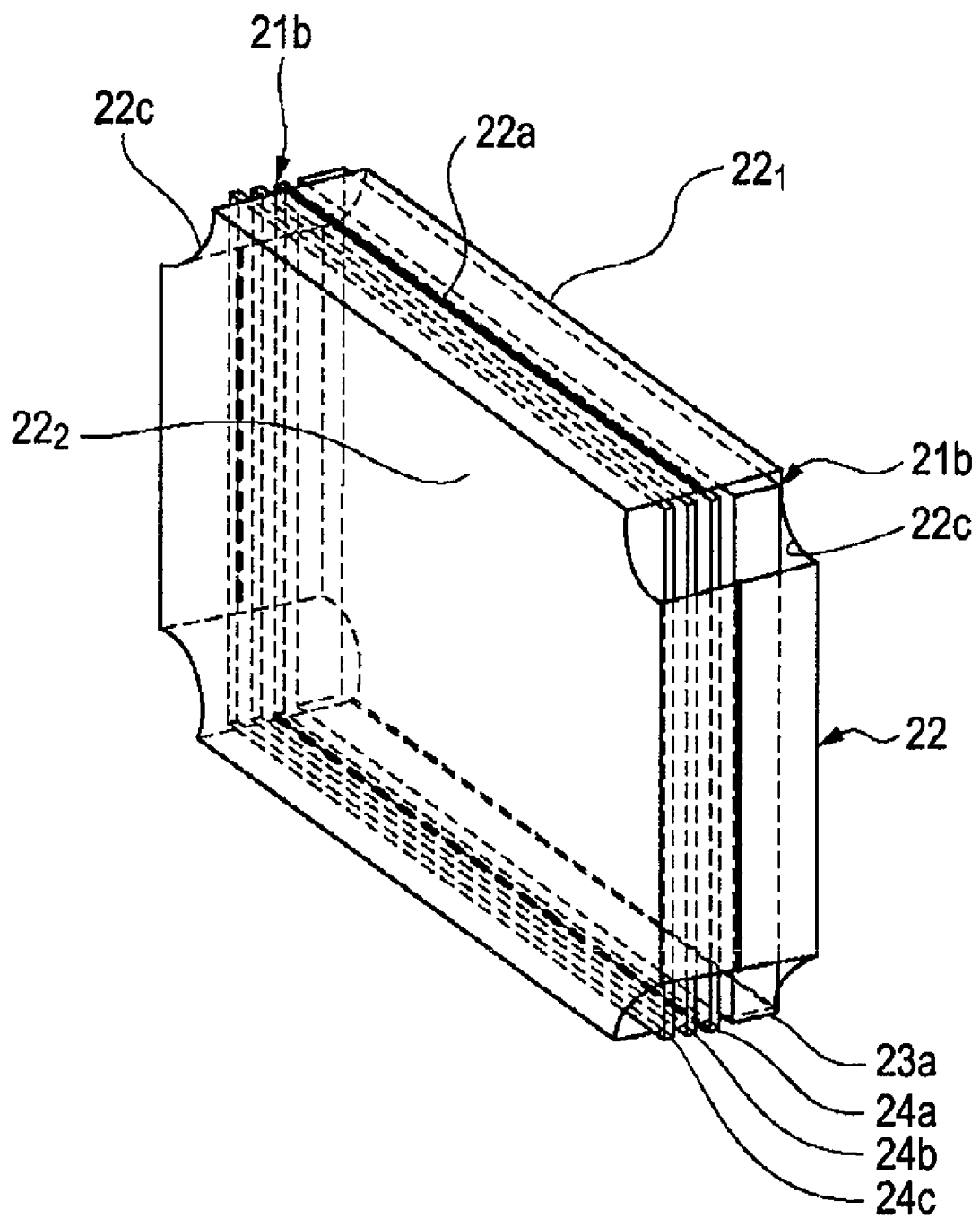
FIG. 3 is a perspective view showing a first configuration example of an optical element covering member according to the first embodiment of the present invention.
Figure 4A:
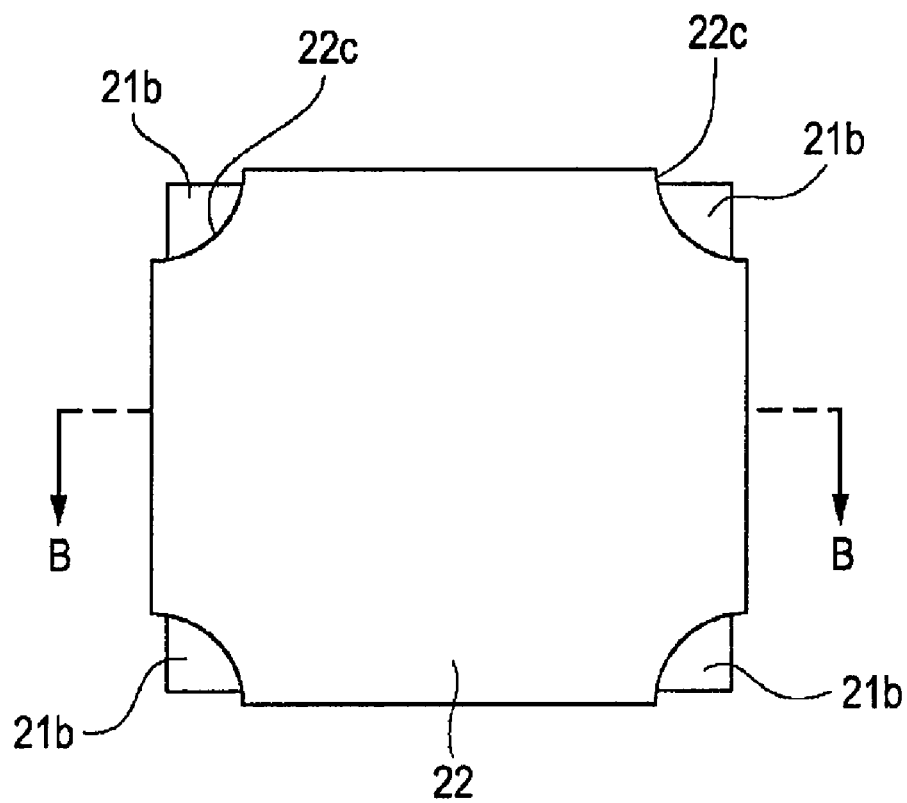
FIG. 4A and FIG. 4B are a plan view and a sectional view showing the first configuration example of the optical element covering member according to the first embodiment of the present invention.
Figure 4B:
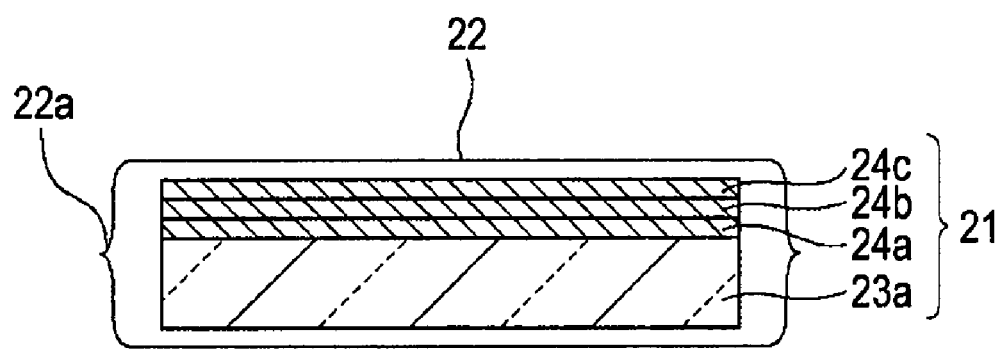

FIG. 3, FIG. 4A, and FIG. 4B show the first configuration example of the optical element covering member according to the first embodiment of the present invention. As shown in FIG. 3, FIG. 4A, and FIG. 4B, this optical element covering member 2 includes, for example, a diffusion plate 23a serving as a support medium, a diffusion film 24a serving as an optical element, a lens film 24b, a reflective polarizer 24c, and a covering member 22 for covering and integrating them. Here, the diffusion plate 23a, the diffusion film 24a, the lens film 24b, and the reflective polarizer 24c constituent an optical element stack 21. The diffusion film 24a, the lens film 24b, and the reflective polarizer 24c are disposed on the transmission surface side of the diffusion plate 23a. Specifically, the diffusion film 24a, the lens film 24b, and the reflective polarizer 24c are disposed in that order from the transmission surface side of the diffusion plate 23a toward the incident surface side of the covering member 22.

As shown in FIG. 3, the covering member 22 includes a first covering member $22_1$ covering the incident surface of the optical element stack 21 and a second covering member $22_2$ covering the transmission surface. The first covering member $22_1$ and the second covering member $22_2$ are joined on, for example, an end surface of the optical element stack 21. The shapes of the first covering member $22_1$ and the second covering member $22_2$ are selected appropriately in accordance with the shape of the optical element stack 21 to be covered.

The covering member 22 covers the optical element stack 21 almost entirely. The covering member 22 has an opening at each of the positions corresponding to corner portions of the rectangular optical element stack 21, and the corner portions of the optical element stack 21 are exposed at the respective openings.

The diffusion plate 23a is disposed above at least one light source 11 and diffuses the light emitted from the at least one light source 11 and the light reflected by the reflection plate 12 so as to make the luminance uniform. As for the diffusion plate 23a, for example, a plate provided with an uneven surface structured member for diffusing light on a surface, a plate containing fine particles or the like having a refractive index different from that of the primary constituent material of the diffusion plate 23a, a plate containing porous fine particles, or a plate prepared by combining at least two types of the above-described uneven surface structured member, fine particles, and porous fine particles can be used. For example, at least one type of organic fillers and inorganic fillers can be used as the fine particles. The above-described uneven surface structured member, fine particles, and porous fine particles are disposed on, for example, a transmission surface of the diffusion film 24a. The light transmittance of the diffusion plate 23a is, for example, 30% or more.

The diffusion film 24a is disposed on the diffusion plate 23a and, for example, diffuses the light diffused by the diffusion plate. As for the diffusion film 24a, for example, a film provided with an uneven surface structured member for diffusing light on a surface, a film containing fine particles or the like having a refractive index different from that of the primary constituent material of the diffusion film 24a, a film containing porous fine particles, or a film prepared by combining at least two types of the above-described uneven surface structured member, fine particles, and porous fine particles can be used. For example, at least one type of organic fillers and inorganic fillers can be used as the fine particles. The above-described uneven surface structured member, fine particles, and porous fine particles are disposed on, for example, a transmission surface of the diffusion film 24a.

The lens film 24b is disposed above the diffusion film 24a and improves the directivity and the like of the illumination light. For example, a fine prism lens row is disposed on a transmission surface of the lens film 24b. Preferably, a cross-section of this prism lens in the row direction is nearly in the shape of a triangle, for example, and the top thereof is rounded. This is because the cutoff can be improved and the wide viewing angle can be improved.

The diffusion film 24a and the lens film 24b are formed from, for example, polymer materials, and the refractive indices thereof are preferably 1.45 or more, more preferably 1.5 or more, and most preferably 1.6 or more, for example. Preferably, the material constituting the optical element 24 or the optical functional layer disposed thereon is, for example, a photosensitive resin which is cured by light or electron beams, a thermosetting resin which is cured by heat, or an ultraviolet curable resin which is cured by ultraviolet rays. A type prepared from a thermoplastic polymer material may be employed.

The reflective polarizer 24c is disposed on the lens film and transmits only one of polarization components orthogonal to each other and reflects the other among the light having the directivity improved by the lens sheet. The reflective polarizer 24c is a stack, for example, organic multilayer films, inorganic multilayer films, or liquid crystal multilayer films. The reflective polarizer 24c is allowed to contain a substance having a different refractive index. Furthermore, the reflective polarizer 24c may be provided with a diffusion function or a lens function.

Here, examples of a junction of the covering member 22 will be described with reference to FIGS. 5 and 6.

Figure 5:
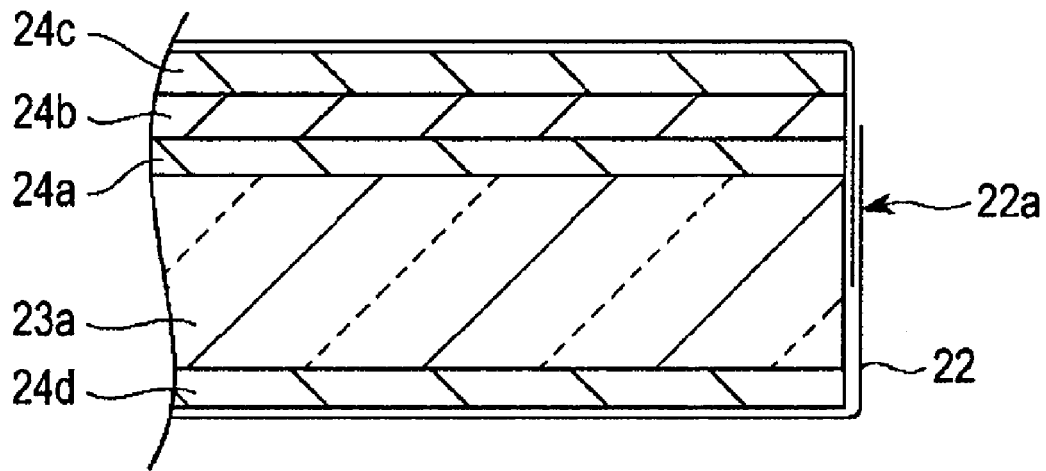
FIG. 5 is a sectional view showing a first example of a junction of a covering member according to the first embodiment of the present invention.

FIG. 5 shows a first example of the junction of the covering member. In the first example, as shown in FIG. 5, an inside surface and the outside surface of end portions of the covering member are overlapped and joined to each other on an end surface of the optical element stack 21. That is, the end portions of the covering member 22 are joined in such a way as to follow the end surface of the optical element stack 21.

Figure 6:
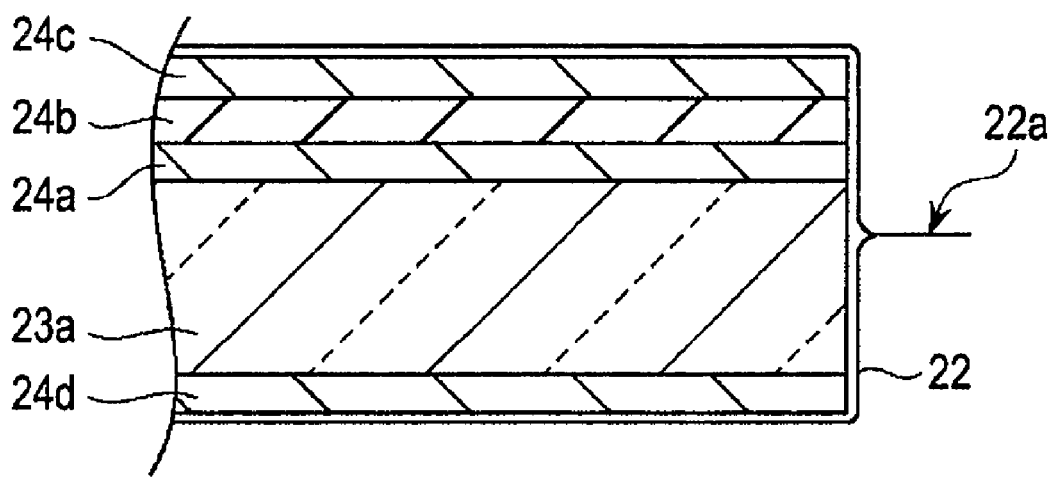
FIG. 6 is a sectional view showing a second example of a junction of a covering member according to the first embodiment of the present invention.

FIG. 6 shows a second example of the junction of the covering member. In the second example, as shown in FIG. 6, inside surfaces of end portions of the covering member are overlapped and joined to each other on an end surface of the optical element stack 21. That is, the end portions of the covering member 22 are joined to each other in such a way as to rise from the end surface of the optical element stack 21.

(1-2-2) Second Configuration Example

Figure 7:
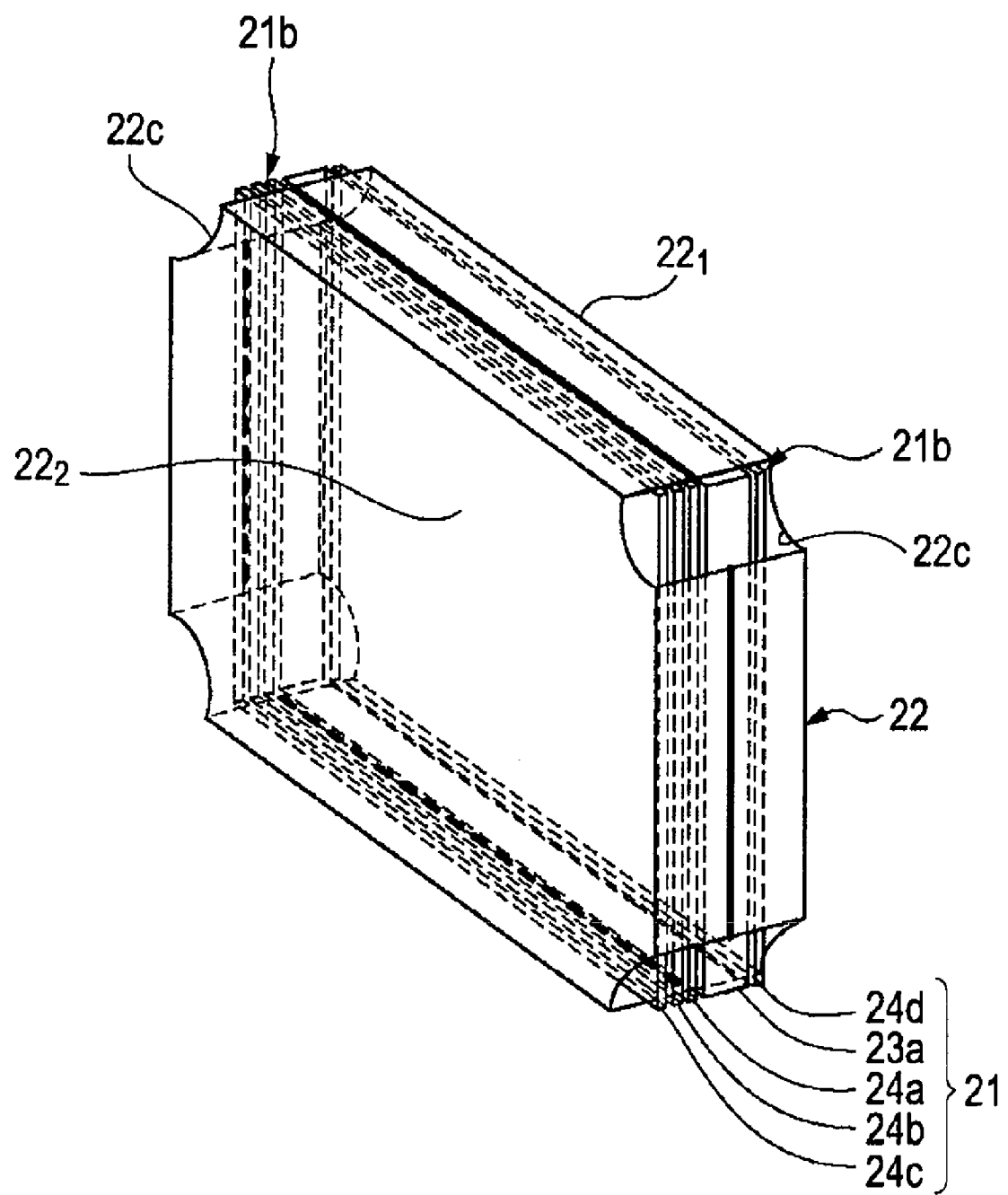
FIG. 7 is a perspective view showing a second configuration example of an optical element covering member according to the first embodiment of the present invention.

FIG. 7 shows the second configuration example of an optical element covering member according to the first embodiment of the present invention. The second configuration example of the optical element covering member is different from the first configuration example in that a light control film 24d is disposed between the incident surface of the diffusion plate 23a and the transmission surface of the covering member 22. The light control film 24d is a thin optical sheet in which a plurality of columnar prisms extended along a plane parallel to the bottom surface are arranged side by side continuously on the upper surface of the film. Regarding individual prisms, in the case where a plurality of linear light sources are parallel arranged just below the optical element stack 21, preferably, the individual prisms are parallel arranged in such a way that the extension direction of the individual prisms becomes parallel to the extension direction (for example, horizontal direction) of the linear light sources. However, the individual prisms may be arranged in such a way that they intersect the extension direction of the individual linear light sources within an optically acceptable range.

Consequently, the light control film 24d refracts and transmits, for example, the light incident at an angle less than a critical angle on the bottom surface or an upper surface of each prism, among the light emitted from one linear light source, and totally reflects the light incident at an angle more than or equal to the critical angle. Therefore, a function of splitting a light source image produced by one linear light source into a plurality of images in accordance with the number of faces constituting the upper surface of each prism (strictly, the number of faces classified on an angle of inclination basis) is provided. That is, the light control film 24d splits the light source image produced by one linear light source and make the distance between the light source images formed from individual light source images after splitting narrower than the distance between the linear light sources. Therefore, the difference between the luminance level of the light source image after splitting (maximum value) and the luminance level in between the light source images after splitting (minimum value) is made smaller than the difference between the luminance level of the light source image before splitting (maximum value) and the luminance level in between the light source images before splitting (minimum value), so that irregularity in illumination luminance can be reduced.

The light source image represents a light bundle indicating the peak of luminance in the luminance distribution of the light. The distance between the light source images refers to the distance in an in-plane direction between adjacent peaks (tops) in the luminance distribution.

The light control film 24d may be formed integrally by using a light-transmissive resin material, e.g., a thermoplastic resin or be formed by transferring an energy line (for example, ultraviolet rays) curable resin on a light-transmissive base material, e.g., PET (polyethylene terephthalate).

Here, it is preferable that a resin having a refractive index of 1.4 or more is used as the thermoplastic resin in consideration of a function of controlling the emission direction of the light. Examples of such resins include polycarbonate resins, acrylic resins e.g., PMMA (polymethylmethacrylate resin), polyester resins, e.g., polyethylene terephthalate, amorphous copolymerization polyester resins, e.g., MS (copolymer of methyl methacrylate and styrene), polystyrene resins, and polyvinyl chloride resins.

The present second configuration example is similar to the first configuration example except those described above.

(1-2-3) Third Configuration Example

Figure 8:
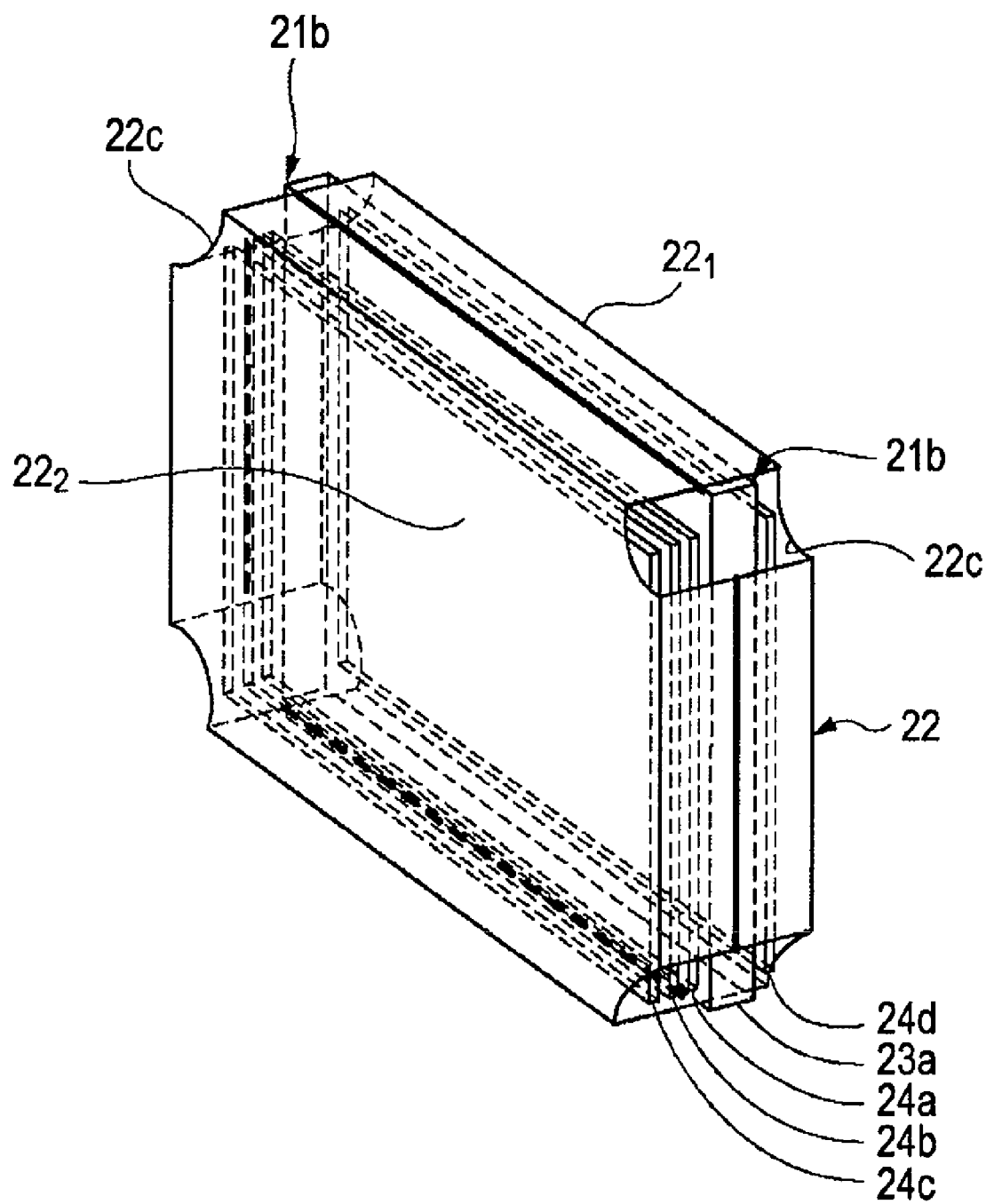
FIG. 8 is a perspective view showing a third configuration example of an optical element covering member according to the first embodiment of the present invention.

FIG. 8 shows the third configuration example of an optical element covering member according to the first embodiment of the present invention. The third configuration example of the optical element covering member is different from the second configuration example in that the diffusion film 24a, the lens film 24b, the reflective polarizer 24c, and the light control film 24d, which are optical elements, have sizes smaller than the diffusion plate 23a serving as a support medium. Consequently, the tension of the covering member 22 can be mainly applied to the diffusion plate 23 and, thereby, an occurrence of an wrinkle and the like in the diffusion film 24a, the lens film 24b, the reflective polarizer 24c, and the light control film 24d can be reduced.

The present third configuration example is similar to the first configuration example except those described above.

(1-3) Method for Manufacturing Optical Element Covering Member

An example of the method for manufacturing the optical element covering member 2 having the above-described configuration will be described below.

Figure 9A:
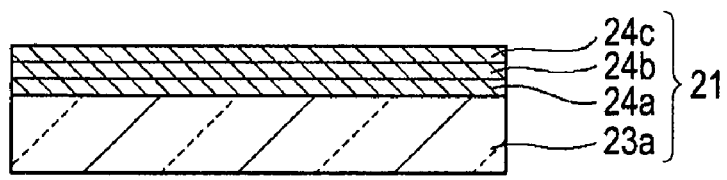
FIG. 9A to FIG. 9D are process diagrams for explaining an example of a method for manufacturing the optical element covering member according to the first embodiment of the present invention.
Figure 9B:
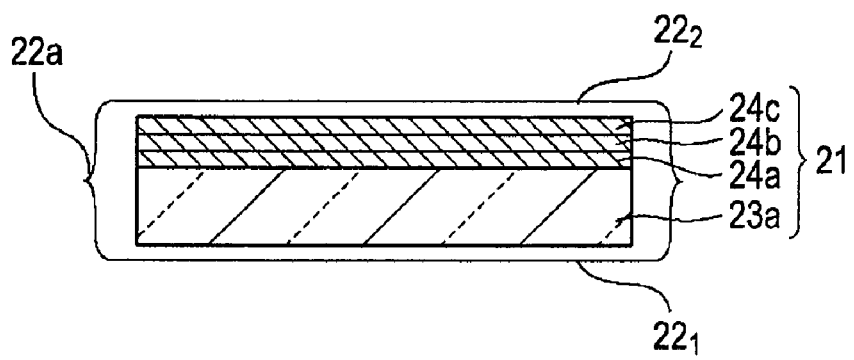
Figure 9C:
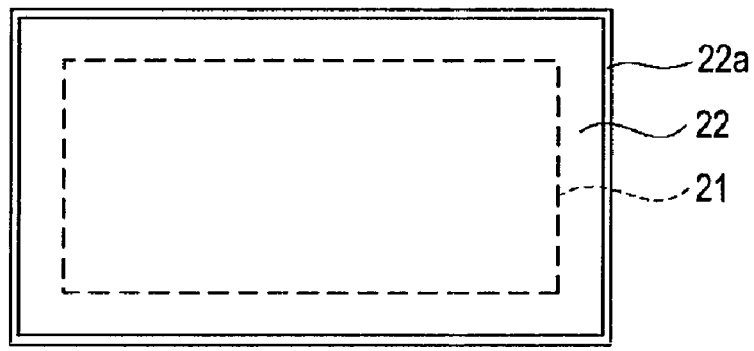
Figure 9D:
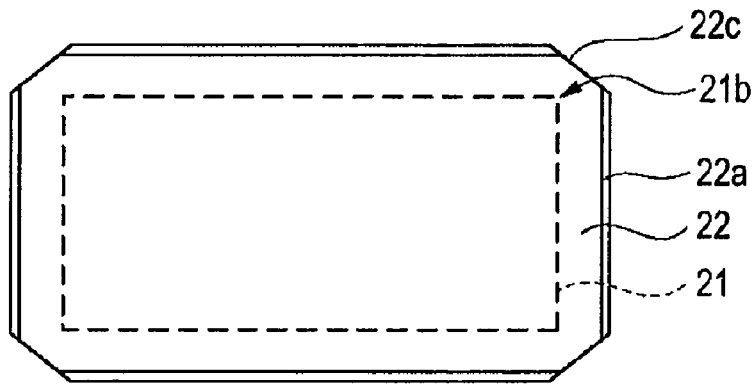

As shown in FIG. 9A, the diffusion film 24a, the lens film 24b, and the reflective polarizer 24c, which are optical elements, are stacked sequentially in that order on the diffusion plate 23a serving as a support medium so as to obtain the optical element stack 21. As shown in FIG. 9B, the optical element stack 21 is placed on the first covering member $22_1$, and the second covering member $22_2$ is placed thereon. As shown in FIG. 9C, peripheral portions 22a of the first covering member $22_1$ and the second covering member $22_2$ are joined to each other. Examples of joining methods include bonding and fusion. Examples of bonding methods include a hot melt type bonding method, a thermosetting type bonding method, a pressure sensitive (adhesion) type bonding method, an energy line curing type bonding method, and a hydration type bonding method. Examples of fusion methods include heat fusion, ultrasonic fusion, and laser fusion. Consequently, the entire optical element stack 21 is covered by the covering member 22. As shown in FIG. 9D, regarding the covering member 22, openings 22c are formed by, for example, cutting away the portions corresponding to the corner portions 21b of the optical element stack 21.

Figure 10A:
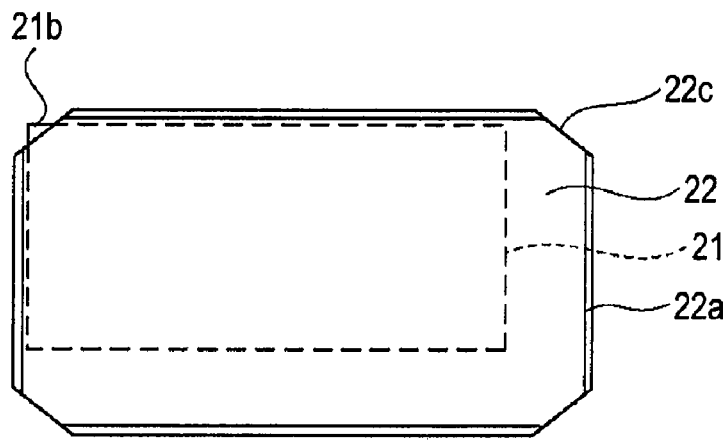
FIG. 10A to FIG. 10C are process diagrams for explaining an example of a method for manufacturing the optical element covering member according to the first embodiment of the present invention.
Figure 10B:
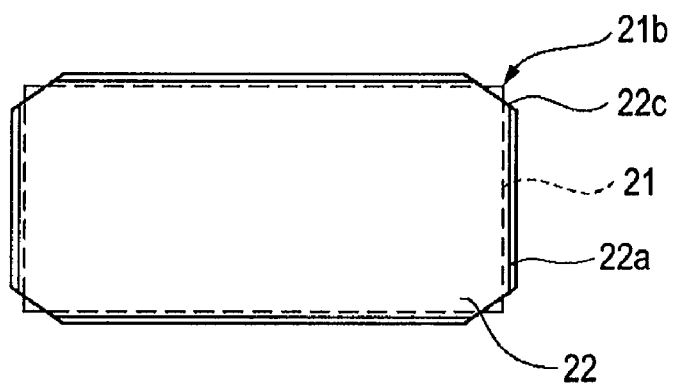
Figure 10C:
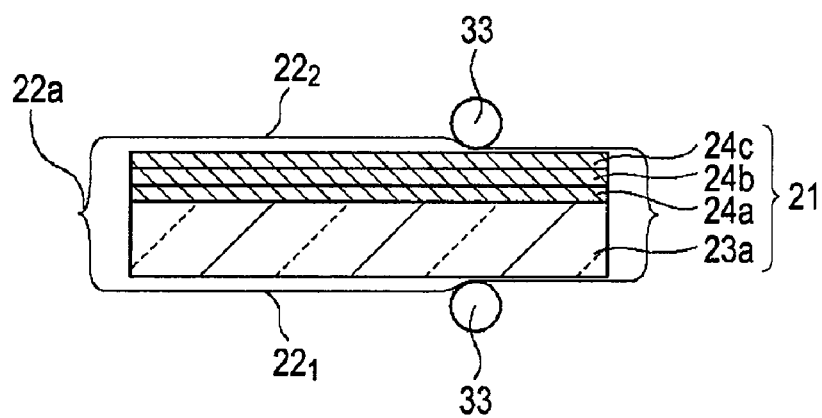

Subsequently, as shown in FIG. 10A, for example, the optical element stack 21 is moved in the direction of one corner of the covering member 22 so as to expose the corner portion 21b of the optical element stack 21 at the opening of the covering member 22. As shown in FIG. 10B, the covering member 22 is heat-treated so that the covering member 22 is allowed to shrink. As shown in FIG. 10C, if necessary, one principal surface or both principal surfaces of the optical element stack 22 covered with the covering member 22 are pressurized with a pressure roller 33, and the pressure roller 33 is moved on the one principal surface or both the principal surfaces of the optical element stack 21 while the pressure roller 33 is rotated. Consequently, excess air in the covering member 21 is exhausted through the opening 22c, and the covering member 21 and the optical element stack 22 are adhered. In the case where both the principal surfaces of the optical element stack 21 are pressurized with the pressure roller 33, both the principal surfaces of the optical element stack may be pressurized while the optical element stack covered with the covering member 22 is sandwiched by two pressure rollers 33.

In this manner, the desired optical element covering member 2 is obtained.

(2) Second Embodiment

Figure 11:
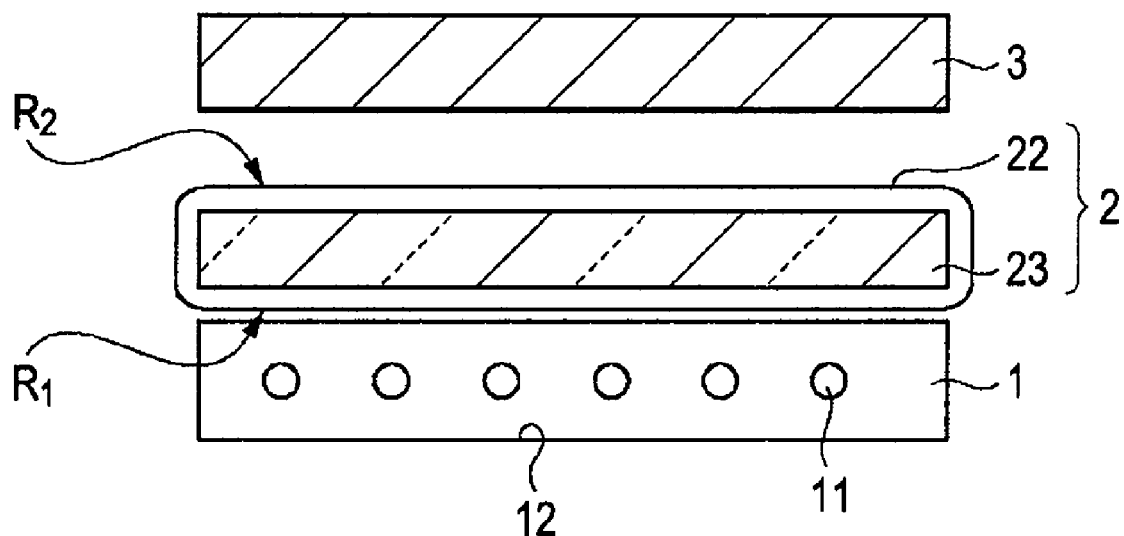
FIG. 11 is a schematic diagram showing a configuration example of a liquid crystal display device according to a second embodiment of the present invention.

FIG. 11 shows a configuration example of a liquid crystal display device according to the second embodiment of the present invention. This liquid crystal display device is different from the device in the first embodiment in that the covering member 22 covers only the support medium 23.

As shown in FIG. 11, this liquid crystal display device includes an illumination device 1 for emitting light, an optical element covering member 2 for improving the characteristics of the light emitted from the illumination device 1, and a liquid crystal display device 3 for displaying an image on the basis of the light having the characteristics improved by the optical element covering member 2. The illumination device 1 and the optical element covering member 2 constitute a backlight. If necessary, optical elements, e.g., a reflective polarizer and a diffusion film, may be disposed between the optical element covering member 2 and the liquid crystal panel 3.

The optical element covering member 2 is provided with a support medium 23 and a covering member 22 for covering the support medium 23. The covering member 22 includes a first region $R_1$, through which the light incident into the support medium 23 passes, and a second region $R_2$, through which the light transmitted from the support medium 23 passes. At least one of the first region $R_1$ and the second region $R_2$ is provided with an optical function. For example, this optical function is provided to at least one of an inside surface and an outside surface of the first region $R_1$ and/or the second region $R_2$. Examples of optical functional layers include a light collection element, a light diffusion element, a light control element, a polarization element, and a reflective polarization element.

Figure 12:
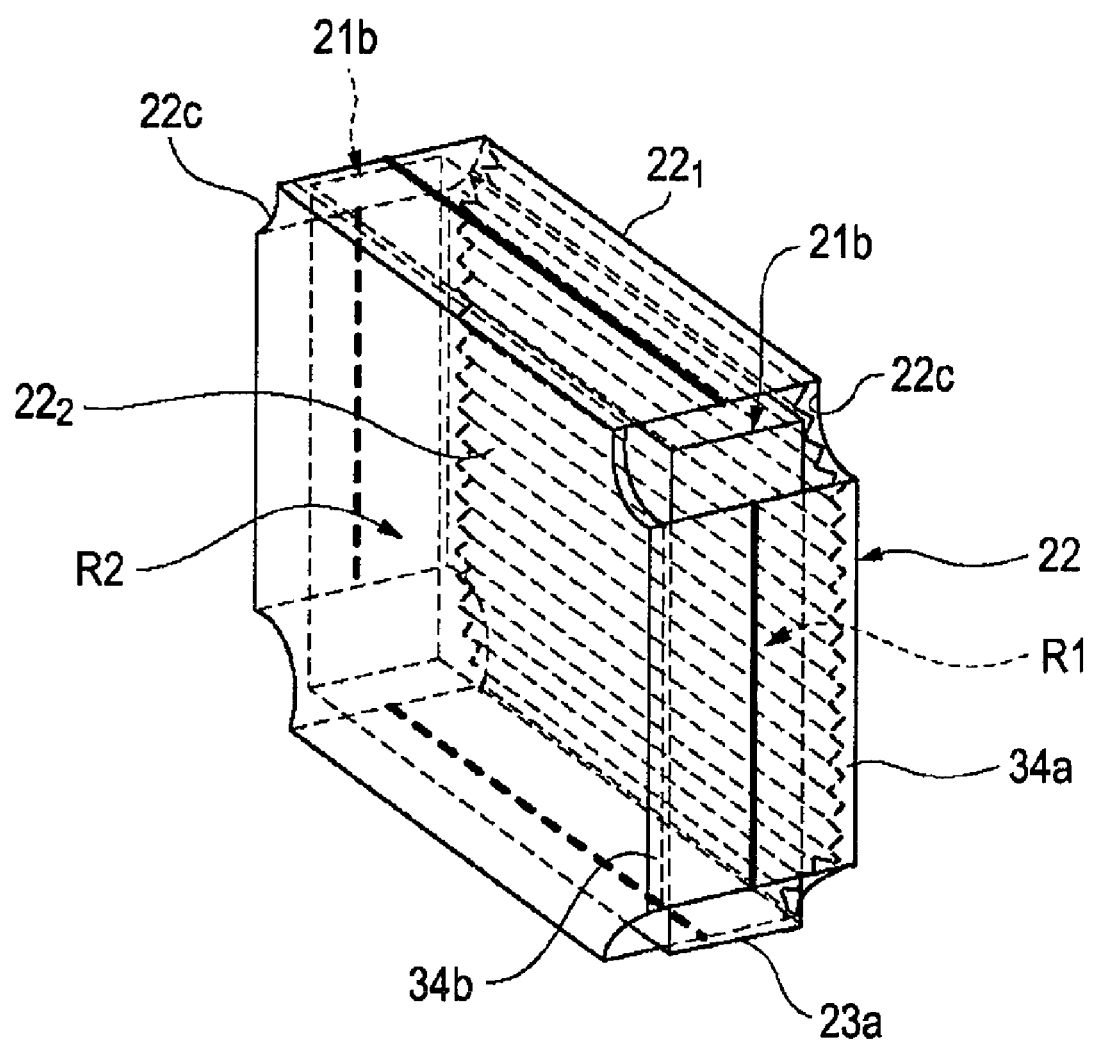
FIG. 12 is a perspective view showing a configuration example of an optical element covering member according to the second embodiment of the present invention.
Figure 13A:
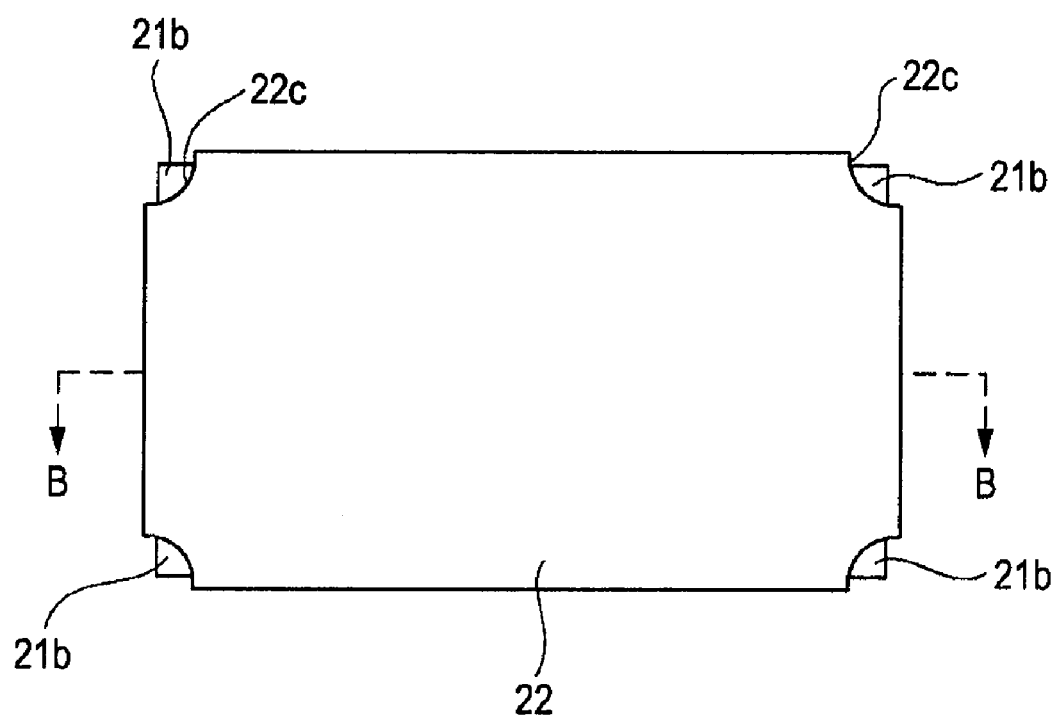
FIG. 13A and FIG. 13B are a plan view and a sectional view showing a configuration example of the optical element covering member according to the second embodiment of the present invention.
Figure 13B:
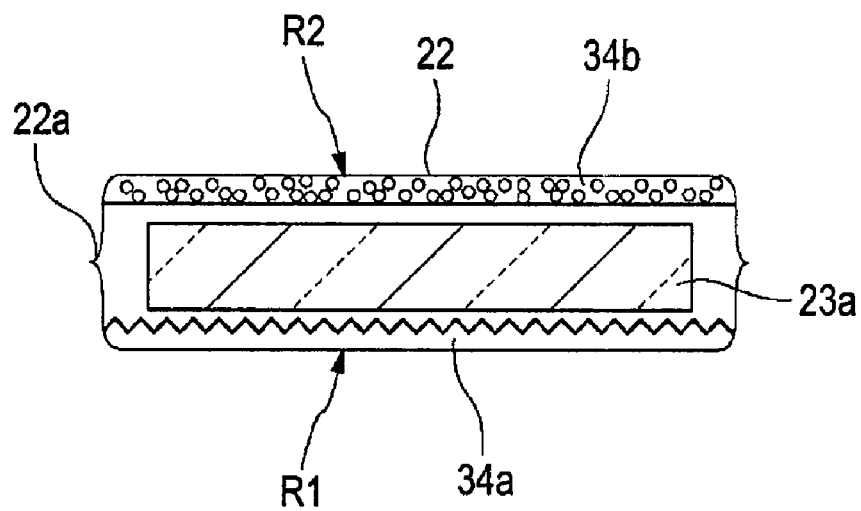

FIG. 12, FIG. 13A, and FIG. 13B show a configuration example of the optical element covering member according to the second embodiment of the present invention. As shown in FIG. 12, FIG. 13A, and FIG. 13B, this optical element covering member 2 includes a diffusion plate 23a serving as a support medium and a covering member 22 for covering the diffusion plate 23a. The covering member 22 is provided with light control in the first region $R_1$, through which the light incident into the support medium 23 passes, and is provided with a diffusion function in the second region $R_2$, through which the light transmitted from the support medium 23 passes. The light control has a function of a light control element, e.g., a light control film, and the diffusion layer has a function of a light diffusion element, e.g., a diffusion film.

The present second embodiment is similar to the first embodiment except those described above.

(3) Third Embodiment

Figure 14:
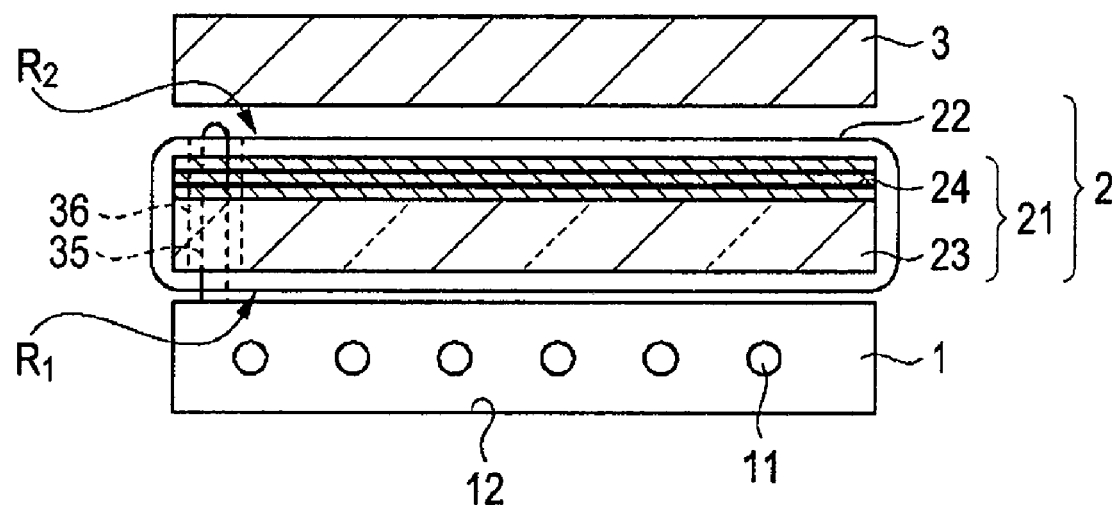
FIG. 14 is a schematic diagram showing a configuration example of an optical element covering member according to a third embodiment of the present invention.

FIG. 14 shows a configuration example of a liquid crystal display device according to the third embodiment of the present invention. This liquid crystal display device is different from the device in the first embodiment in that an illumination device 1 is provided with a support medium 35 for supporting an optical element covering member 2, and the optical element covering member 2 is provided with a supported portion 36 for engaging with a support medium 34a of the illumination device 1.

Figure 15A:
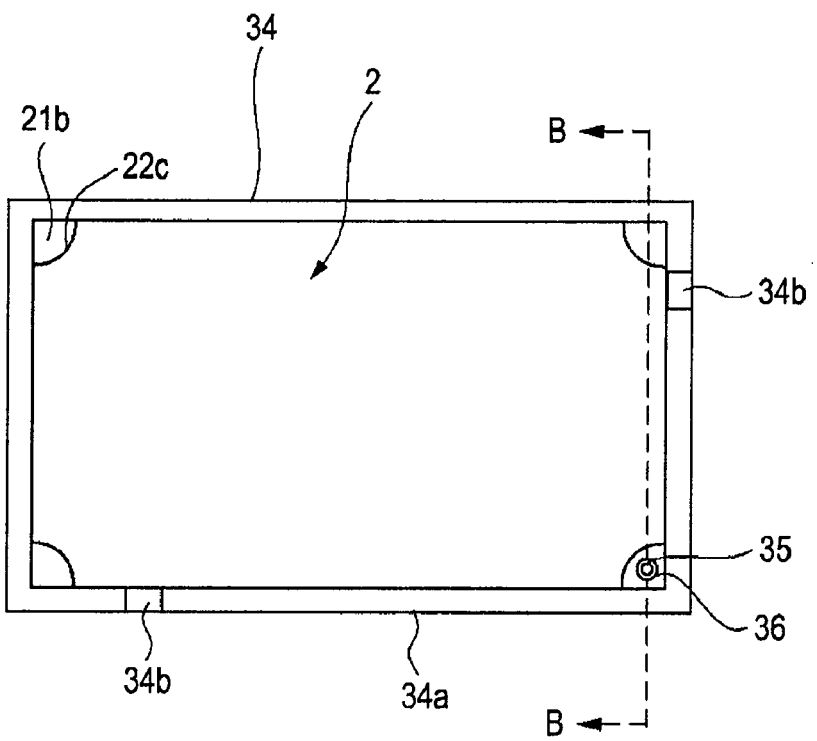
FIG. 15A and FIG. 15B are a plan view and a sectional view showing a configuration example of a backlight according to the third embodiment of the present invention.
Figure 15B:
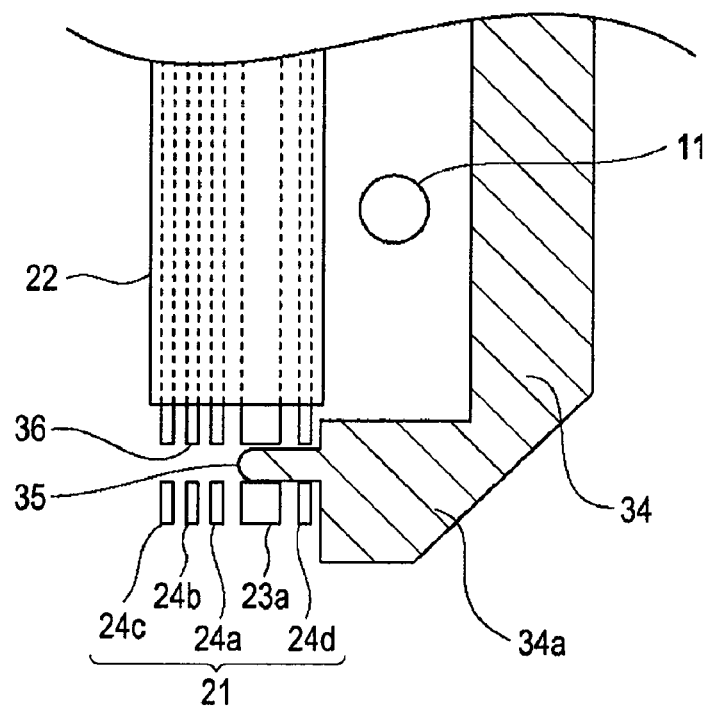

FIG. 15A and FIG. 15B show a configuration example of a backlight according to the third embodiment of the present invention. This backlight is provided with at least one light source 11, a backlight chassis 34, and the optical element covering member 2 supported by the backlight chassis 34. The optical element covering member 2 is provided with at least one supported portion 36. Preferably, the supported portion 36 is disposed in the peripheral portion of the optical element covering member 2, and it is preferable that supported portion 36 is disposed at a portion exposed at an opening 22c of a covering member 22. For example, in the case where a corner portion 21b of the optical element stack 21 is exposed at the opening 22c of the covering member 22, it is preferable that the supported portion 36 is disposed at this exposed corner portion 21b. The supported portion 36 is engaged with the support medium portion 35 of the backlight chassis 34 and fix the optical element covering member 2 at a predetermined position on the backlight chassis 34. The supported portion 36 is, for example, a hole portion penetrating the optical element covering member 2 in the thickness direction, a groove portion disposed on an end surface of the optical element covering member 2, or the like. Examples of the above-described hole portion include holes having a cross-section in the shape of a circle, an ellipse, a polygon, and a flat material. Examples of the above-described groove include grooves having a cross-section in the shape of the letter V, the letter U, the letter L, and an arc. The shapes of these hole portions and grooves are not limited to the above-described shapes insofar as the support medium portion 35 of the backlight chassis 34 is engaged with the supported portion 36 of the optical element covering member 2 and the position of the optical element covering member 2 can be fixed.

The backlight chassis 34 is provided with the support medium portion 35 for engaging with the supported portion 36 of the optical element covering member 2 and at least one support medium portion 34b for supporting the end surface of the optical element covering member 2. The supported portion 36 of the optical element covering member 2 is engaged with the support medium portion 35 of the backlight chassis 34 and, thereby, the support medium portion 35 fixes the optical element covering member 2 at a predetermined position on the backlight chassis 34. Examples of the shapes of the support medium portion 35 include shape of a column, a rod, a circular column, a needle, an arm, the letter L, the letter T, a trapezoid, a circular cone, and a screw, although not limited to the above-described shapes insofar as the shape is suitable for engagement with the supported portion 36 of the backlight chassis 34 and the position of the optical element covering member 2 can be fixed. The support medium portion 34b supports the end surface of the optical element stack 21 and fixes the optical element covering member 2 at a predetermined position on the backlight chassis 34. The support medium portion 34b is disposed in the peripheral portion 34a of the backlight chassis, for example. In the case where a plurality of support medium portions 34b are provided, it is preferable that the support medium portions 34b are disposed at positions capable of supporting the end surface of the optical element covering member 2 from at least two directions. For example, in the case where the optical element covering member 2 is in the shape of a rectangle as a whole, it is preferable that the support medium portions 34b are disposed at positions capable of supporting two sides orthogonal to each other among the sides of the optical element covering member 2.

Figure 16:
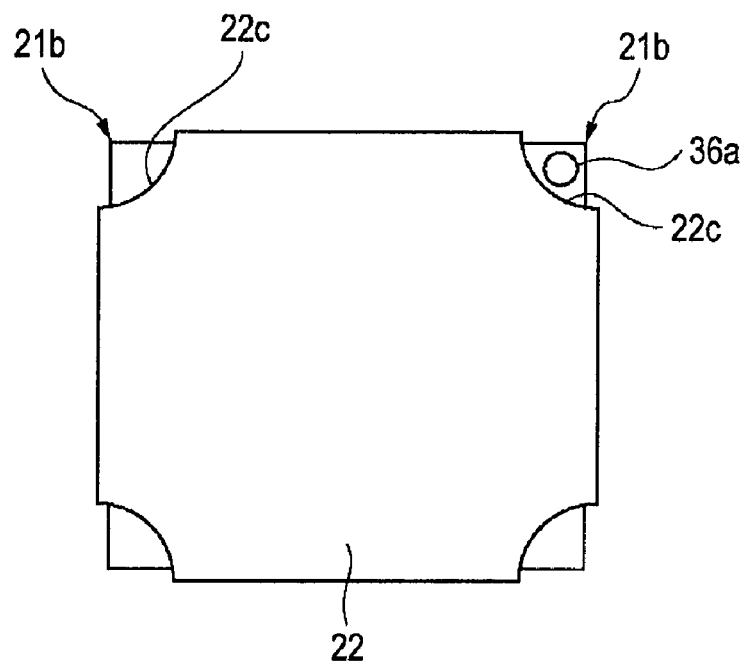
FIG. 16 is a plan view showing a first configuration example of an optical element covering member according to the third embodiment of the present invention.

FIG. 16 shows a first configuration example of an optical element covering member 2. The optical element stack 21 is, for example, in the shape of a rectangle as a whole. The covering member 22 has an opening 22c at a position corresponding to a corner portion 21b of the optical element stack 21, and the corner portion 21b is exposed at the opening 22c. The corner portion 21 exposed at this opening 22c is provided with a hole portion 36a, into which a columnar support medium portion 35 is fitted.

Figure 17:
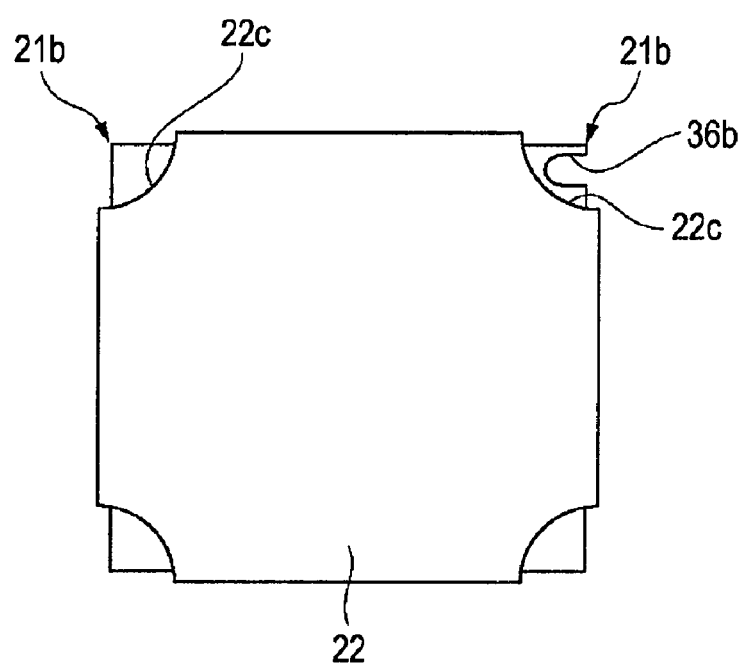
FIG. 17 is a plan view showing a second configuration example of an optical element covering member according to the third embodiment of the present invention.

FIG. 17 shows a second configuration example of an optical element covering member 2. A corner portion 21 exposed at an opening 22c of the covering member 22 is provided with a notch groove portion 36b with a cross-section in the shape of the letter U so as to fit with the support medium portion 35 in the shape of a column or the like.

(4) Fourth Embodiment (4-1) Configuration of Liquid Crystal Display Device

Figure 18:
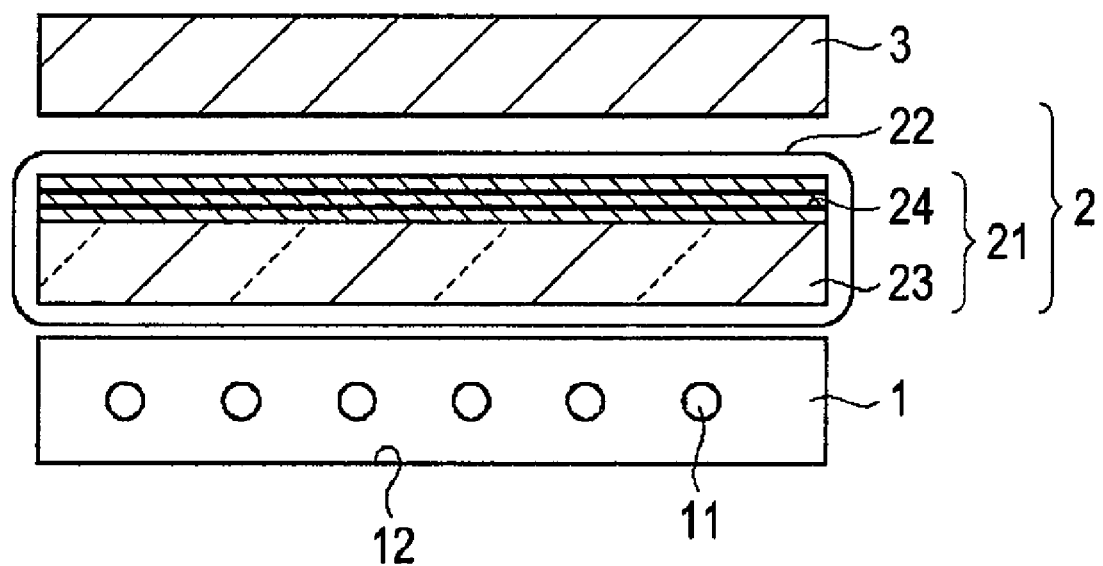
FIG. 18 is a schematic diagram showing a configuration example of a liquid crystal display device according to a fourth embodiment of the present invention.

FIG. 18 shows a configuration example of a liquid crystal display device according to the fourth embodiment of the present invention. As shown in FIG. 18, this liquid crystal display device includes an illumination device 1 for emitting light, an optical element covering member 2 for improving the characteristics of the light emitted from the illumination device 1, and a liquid crystal display device 3 for displaying an image on the basis of the light having the characteristics improved by the optical element covering member 2. The illumination device 1 and the optical element covering member 2 constitute a backlight. Among surfaces of optical members, e.g., the optical element covering member, hereafter, the surface into which the light from the illumination device 1 enters is referred to as an incident surface, the surface which transmits the light incident from the incident surface is referred to as a transmission surface, and the surface located between the incident surface and the transmission surface is referred to as an end surface. The incident surface and the transmission surface are appropriately collectively referred to as principal surfaces.

The illumination device 1 is, for example, a direct-lighting type illumination device and is provided with a light source 11 for emitting light and a reflection plate 12 for reflecting the light emitted from the light source 11 to direct the light in the direction of the liquid crystal panel 3. As for the light source 11, for example, a cold cathode fluorescent lamp (CCFL), a hot cathode fluorescent lamp (HCFL), organic electroluminescence (OEL) or light emitting diode (LED), and inorganic electroluminescence (IEL) can be used. For example, the reflection plate 12 is disposed in such a way as to cover the bottom and the side of at least one light source 11, and reflects the light emitted from the at least one light source 11 downward, toward the sides, and the like to direct the light in the direction of the liquid crystal panel 3.

For example, the optical element covering member 2 is provided with at least one optical element 24 for changing the characteristics of the light emitted from the illumination device 1 by subjecting the light to a treatment, e.g., diffusion or light collection, a support medium 23 for supporting the at least one optical element, and a covering member 22 for covering and integrating the at least one optical element 24 and the support medium 23. Hereafter, the structure in which the support medium 23 and the at least one optical element are stacked is referred to as an optical element stack 21. The covering member 22 includes a first region $R_1$, through which the light incident into the optical element stack 21 passes, and a second region $R_2$, through which the light transmitted from the optical element stack 21 passes.

The number and the type of the optical elements 24 are not specifically limited and can be appropriately selected in accordance with the characteristics of a desired liquid crystal display device. As for the optical element 24, for example, an element having an optical function and at least serving as a support medium or an element including a support medium and at least one optical function can be used. As for the optical element 24, for example, a light diffusion element, a light collection element, a reflective polarizer, a polarizer, or a light splitting element can be used. For example, a film-shaped element, a sheet-shaped element, or a tabular element can be used as the optical element. The thickness of the optical element 24 is, for example, 5 to 1,000 μm.

For example, the support medium 23 is a transparent plate for transmitting the light emitted from the illumination device 1 or an optical plate for changing the characteristics of the light by subjecting the light emitted from the illumination device 1 to a treatment, e.g., diffusion or light collection. For example, a diffusion plate, a phase difference plate, or a prism plate can be used as the optical plate. Preferably, the thickness of the support medium 23 is 500 to 100,000 μm, and more preferably 1,000 to 50,000 μm. Preferably, the thickness, the cross-section width, the length, and the rigidity (modulus of elasticity) of the support medium 23 are appropriately selected in consideration of the tension of the covering member 22.

Specifically, in the case where the backlight is of direct-lighting type, as for the support medium 23, a resin plate having a size of a diagonal of about 2 inches to 100 inches and a thickness of 1 mm to 4 mm and including a diffusion filler or an optical plate for diffusion provided with a shape having a diffusion function or a layer containing a filler on a glass surface can be used. In the case where the backlight is of side-light type, a transparent resin plate having a size of a diagonal of 1 inch to a few tens of inches and a thickness of about 0.5 to 10 mm, a resin plate including a filler, a resin plate provided with a shape on the surface, and a resin plate including a filler and provided with a shape on the surface can be used.

In consideration of the facts that in the case where a liquid crystal display device is preserved in a high temperature environment at 40° C., the temperature in the device increases up to about 60° C. when the liquid crystal display device is lit up (refer to Example 1 described later) and that an actual liquid crystal television and the like is provided with a temperature increase prevention function in order to avoid deterioration of a polarizer at 70° C., it is preferable that the support medium 23 has the rigidity exhibiting small changes up to 70° C. and has the elasticity to some extent. Examples of materials for the support medium 23 having such characteristics can include materials containing polycarbonate (modulus of elasticity 2.1 GPa), polystyrene (modulus of elasticity 2.8 GPa), ZEONOR resin (modulus of elasticity 2.1 GPa) as cycloolefin resin, and acrylic resin (modulus of elasticity 3 GPa), and the like as primary components. It is preferable that a material having a modulus of elasticity (2.1 GPa or more) larger than or equal to the modulus of elasticity of the polycarbonate resin, which has the lowest modulus of elasticity among the above-described materials, is contained as a primary component.

Preferably, the support medium 23 is composed of, for example, a polymer material, and the transmission factor thereof is 30% or more. The order of stacking of the optical element 24 and the support medium 23 is selected in accordance with, for example, the functions provided to the optical element 24 and the support medium 23. For example, in the case where the support medium 23 is a diffusion plate, the support medium 23 is disposed on the incident side of the light from the illumination device 1. In the case where the support medium 23 is a reflective polarizer, the support medium 23 is disposed on the side of transmission of the light toward the liquid crystal panel 3. Furthermore, for example, a form in which an optical functional layer having a light splitting or diffusion function is disposed on the side nearer to the light source than is the transparent plate or the diffusion plate serving as the support medium 23 may be combined, a light diffusion function may be disposed after transmission of the transparent plate or the diffusion plate, or/and a light collection functional layer may be further used in combination. The shapes of the incident surface and the transmission surface of the optical element 24 and the support medium 23 are selected in accordance with the shape of the liquid crystal display device 3, and are, for example, in the shape of rectangles having different aspect ratios.

Preferably, the principal surfaces of the optical element 24 and the support medium 23 are subjected to a roughing treatment or are allowed to contain fine particles. This is because rubbing off and friction can be reduced. If necessary, the optical element 24 and the support medium 23 are allowed to contain additives, e.g., a light stabilizer, an ultraviolet absorber, an antistatic agent, a flame retardant, and an antioxidant, and thereby, an ultraviolet absorption function, an infrared absorption function, an antistatic function, and the like may be provided to the optical element 24 and the support medium 23. Furthermore, diffusion of the reflection light or the reflection light itself may be reduced by subjecting the optical element 24 and the support medium 23 to a surface treatment, e.g., an anti-reflection treatment (AR treatment) or an anti-glare treatment (AG treatment). The surfaces of the optical element 24 and the support medium 23 may be provided with a function of reflecting ultraviolet rays or infrared rays.

The covering member 22 is in the shape of, for example, a single-layer or multilayer film, sheet, or bag, having transparency. For example, the covering member 22 is in the shape of a sheet, and end surfaces thereof in the longitudinal direction are joined to each other preferably on an end surface of the optical element stack 21. Hereafter, among the surfaces of the covering member 22, the surface on the optical element stack 21 side is referred to as an inside surface and the surface on the side opposite thereto is referred to as an outside surface.

The film or sheet of the covering member 22 may be joined in the same longitudinal direction, or be joined in a direction intersecting the longitudinal direction. These covering members 22 may be covered with at least one layer in the same direction and/or different directions. These covering members 22 are continuous film or sheet is continuous, covered with at least two layers, and may be provided in the same direction and/or both the different directions.

In the case where the principal surface of the optical element stack 21 is in the shape of a rectangle having, for example, a different aspect ratio, the principal surface and both end surfaces on the sides of the long sides are covered with the covering member 22 and both end surfaces on the sides of the short sides are exposed at the covering member 22, or the principal surface and both end surfaces on the sides of the short sides are covered with the covering member 22 and the principal surface and both end surfaces on the sides of the long sides are exposed.

The thickness of the covering member 22 is selected from, for example, 5 to 5,000 μm. The thickness of the covering member 22 on the incident surface side and the thickness on the transmission surface side may be different from each other. In this case, it is preferable that the thickness on the incident surface side is larger than the thickness on the transmission surface side. This is because changes in shapes of the support medium 23 and the optical element 24 due to the heat generated from the light source 11 can be reduced by increasing the thickness on the incident surface side.

However, the thickness on the transmission surface side may be made larger than the thickness of the incident surface side depending on the purposes. Preferably, the covering member 22 covers 50% or more of the principal surface of the optical element stack 21 in terms of an area ratio. Preferably, the screen display region is covered, or one of or both the screen display region principal surfaces are opened. The covering member 22 may include a surface structured member serving as a support medium. The covering member 22 has, for example, uniaxial anisotropy or biaxial anisotropy. For example, in the case where the covering member 22 is in the shape of a rectangle, the uniaxial anisotropy with a positive or negative refractive index in a longitudinal direction of the covering member 22 is provided or the biaxial anisotropy with a positive or negative refractive index characteristic in a longitudinal direction of the covering member 22 is provided.

In the case where the covering member 22 has the anisotropy, it is preferable that the anisotropy is a low level. Specifically, it is preferable that the retardation thereof is 50 nm or less. Alternatively, in the case where the optical axis of the optical anisotropy is synchronized with a longitudinal or short axis of an included member, the retardation is not limited to 50 nm or less insofar as, for example, the color characteristics due to the viewing angle fit the purpose of uses satisfactorily. Furthermore, it is possible to use without limiting the anisotropy of the covering member 22 by providing a diffusion function on the transmission side of the covering member 22, allowing the covering member 22 to be provided with a function of effecting diffusion after passing through the principal surface of the first region $R_1$, or providing optical functions of effecting diffusion and the like on the transmission side of the optical element covering member 2.

It is preferable that a uniaxially drawn, sequentially biaxially drawn, or simultaneously biaxially drawn sheet or film is used as the covering member 22. In the case where such a sheet or film is used, since the covering member 22 is allowed to shrink in a drawing direction by application of heat, the adhesion between the covering member 22 and the optical element stack 21 can be enhanced. Moreover, an extendable film or sheet is used as the covering member 22 and is extended primarily in a desired direction of covering through extension and shrinkage, the inclusion is sandwiched by the extendable films or sheets, the surrounding of the inclusion is joined by adhesion or fusion, and thereafter, the tension of the extendable films or sheets is relieved, so that the adhesion to the included support medium or/and the optical element can be enhanced.

Preferably, a heat shrinkable polymer material is used as the material for the covering member 22. More preferably, a polymer material which shrinks by application of heat from ambient temperature to 85° C. can be used. Examples of heat shrinkable polymer materials include polyolefin resins, e.g., polyethylene (PE) and polypropylene (PP); polyester resins, e.g., polyethylene terephthalate (PET) and polyethylene naphthalate (PEN); vinyl bond systems, e.g., polystyrene (PS) and polyvinyl alcohol (PVA); polycarbonate (PC) resins; cycloolefin resins; urethane resins; vinyl chloride resins; natural rubber resins; and artificial rubber resins. They can be used alone or in combination.

The heat shrinkage of the covering member 22 is preferably 0.2% or more, more preferably 5% or more, further preferably 10% or more, and most preferably 20% or more. This is because the adhesion between the covering member 22 and the optical element stack 21 can be enhanced by employing the values within this range. Preferably, the heat distortion temperature of the covering member 22 is 80° C. or higher, and desirably 90° C. or higher. This is because deterioration of the optical characteristics of the optical element covering member 2 due to the heat generated from the light source 11 can be reduced. Preferably, the drying loss of the covering member 22 is 2% or less. The refractive index of the material for the covering member 22 (refractive index of the covering member 22) is preferably 1.6 or less, and more preferably 1.55 or less for the purpose of reducing the interface reflection loss to increase the light transmittance and is 1.45 or more, and desirably 1.5 or more in the case where optical function factors, e.g., a light collection effect, a light splitting effect, and the like, are added.

The covering member 22 may have optical functions, for example, a light diffusion element, a light collection element, a reflective polarizer, a polarizer, and a light splitting element.

It is preferable that the covering member 22 contains at least one type of filler for the purpose of the scratch resistance of the surface, prevention of adhesion to a display panel of the liquid crystal panel, prevention of sticking on the included optical element and the support medium, or prevention of scratching by a pin (stud) for regulating the gap between the direct-lighting type light source and the optical element because of vibration during transportation and the like.

Furthermore, for the purpose of providing a function of diffusion as an optical function to the covering member 22, a filler may be included in the entire covering member 22; one surface; both surfaces; or a surface and one and/or any one of both surfaces. The included particles may present in the vicinity of the surface layer.

In addition to the above-described inclusion of the filler into the covering member 22, a method in which a mixture of a resin and particles is molded into the surface layer of the covering member 22 or a filler is contained by applying a paint composed of a resin, particles, and a solvent to the surface layer of the covering member 22 and drying the solvent, a method in which film formation and molding are conducted by using an energy curable system (UV curing, visible light curing, electron beam curing, or the like) containing a filler, or a method in which the filler-containing layer prepared as described above is allowed to transfer, and the like are mentioned.

For example, at least one type of organic fillers and inorganic fillers can be used as the filler. For example, at least one type selected from the group consisting of acrylic resins, styrene resins, fluorine, and cavities can be used as the material for the organic filler. For example, at least one type selected from the group consisting of silica, alumina, talc, titanium oxide, and barium sulfate can be used as the inorganic filler. These organic and inorganic fillers can be used alone or both types can be used. Regarding the shape of the filler, various shapes, e.g., a needle-like shape, a spherical shape, an elliptical shape, a tabular shape, and a scale-like shape, can be employed. For example, at least one type of diameter is selected as the diameter of the filler.

For the same purpose as that of inclusion of the filler into the covering member 22 described above, a shape may be provided to the covering member 22. For example, it is also possible to provide a shape to one surface and/or both surfaces of the thermoplastic resin covering member 22 by an operation of thermal stacking, embossing, or the like. A heat shrinkable film may be obtained by conducting drawing and heat-fixing after the shape is provided. Alternatively, a heat shrinkable film may be provided with a shape by the operation of thermal stacking, embossing, or the like so as to obtain a film.

Since the shape can be provided by the above-described methods, e.g., thermoforming and mechanical embossing, film inclusion type molding, energy curable resins, or the like, it is possible to provide a light control means, e.g., light collection, diffusion, or light splitting, on one of and/or both principal surfaces on the light incident side and the light transmission side.

For example, an effect of increasing luminance can be obtained by providing a lens shape on the light transmission side of the covering member 22. Likewise, an effect of reducing irregularity in light source can be obtained by providing a diffusion function shape and an effect of light collection function can be obtained by a microlens shape. Furthermore, an effect of reducing irregularity in light source can also be obtained by providing a lens shape or a diffusion function to the covering member 22 on the light source side.

In the case where the optical function is provided to the covering member 22, at least one of the principal surface on the light incident side and the principal surface of the light transmission side can be provided with the optical function depending on the purpose of the optical function. The optical function of each principal surface may be different from each other and, therefore, different functions may be provided. For example, transparency, light collection, light diffusion, light splitting, and the like may be combined or be employed alone. The same functions as the included optical functions may be used for them, and selection is conducted depending on the purpose of use.

If necessary, the covering member 22 is allowed to further contain additives, e.g., a light stabilizer, an ultraviolet absorber, an antistatic agent, a flame retardant, and an antioxidant, and thereby, an ultraviolet absorption function, an infrared absorption function, an antistatic function, and the like may be provided to the covering member 22. Furthermore, diffusion of the reflection light or the reflection light itself may be reduced by subjecting the covering member 22 to, for example, a surface treatment, e.g., an anti-glare treatment (AG treatment) or an anti-reflection treatment (AR treatment). Moreover, a function of transmitting the light in a specific wavelength region, e.g., UV-A light (about 315 to 400 nm), may be provided.

An uneven surface structured member serving as an optical function may be formed on the surface of the covering member 22. Furthermore, the surface structured member may include waviness for preventing sticking and for the scratch resistance. The waviness in a ridge direction is added to, for example, parallel arranged lenses serving as a light collection function and, thereby, contact between top portions of the lenses is reduced. In addition to one surface, the optical function or the surface structured member for preventing sticking and for the scratch resistance may also be provided on a back surface.

The liquid crystal panel 3 controls the light supplied from the light source 11 so as to display the information. As for the operational mode of the liquid crystal panel 3, for example, a twisted nematic (TN) mode, a vertically aligned (VA) mode, an in-plane switching (IPS) mode, or an optically compensated birefringence (OCB) mode is employed.

(4-2) Configuration of Optical Element Covering Member (4-2-1) First Configuration Example The configuration example of an optical element covering member 2 will be described below in detail with reference to FIGS. 19 to 21.

Figure 19:
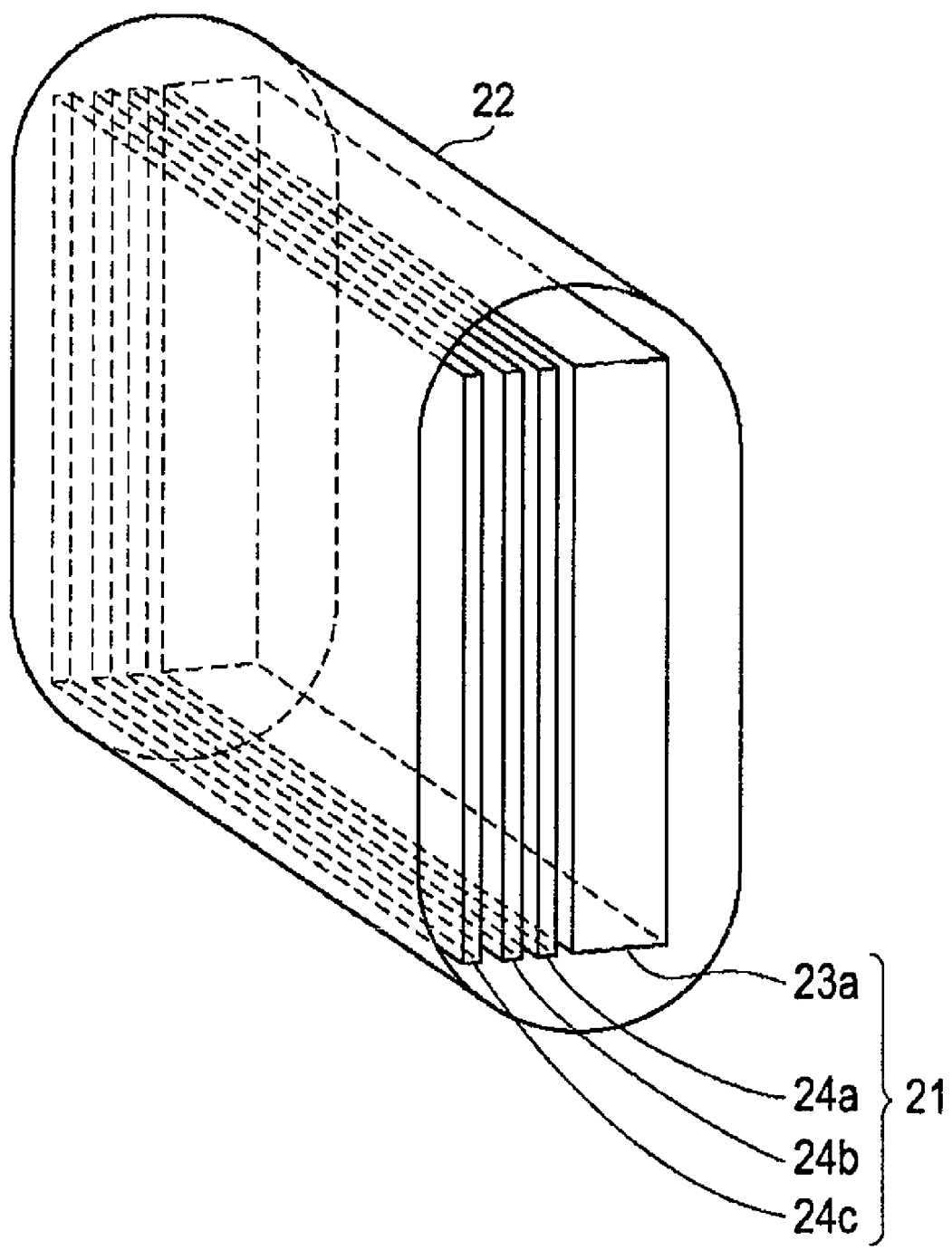
FIG. 19 is a perspective view showing a first configuration example of an optical element covering member according to the fourth embodiment of the present invention.

FIG. 19 shows a first configuration example of an optical element covering member according to the fourth embodiment of the present invention. As shown in FIG. 19, the optical element covering member 2 includes, for example, a diffusion plate 23a serving as a support medium, a diffusion film 24a serving as an optical element, a lens film 24b, a reflective polarizer 24c, and a covering member 22 for covering and integrating them. Here, the diffusion plate 23a, the diffusion film 24a, the lens film 24b, and the reflective polarizer 24c constitute an optical element stack 21. The principal surface of the optical element stack 21 is in the shape of a rectangle having, for example, a different aspect ratio. The principal surface and both end surfaces on the sides of the long sides of the optical element stack 21 are covered with a sheet-shaped covering member 22 and both end surfaces on the sides of the short sides are exposed. The two end portions in a longitudinal direction of the sheet-shaped covering member 22 are joined to each other on, for example, an end surface on the side of a long side of the optical element stack 21.

The diffusion plate 23a is disposed above at least one light source 11 and diffuses the light emitted from the at least one light source 11 and the light reflected by the reflection plate 12 so as to make the luminance uniform. As for the diffusion plate 23a, for example, a plate provided with an uneven surface structured member for diffusing light on a surface, a plate containing fine particles or the like having a refractive index different from that of the primary constituent material of the diffusion plate 23a, a plate containing porous fine particles, or a plate prepared by combining at least two types of the above-described uneven surface structured member, fine particles, and porous fine particles can be used. For example, at least one type of organic fillers and inorganic fillers can be used as the fine particles. The above-described uneven surface structured member, fine particles, and porous fine particles are disposed on, for example, a transmission surface of the diffusion film 24a. The light transmittance of the diffusion plate 23a is, for example, 30% or more.

The diffusion film 24a is disposed on the diffusion plate 23a and, for example, diffuses the light diffused by the diffusion plate. As for the diffusion film 24a, for example, a film provided with an uneven surface structured member for diffusing light on a surface, a film containing fine particles or the like having a refractive index different from that of the primary constituent material of the diffusion film 24a, a film containing porous fine particles, or a film prepared by combining at least two types of the above-described uneven surface structured member, fine particles, and porous fine particles can be used. For example, at least one type of organic fillers and inorganic fillers can be used as the fine particles. The above-described uneven surface structured member, fine particles, and porous fine particles are disposed on, for example, a transmission surface of the diffusion film 24a.

The lens film 24b is disposed above the diffusion film 24a and improves the directivity and the like of the illumination light. For example, a fine prism lens row is disposed on a transmission surface of the lens film 24b. Preferably, a cross-section of this prism lens in the row direction is nearly in the shape of a triangle, for example, and the top thereof is rounded. This is because the cutoff can be improved and the wide viewing angle can be improved.

The diffusion film 24a and the lens film 24b are formed from, for example, polymer materials, and the refractive indices thereof are preferably 1.45 or more, more preferably 1.5 or more, and most preferably 1.6 or more, for example. Preferably, the material constituting the optical element 24 or the optical functional layer disposed thereon is, for example, a photosensitive resin which is cured by light or electron beams, a thermosetting resin which is cured by heat, or a ultraviolet curable resin which is cured by ultraviolet rays. A type prepared from a thermoplastic polymer material may be employed.

The reflective polarizer 24c is disposed on the lens film and transmits only one of polarization components orthogonal to each other and reflects the other among the light having the directivity improved by the lens sheet. The reflective polarizer 24c is a stack, for example, organic multilayer films, inorganic multilayer films, or liquid crystal multilayer films. The reflective polarizer 24c is allowed to contain a substance having a different refractive index. Furthermore, the reflective polarizer 24c may be provided with a diffusion function or a lens function.

Here, examples of a junction of the covering member 22 will be described with reference to FIGS. 20 and 21.

Figure 20:
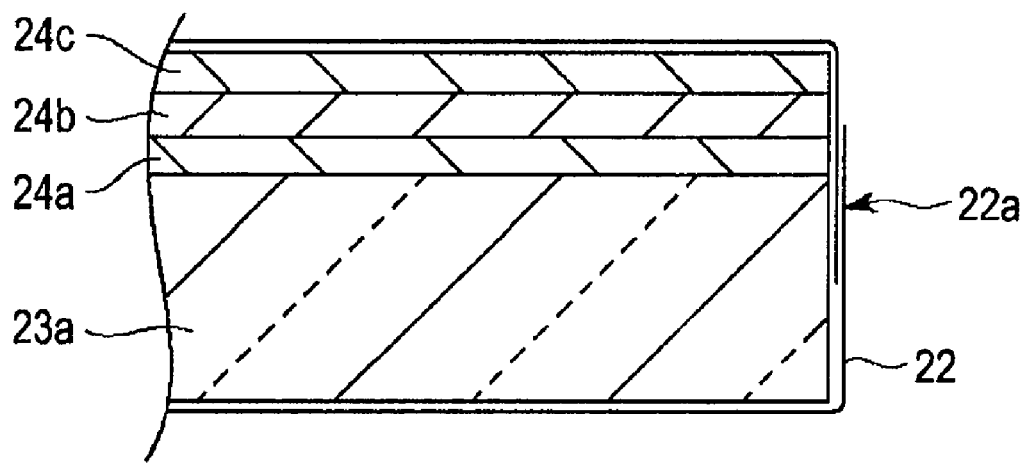
FIG. 20 is a sectional view showing a first example of a junction of a covering member according to the fourth embodiment of the present invention.

FIG. 20 shows a first example of the junction of the covering member. In the first example, as shown in FIG. 20, an inside surface and the outside surface of end portions of the covering member are overlapped and joined to each other on an end surface of the optical element stack 21. That is, the end portions of the covering member 22 are joined in such a way as to follow the end surface of the optical element stack 21.

Figure 21:
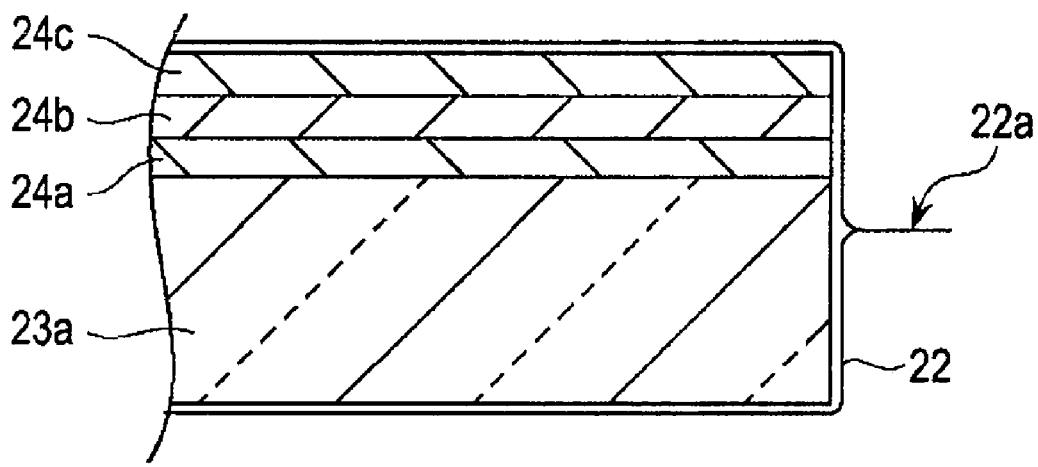
FIG. 21 is a sectional view showing a second example of a junction of a covering member according to the fourth embodiment of the present invention.

FIG. 21 shows a second example of the junction of the covering member. In the second example, as shown in FIG. 21, inside surfaces of end portions of the covering member are overlapped and joined to each other on an end surface of the optical element stack 21. That is, the end portions of the covering member 22 are joined to each other in such a way as to rise from the end surface of the optical element stack 21.

(4-2-2) Second Configuration Example

Figure 22:
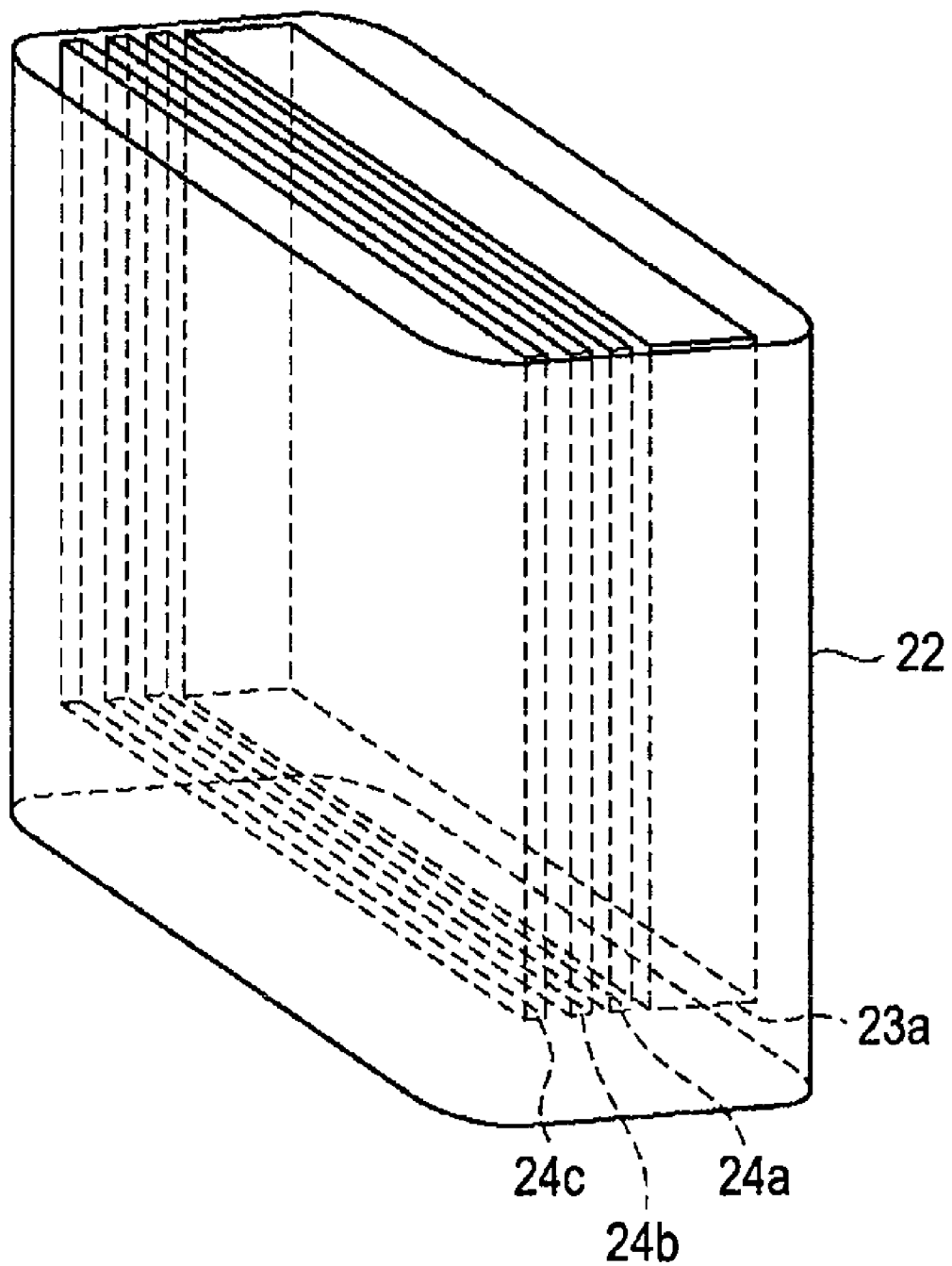
FIG. 22 is a perspective view showing a second configuration example of an optical element covering member according to the fourth embodiment of the present invention.

FIG. 22 shows the second configuration example of the optical element covering member according to the fourth embodiment of the present invention.

As shown in FIG. 22, the incident surface and the transmission surface of the optical element stack 21 and both end surfaces on the sides of short sides thereof are covered with the sheet-shaped covering member 22, and both end surfaces on the sides of short sides of the optical element stack 21 are exposed. The two end portions in a longitudinal direction of the sheet-shaped covering member 22 are joined to each other on an end surface on the side of a long side of the optical element stack 21.

(4-2-3) Third Configuration Example

Figure 23:
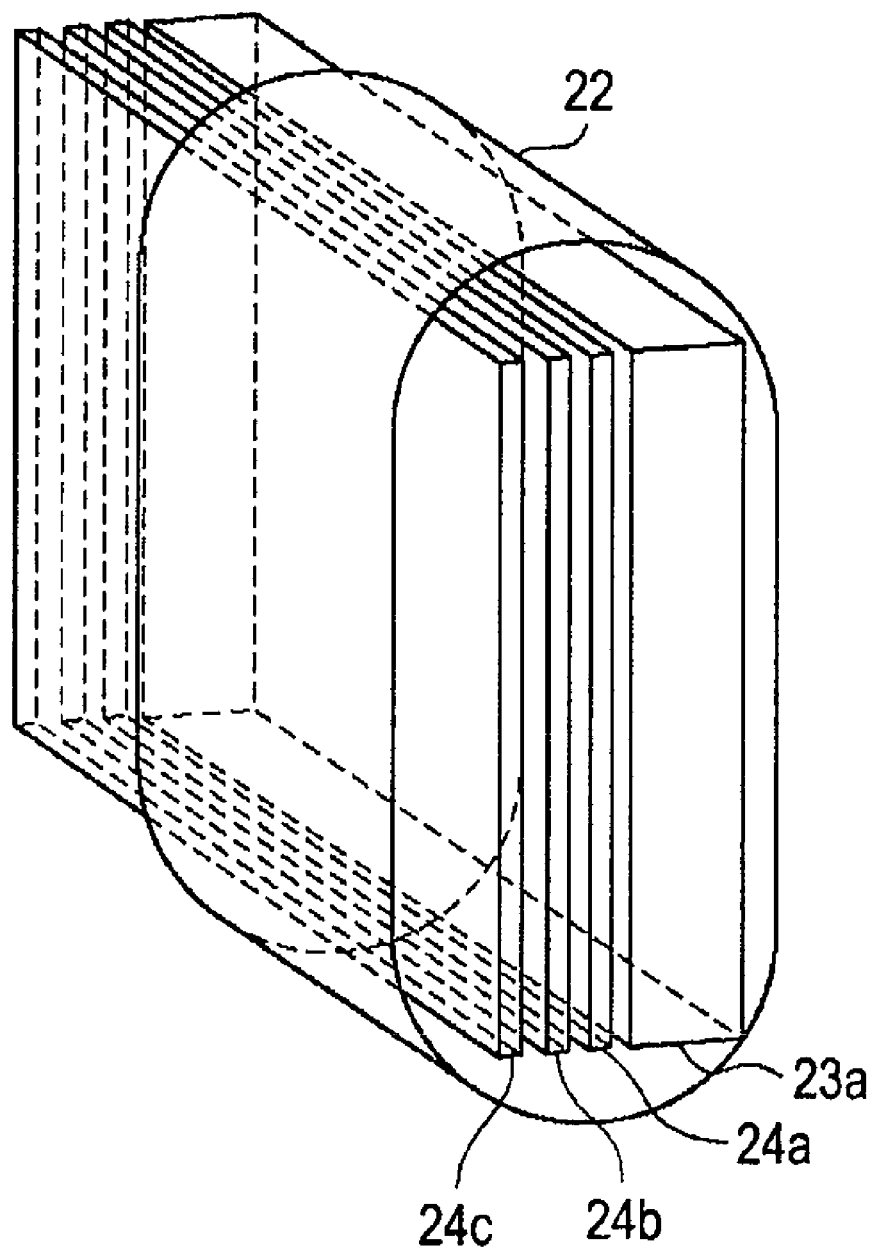
FIG. 23 is a perspective view showing a third configuration example of an optical element covering member according to the fourth embodiment of the present invention.

FIG. 23 shows the third configuration example of the optical element covering member according to the fourth embodiment of the present invention. As shown in FIG. 23, the center portion of the optical element stack 21 and the vicinity thereof are covered with a sheet-shaped covering member 22, and both end portions on the sides of short sides of the optical element stack 21 are exposed. The two end portions in a longitudinal direction of the sheet-shaped covering member 22 are joined to each other on an end surface on the side of a long side of the optical element stack 21.

(4-3) Method for Manufacturing Optical Element Covering Member

Figure 24A:
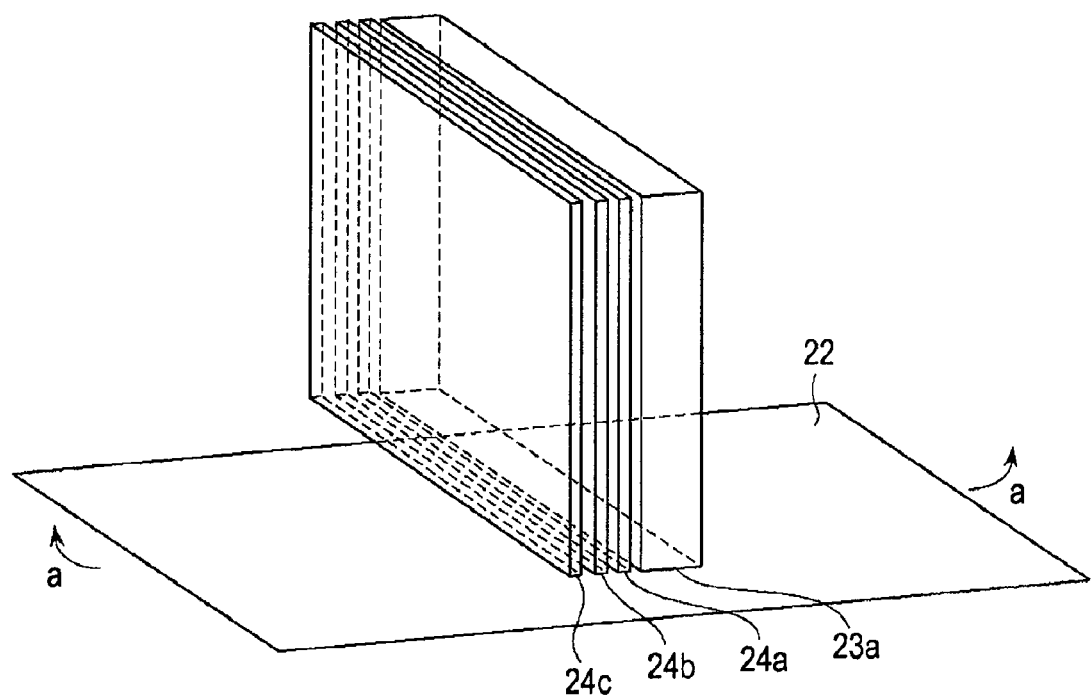
FIG. 24A and FIG. 24B are perspective views for explaining an example of a method for manufacturing the optical element covering member according to the fourth embodiment of the present invention.
Figure 24B:
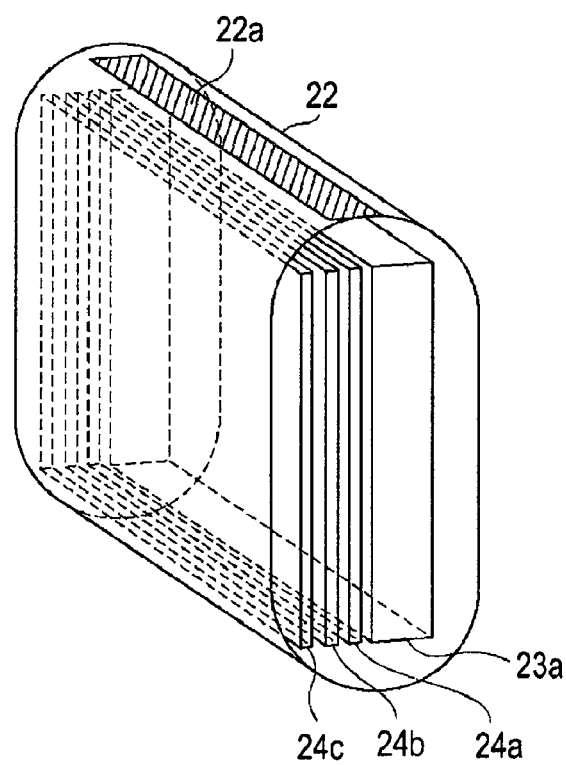

An example of the method for manufacturing the optical element covering member 2 having the above-described configuration will be described below. As shown in FIG. 24A, a stack of at least one optical element 24 and a support medium 23 is placed on, for example, a sheet-shaped covering member 22. As indicated by arrows a shown in FIG. 24A, for example, both end portion in a longitudinal direction of the sheet-shaped covering member 22 are lifted, and the stack of at least one optical element 24 and the support medium 23 is covered with the covering member 22. As shown in FIG. 24B, for example, end portions in a longitudinal direction of the covering member 22 are joined to each other on an end surface of the at least one optical element 24 or the support medium 23. Examples of joining methods include bonding and the like by adhesives and fusion. Examples of bonding methods by adhesives include a hot melt type bonding method, a thermosetting type bonding method, a pressure sensitive (adhesion) type bonding method, an energy line curing type bonding method, and a hydration type bonding method. Examples of bonding methods by fusion include heat fusion, ultrasonic fusion, and laser fusion. Thereafter, if necessary, heat is applied to the covering member 22 and, thereby, the covering member may heat-shrink. In this manner, a desired optical element covering member 2 is obtained.

(5) Fifth Embodiment

The fifth embodiment corresponds to the fourth embodiment in which optical elements 24 having at least two types of sizes are included. Among the optical elements 24 having at least two types of sizes, the smallest optical element 24 is disposed in the inside of the optical element stack 21, and the largest optical element 24 is disposed on the incident surface side or the transmission surface side of the optical element stack 21.

Figure 25:
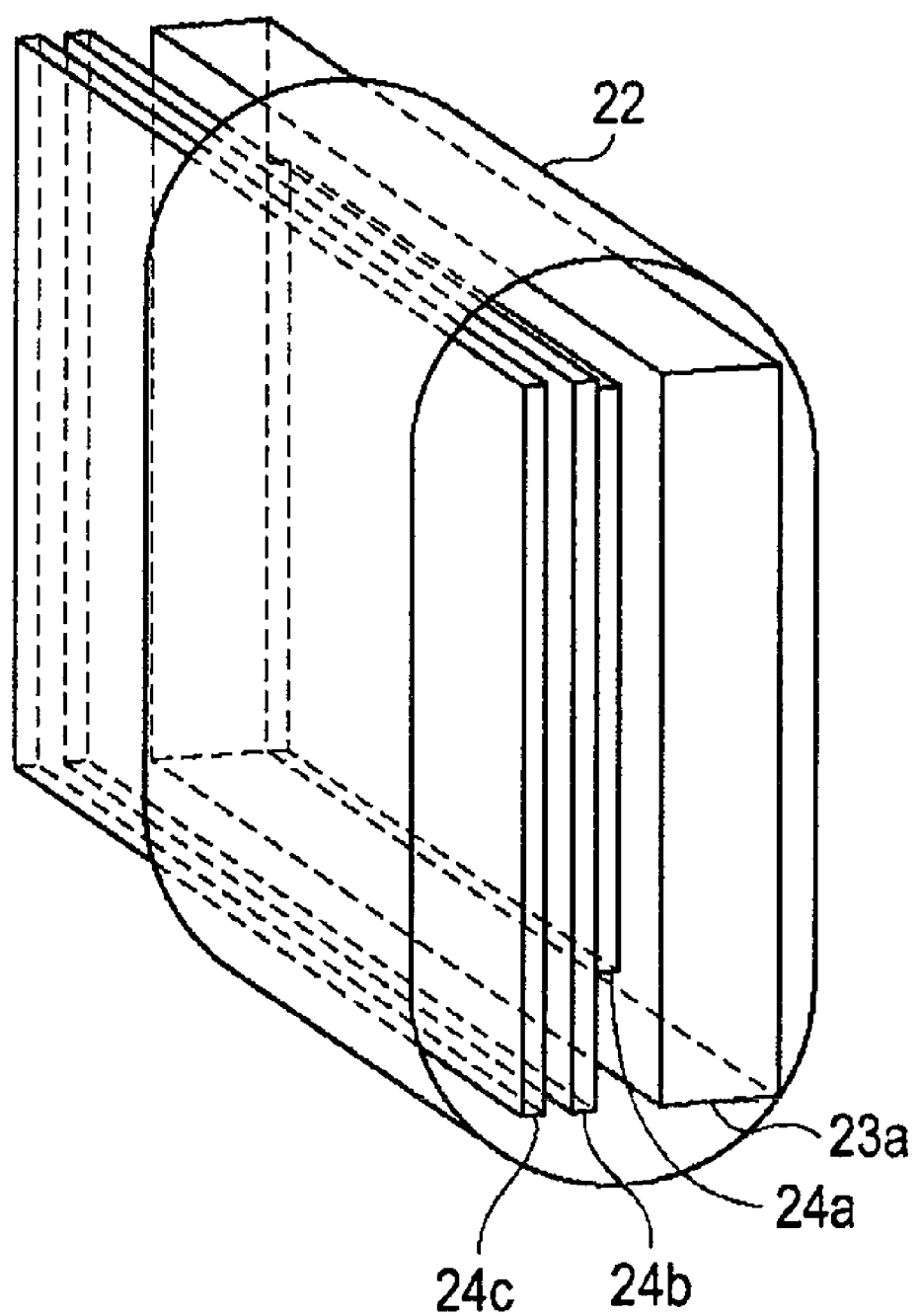
FIG. 25 is a perspective view showing a configuration example of an optical element stack according to a fifth embodiment of the present invention.

FIG. 25 shows a configuration example of an optical element stack according to the fifth embodiment of the present invention. As shown in FIG. 25, a diffusion film 24a, a lens film 24b, and a reflective polarizer 24c are stacked in that order on a diffusion plate 23a serving as a support medium. This optical element stack 21 is covered with a sheet-shaped covering member 22. Among the optical elements 24 constituting the optical element stack 21, the smallest diffusion film 24 is disposed in the inside of the optical element stack 21, and the reflective polarizer 24c, which is one of the largest optical elements 24, is disposed on the transmission surface side of the optical element stack 21.

(6) Sixth Embodiment

In the sixth embodiment, end surfaces of an optical element stack 21 are covered with a covering member 22 and, thereby, the optical element stack is integrated and principal surfaces of the optical element stack 21 are exposed. If necessary, the peripheral portion of the optical element stack 21 may be further covered with the covering member 22.

Figure 26:
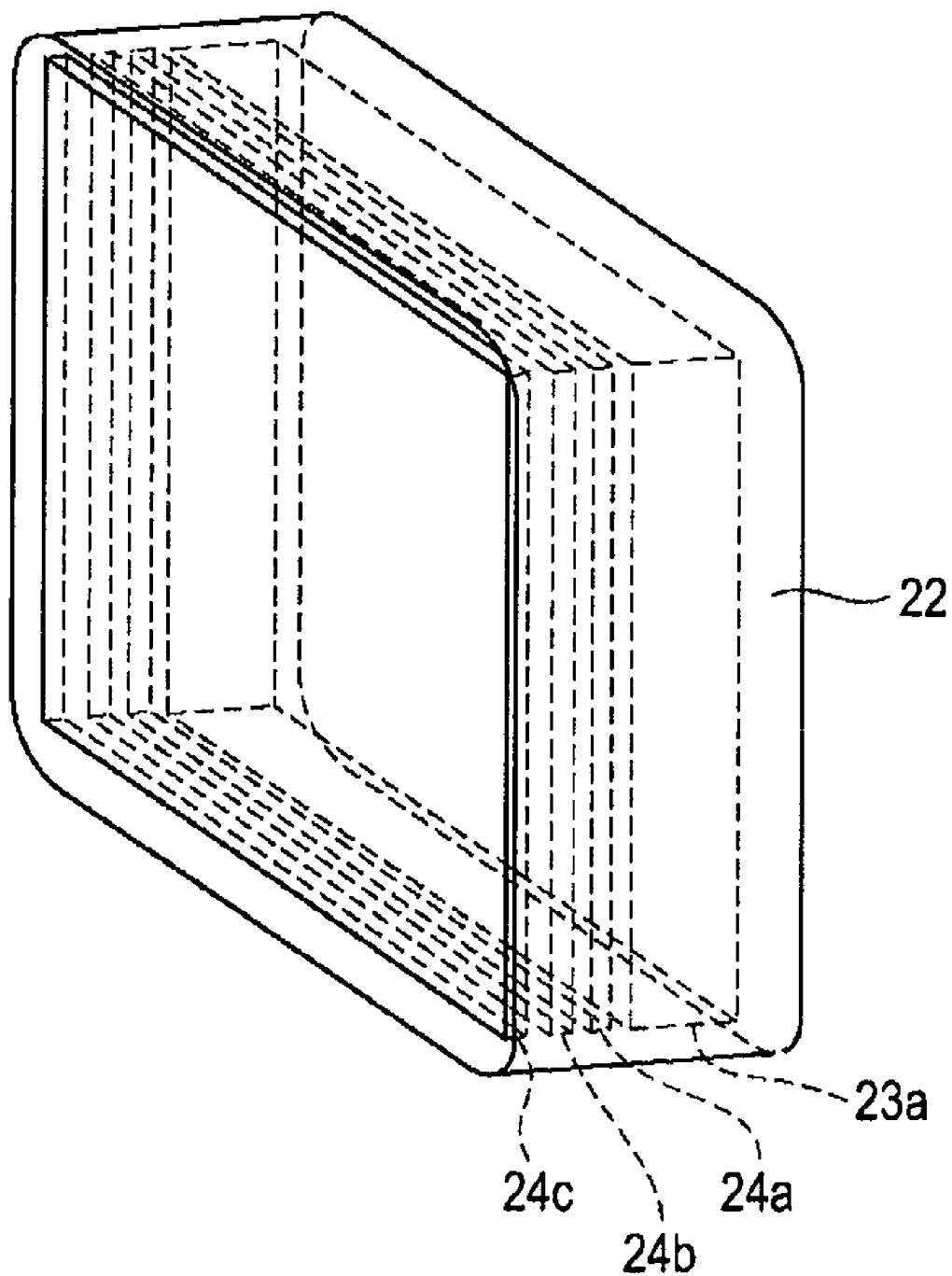
FIG. 26 is a perspective view showing a configuration example of an optical element covering member according to a seventh embodiment of the present invention.

FIG. 26 shows a configuration example of an optical element covering member according to the sixth embodiment of the present invention. As shown in FIG. 26, all the end surfaces of the optical element stack 21 are covered with the covering member 22, and an incident surface and a transmission surface of the optical element stack 21 are exposed.

In the sixth embodiment of the present invention, since the transmission surface of the optical element covering member 2 is exposed, the light passed through a support medium 23 or the optical elements 24 disposed on the transmission side of the optical element covering member 2 can be entered into a liquid crystal panel 104 without changing the retardation. For example, the light polarized and separated by a reflective polarizer 24c disposed on the transmission side can be entered into a polarizer of the liquid crystal panel 104 without changing the retardation. Therefore, a decrease in luminance can be reduced.

(7) Seventh Embodiment

The seventh embodiment corresponds to the fourth embodiment in which at least two covering member 22 are included. These covering members 22 are allowed to cover the optical element stack 21 from different directions so as to cover the optical element stack 21. The materials and the shapes of the at least two covering members may be different from each other.

Figure 27:
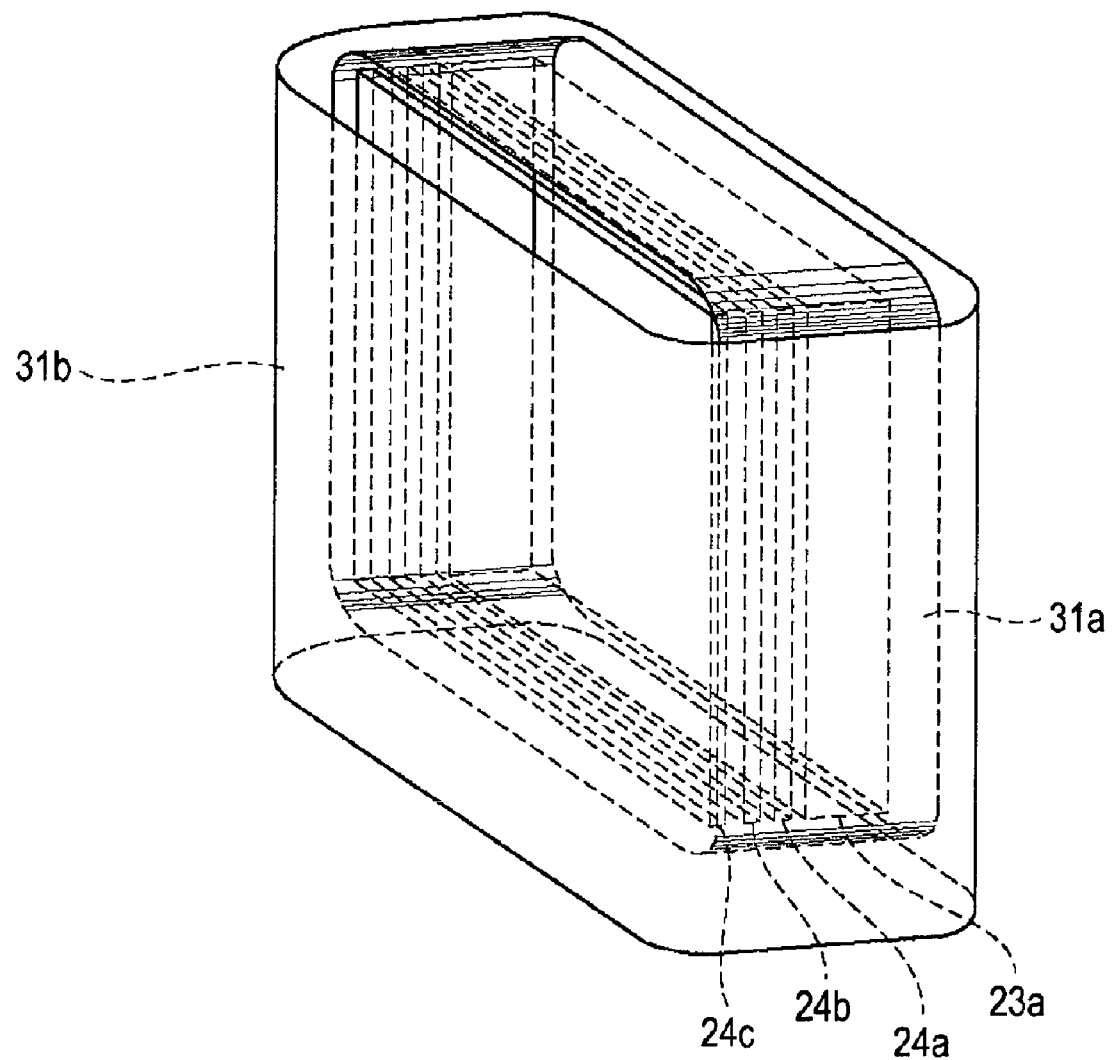
FIG. 27 is a perspective view showing a configuration of the optical element covering member according to the seventh embodiment of the present invention.

FIG. 27 shows a configuration example of an optical element covering member according to the seventh embodiment of the present invention. As shown in FIG. 27, the principal surface of the optical element stack 21 is in the shape of a rectangle having, for example, a different aspect ratio. The principal surface of the optical element stack 21 and end surfaces on the sides of the short sides thereof are covered with a first covering member 31a. The principal surface of the optical element stack 21 and end surfaces on the sides of the long sides thereof are covered with a second covering member 31b. Therefore, all surfaces of the optical element stack 21 are covered with the first covering member 31a and the second covering member 31b.

(8) Eighth Embodiment

The eighth embodiment corresponds to the fourth embodiment in which an optical element stack is bundled and integrated by using at least two covering members 22. The covering member 22 is in the shape of a slender sheet, for example, and covers end portions or the like of the optical element stack 21 so as to integrate the optical element stack 21.

Figure 28:
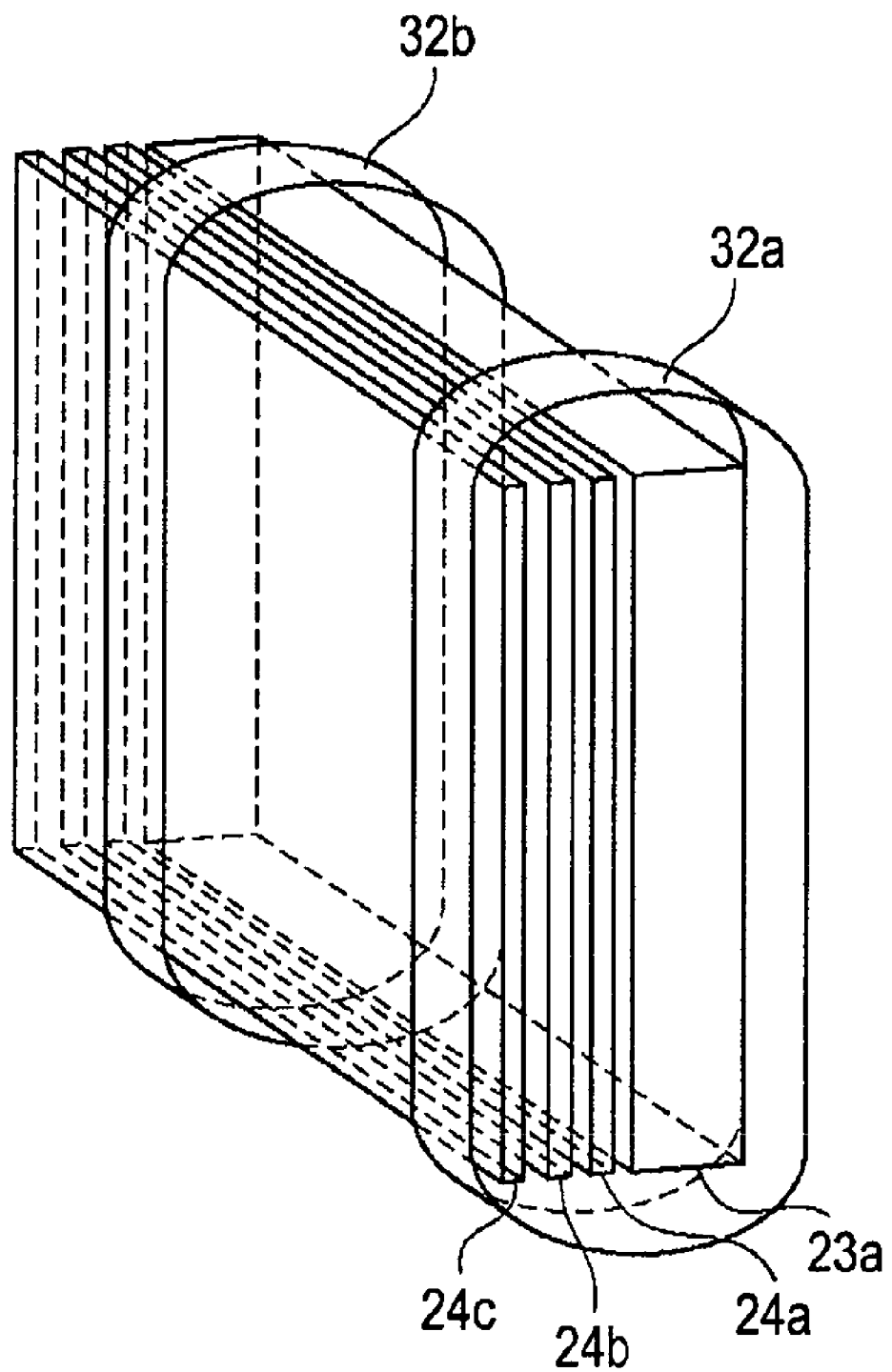
FIG. 28 is a perspective view showing a configuration example of an optical element covering member according to an eighth embodiment of the present invention.

FIG. 28 shows a configuration example of an optical element covering member according to the eighth embodiment of the present invention. As shown in FIG. 28, the principal surface of the optical element stack 21 is in the shape of a rectangle having, for example, a different aspect ratio. A first covering member 32a and a second covering member 32b are in the shape of a slender sheet and cover the individual end portions of the optical element stack 21 so as to integrate the optical element stack 21.

(9) Ninth Embodiment

The ninth embodiment corresponds to the eighth embodiment in which at least two grooves or holes for passing at least two covering members 22 are included. Preferably, the grooves or holes are disposed in the vicinity of end portions of the optical element stack 21. This is because deterioration of the optical characteristics due to disposition of the grooves or holes can be reduced.

Figure 29:
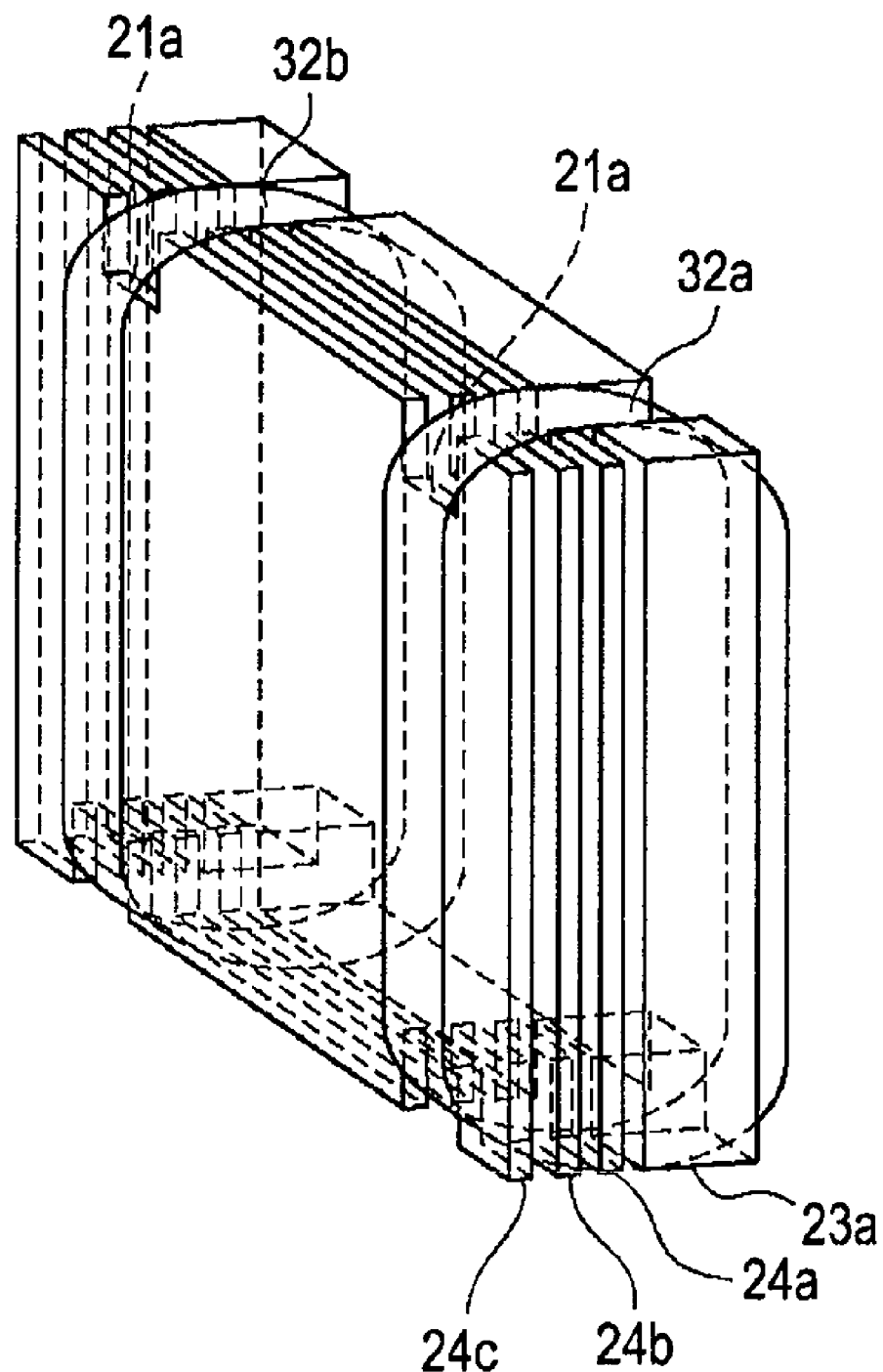
FIG. 29 is a perspective view showing a configuration example of an optical element stack according to a ninth embodiment of the present invention.

FIG. 29 shows a configuration example of an optical element stack according to the ninth embodiment of the present invention. As shown in FIG. 29, the principal surface of the optical element stack 21 is in the shape of a rectangle having, for example, a different aspect ratio. Grooves 21a and 21a are disposed in the vicinity of two end portions on the side of long sides of the optical element stack 21. A slender sheet-shaped first covering member 32a and a slender sheet-shaped second covering member 32b are allowed to pass through the grooves 21a and 21a, respectively, and cover the two end portions of the optical element stack 21 so as to integrate the optical element stack 21.

In the ninth embodiment, the grooves or holes for passing through the covering member 22 are disposed in the optical element stack 21. Therefore, an occurrence of sliding of the covering member 22 during production and transportation can be prevented. Therefore, the quality and the productivity of the liquid crystal display device can be improved.

(10) Tenth Embodiment

The tenth embodiment corresponds to the fourth embodiment in which an optical element stack 21 is sealed with a covering member 22. The covering member 22 is composed of at least one covering member 22, and end side portions of the covering member 22 are joined. Preferably, this junction is positioned on an end surface of the optical element stack 21. This is because deterioration of the optical characteristics of the optical element covering member 2 due to formation of the junction can be avoided.

Figure 30:
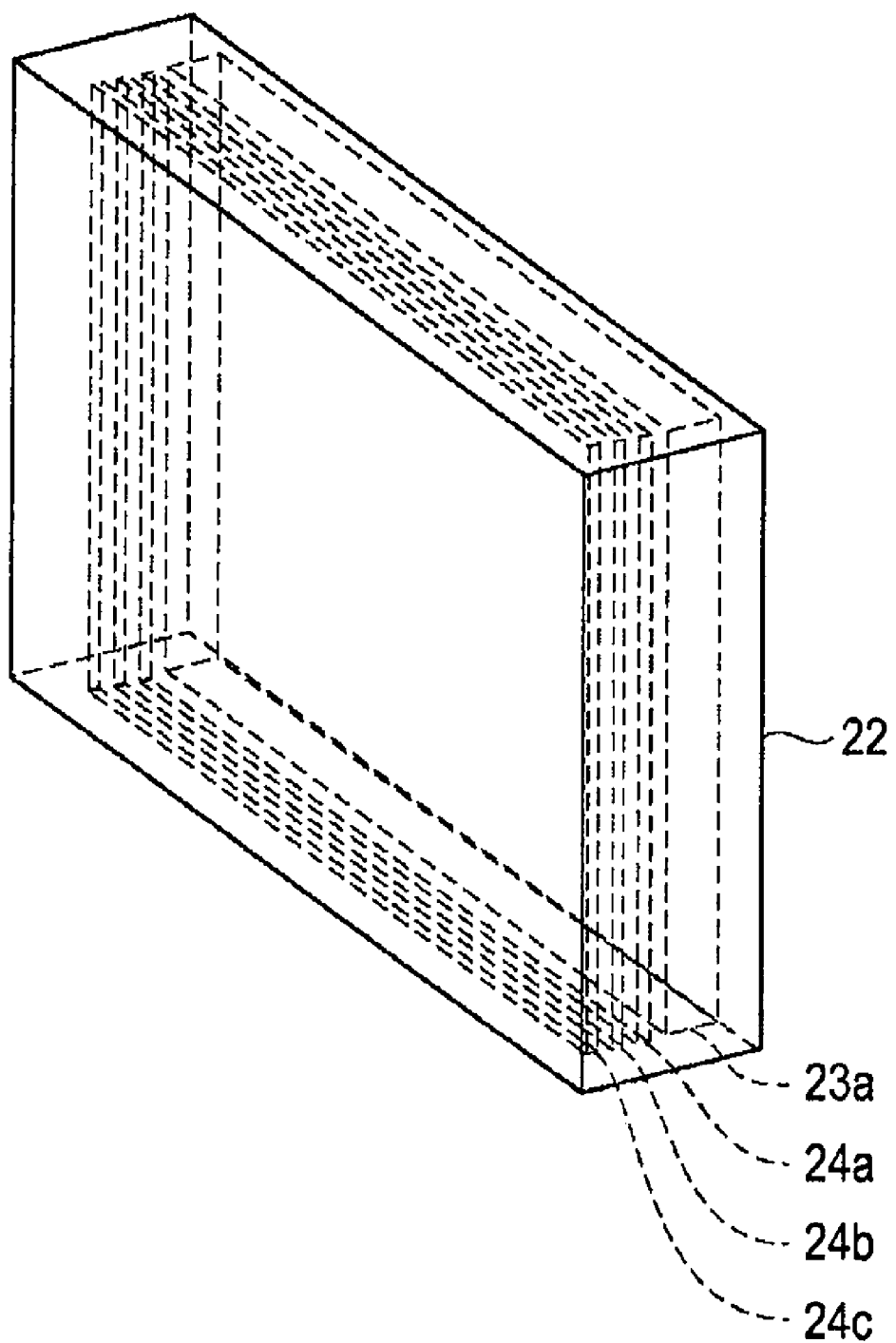
FIG. 30 is a perspective view showing a configuration example of an optical element stack according to a tenth embodiment of the present invention.

FIG. 30 shows a configuration example of the optical element stack according to the tenth embodiment of the present invention. As shown in FIG. 30, the principal surface of the optical element stack 21 is in the shape of a rectangle having, for example, a different aspect ratio, and all six directions thereof are covered with the covering member 22. The covering member 22 includes, for example, a first covering member and a second covering member, and each of the first covering member and the second covering member covers, for example, an incident surface and a transmission surface, respectively, of the optical element stack 21. The first covering member and the second covering member may have different physical properties.

An example of the method for manufacturing the optical element covering member 2 having the above-described configuration will be described below. At least one optical element 24 is stacked on a support medium 23. The stack of the optical elements 24 and the support medium 23 is sandwiched by the first covering member and the second covering member. Thereafter, the peripheral portions of the first covering member and the second covering member are joined. In this manner, the desired optical element covering member 2 is obtained.

(11) Eleventh Embodiment

The eleventh embodiment corresponds to the tenth embodiment in which an opening is disposed in at least one of the incident surface and the transmission surface of the covering member 22.

Figure 31:
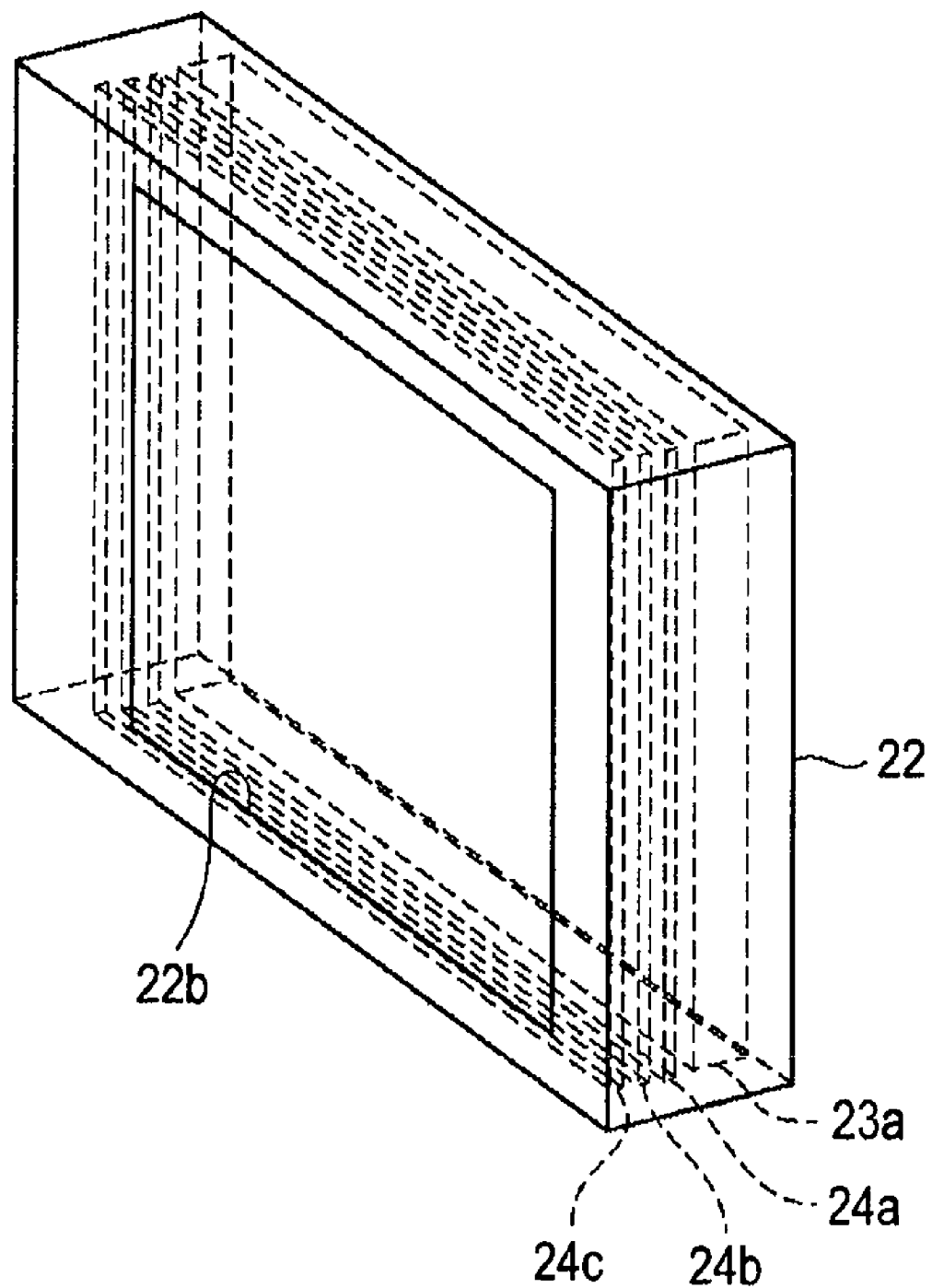
FIG. 31 is a perspective view showing a configuration example of an optical element covering member according to an eleventh embodiment of the present invention.

FIG. 31 shows a configuration example of an optical element covering member according to the eleventh embodiment of the present invention. As shown in FIG. 31, an opening 22b nearly in the same shape as the shape of the incident surface of the liquid crystal panel 3 is disposed in the incident surface of the covering member 22. Furthermore, for example, a reflective polarizer 24c is disposed on the transmission surface side of the optical element stack 21.

In the eleventh embodiment of the present invention, since the transmission surface of the optical element stack 21 is exposed, the light passed through the support medium 23 or the optical elements 24 disposed on the transmission side of the optical element covering member 2 can be entered into a liquid crystal panel 104 without changing the retardation. For example, the light polarized and separated by the reflective polarizer 24c disposed on the transmission side can be entered into a polarizer of the liquid crystal panel 104 without changing the retardation. Therefore, a decrease in luminance can be reduced.

(12) Twelfth Embodiment

The twelfth embodiment corresponds to the tenth embodiment in which at least one opening is disposed in the covering member 22. The opening is disposed in, for example, at least one of corner portions and side portions of the optical element stack 21.

Figure 32B:
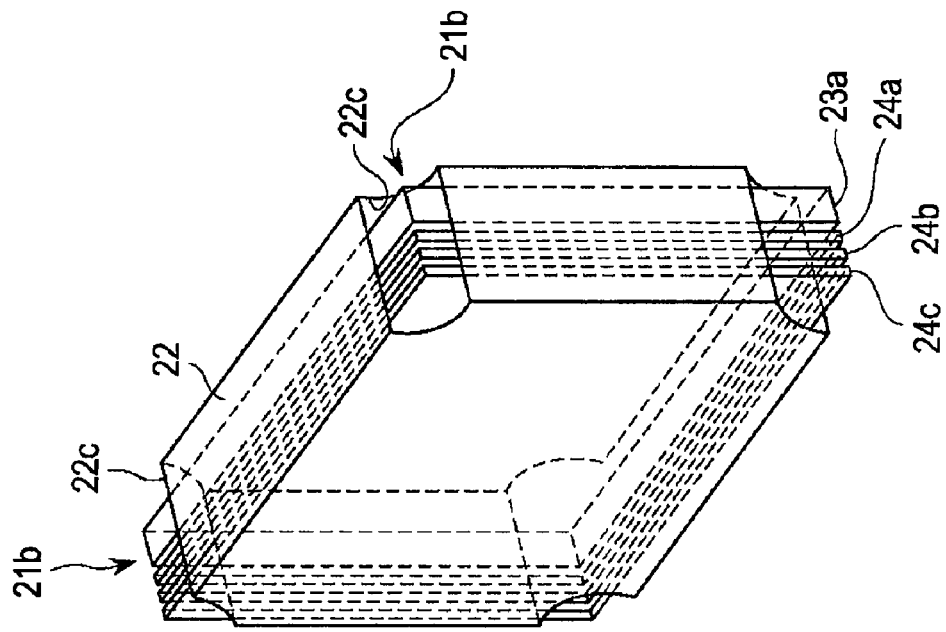
FIG. 32A and FIG. 32B are perspective views showing a first configuration example of an optical element covering member according to a twelfth embodiment of the present invention.
Figure 32A:
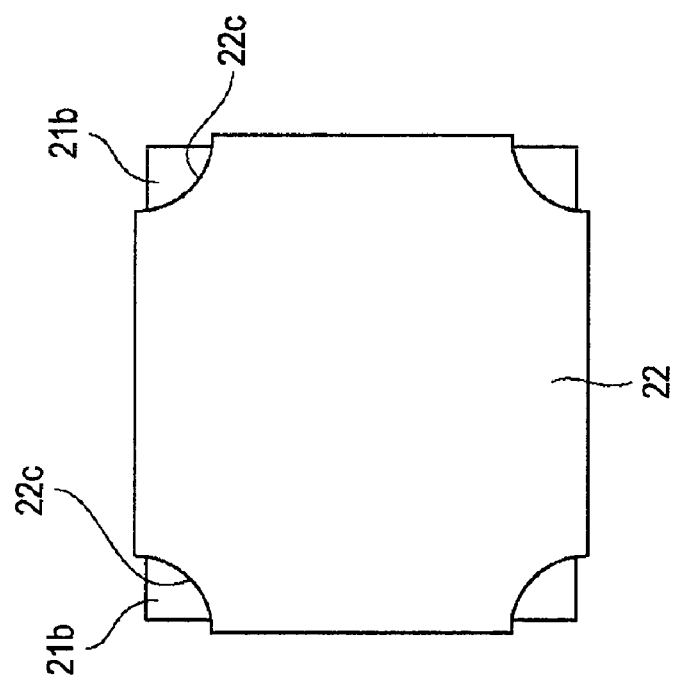

FIG. 32A and FIG. 32B show a first configuration example of an optical element covering member according to the twelfth embodiment of the present invention. As shown in FIG. 32A and FIG. 32B, in this first configuration example, the covering member 22 has an opening 22c at a position corresponding to, for example, a corner portion 21a of the optical element stack 21. Therefore, a corner portion 21b of the optical element stack 21 is exposed at the covering member 22.

Figure 33B:
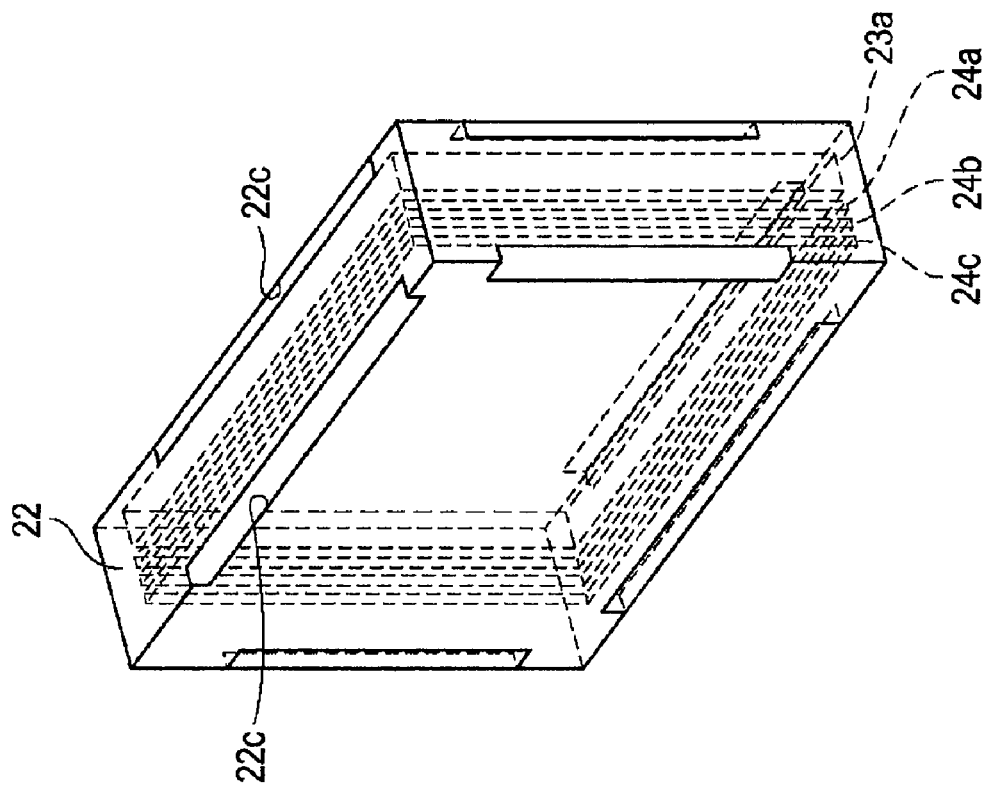
FIG. 33A and FIG. 33B are perspective views showing a second configuration example of an optical element covering member according to the twelfth embodiment of the present invention.
Figure 33A:
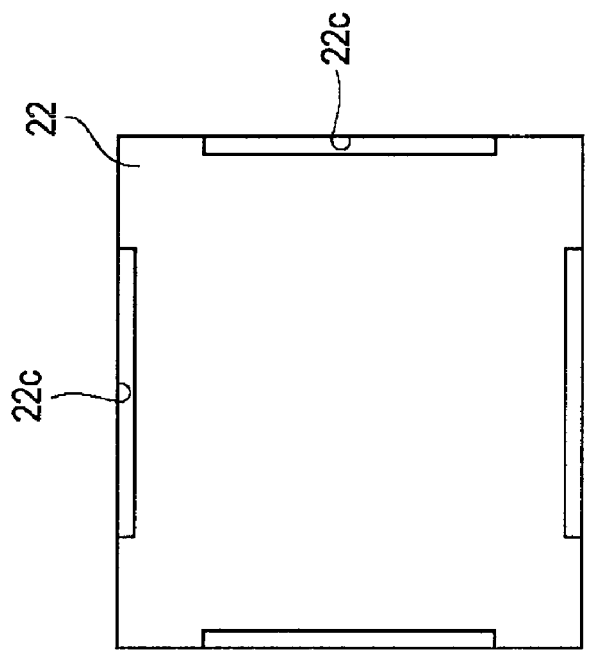

FIG. 33A and FIG. 33B show a second configuration example of the optical element covering member according to the twelfth embodiment of the present invention. As shown in FIG. 33A and FIG. 33B, in this second configuration example, the covering member 22 has opening portions 22c at positions corresponding to, for example, side portions of the optical element stack 21. This opening portion 22c is in the shape of a slit, for example. Therefore, side portions of the optical element stack 21 are exposed at the covering member 22.

In the twelfth embodiment, the covering member 22 is provided with the opening, and the side portion or the corner portion of the optical element stack 21 is exposed at the opening. Consequently, breakage of the covering member 22 due to the side portion or the corner portion of the optical element stack 21 during production and transportation of the optical element covering member 2 can be prevented.

(13) Thirteenth Embodiment

The thirteenth embodiment corresponds to the fourth embodiment in which the covering member 22 is joined to at least one of a support medium 23 and at least one optical element 24 covered by the covering member 22. Examples of joining methods include bonding and the like by adhesives and fusion. Examples of bonding methods by adhesives include a hot melt type bonding method, a thermosetting type bonding method, a pressure sensitive (adhesion) type bonding method, an energy line curing type bonding method, and a hydration type bonding method. Examples of bonding methods by fusion include heat fusion, ultrasonic fusion, and laser fusion.

Figure 34A:
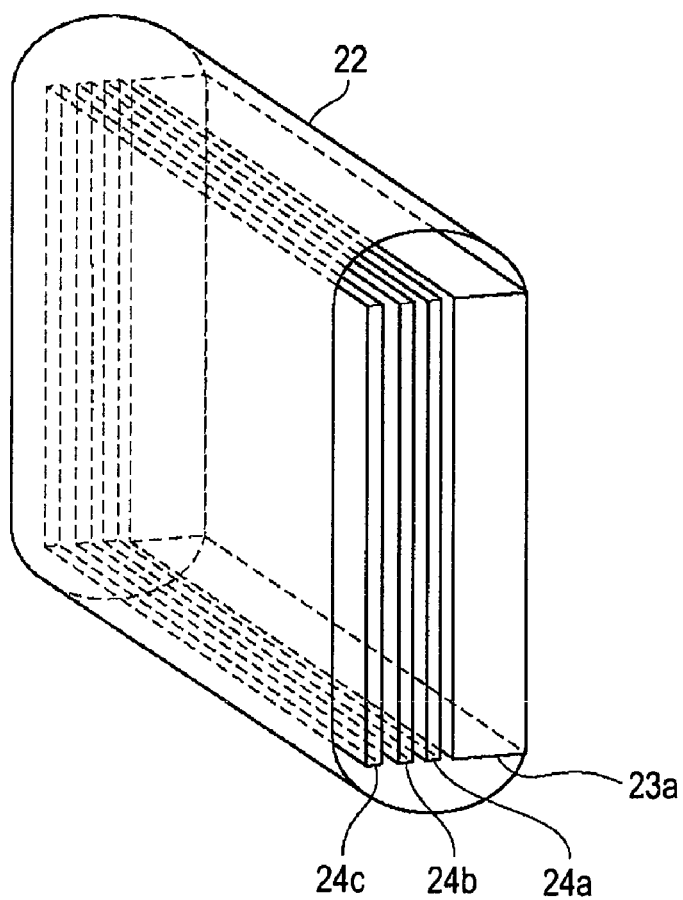
FIG. 34A and FIG. 34B are perspective views showing a first configuration example of an optical element covering member according to a thirteenth embodiment of the present invention.
Figure 34B:
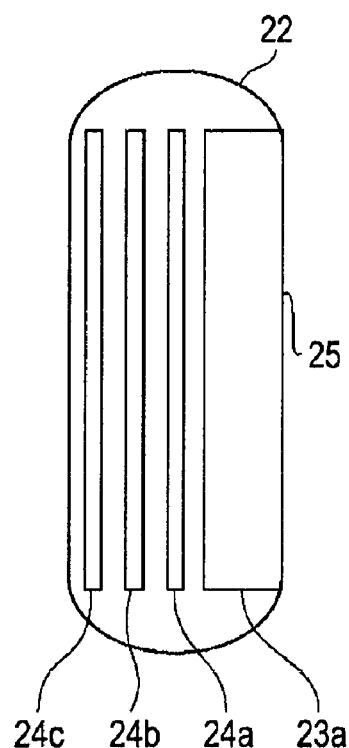

FIG. 34A and FIG. 34B show a first configuration example of an optical element covering member according to the thirteenth embodiment of the present invention. In this first configuration example, a junction 25 is disposed on the incident surface side of the optical element covering member 2. The junction 25 is formed by joining an inside surface of the covering member 22 and a part of or all the incident surface of a diffusion plate 23a serving as a support medium. The covering member 22 and the diffusion plate 23a are integrated by this junction 25.

Figure 35A:
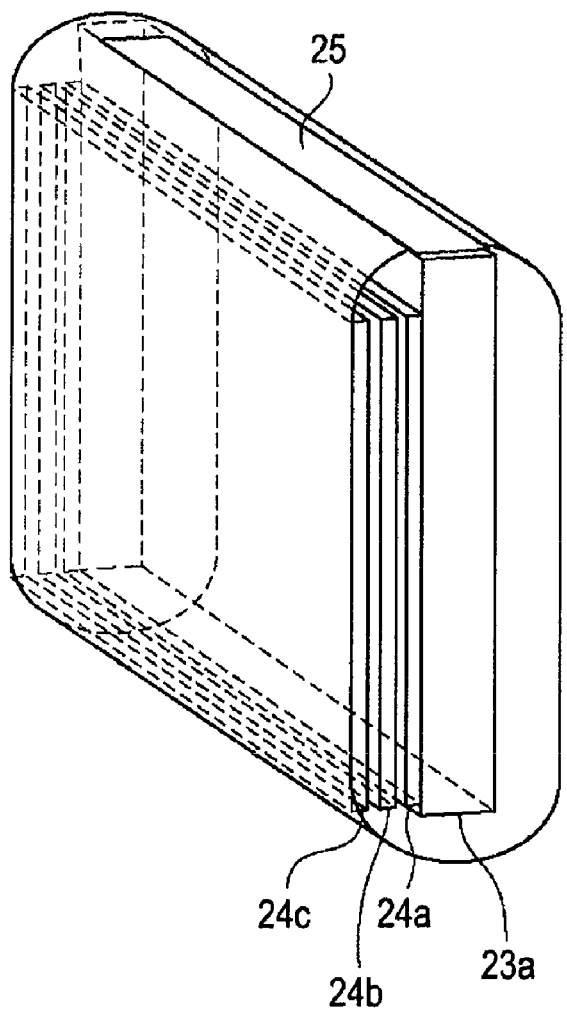
FIG. 35A and FIG. 35B are perspective views showing a second configuration example of an optical element covering member according to the thirteenth embodiment of the present invention.
Figure 35B:
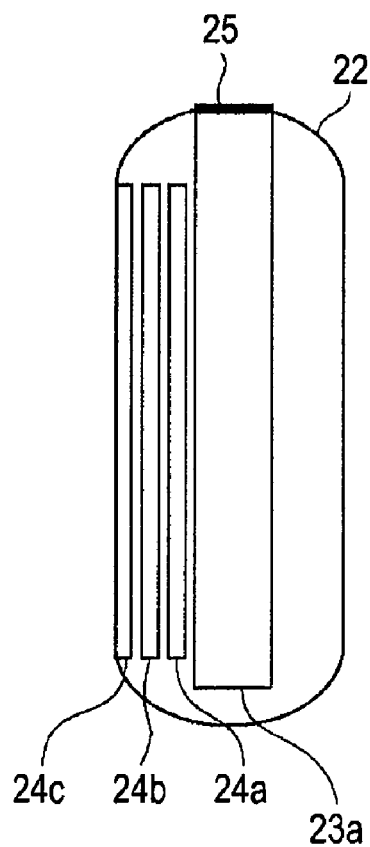

FIG. 35A and FIG. 35B show a second configuration example of the optical element covering member according to the thirteenth embodiment of the present invention. In this second configuration example, a junction 25 is disposed on an end surface of the optical element covering member 2. The junction 25 is formed by joining an inside surface of the covering member 22 and a part of or all the end surface of the diffusion plate 23a serving as a support medium.

(14) Fourteenth Embodiment

The fourteenth embodiment corresponds to the fourth embodiment in which a convex surface or a concave surface is provided on at least one of the support medium 23 and the optical element 24. It is preferable that the convex surface or the concave surface is provided to the member having the largest thickness among the support medium 23 and the optical element 24 and, for example, is provided to the support medium 23, e.g., a transparent plate or a diffusion plate. The convex surface and the concave surface of the support medium 23 and the optical element 24 are provided to, for example, at least one of the incident surface and the transmission surface. The convex surface and the concave surface may be combined. Each of the convex surface or the concave surface is a convexly or concavely curved surface having a curvature in, for example, at least one of a longitudinal direction (vertical direction) and a transverse direction (horizontal direction). Examples of such curved surfaces include a paraboloid, a cylindrical surface, a hyperboloid, an ellipsoid, a quartic surface, and a free-form surface.

Figure 36:
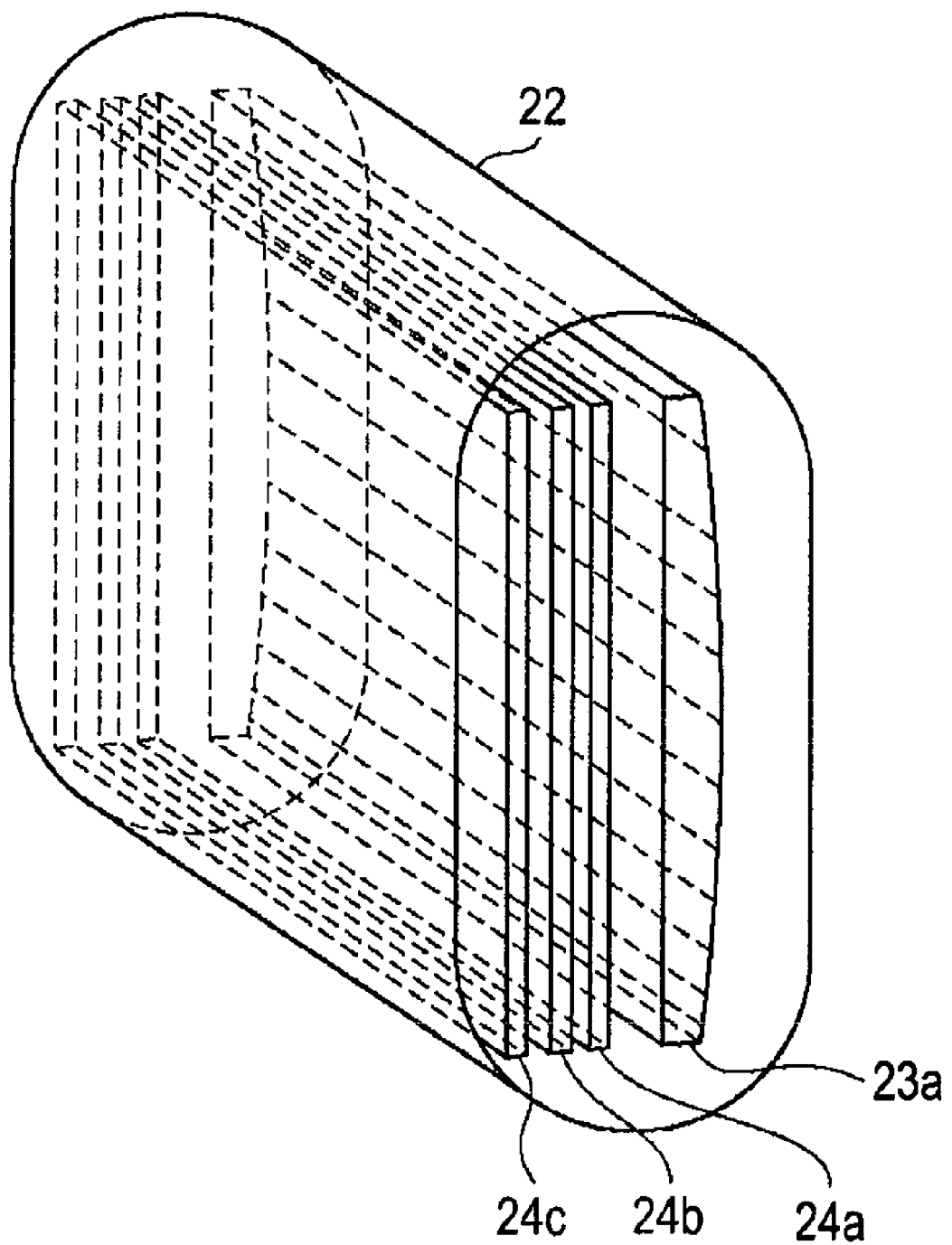
FIG. 36 is a perspective view showing a first configuration example of an optical element covering member according to a fourteenth embodiment of the present invention.

FIG. 36 shows a first configuration example of an optical element covering member according to the fourteenth embodiment of the present invention. As shown in FIG. 36, in this first configuration example, the incident surface of the diffusion plate 23a serving as a support medium is a convexly curved surface, for example. This convexly curved surface is a cylindrical surface having a curvature in the longitudinal direction (vertical direction), for example.

Figure 37:
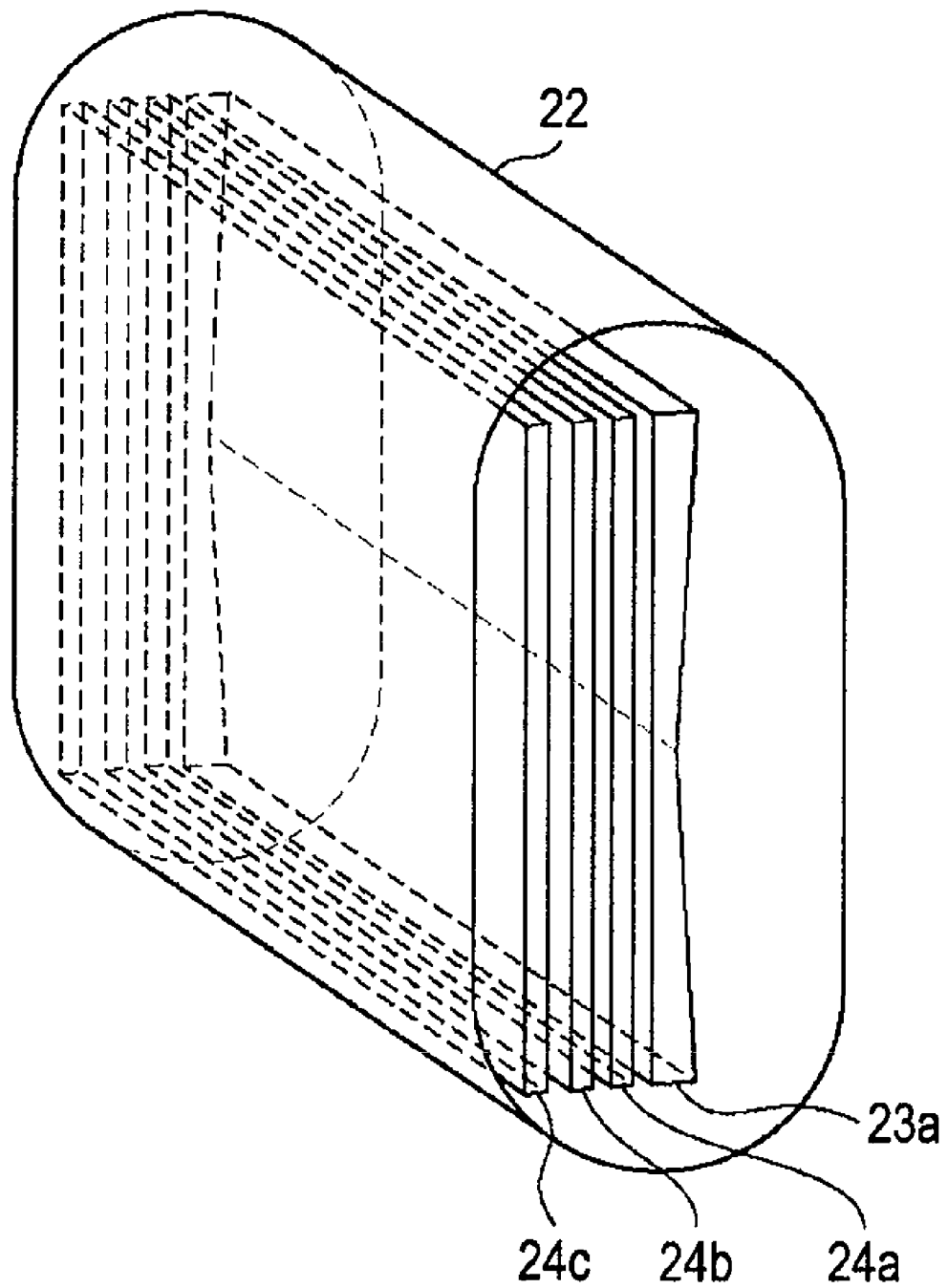
FIG. 37 is a perspective view showing a second configuration example of an optical element covering member according to the fourteenth embodiment of the present invention.

FIG. 37 shows a second configuration example of the optical element covering member according to the fourteenth embodiment of the present invention. As shown in FIG. 37, in this second configuration example, the incident surface of the diffusion plate 23a serving as a support medium is a concavely curved surface, for example. This concavely curved surface is a cylindrical surface having a curvature in the longitudinal direction (vertical direction), for example.

(15) Fifteenth Embodiment

The fifteenth embodiment corresponds to the fourth embodiment in which a warp is provided to at least one of the support medium 23 and the optical element 24. It is preferable that the warp is provided to the member having the largest thickness among the support medium 23 and the optical element 24 and, for example, is provided to the support medium 23, e.g., a transparent plate or a diffusion plate. The warp of the support medium 23 and the optical element 24 is provided in such a way as to protrude the incident surface side or the transmission surface side, for example.

Figure 38:
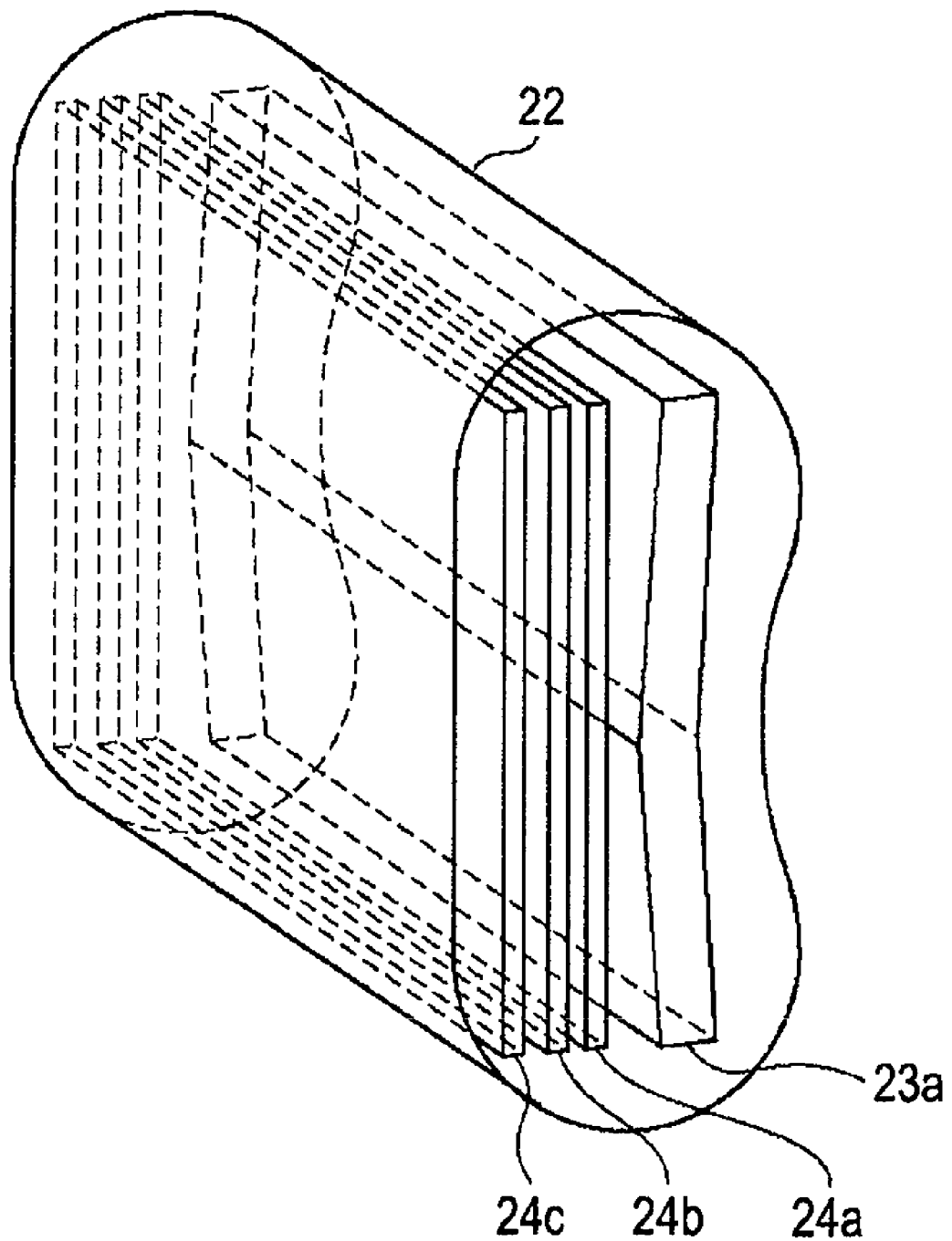
FIG. 38 is a perspective view showing a configuration example of an optical element covering member according to a fifteenth embodiment of the present invention.

FIG. 38 shows a configuration example of an optical element covering member according to the fifteenth embodiment of the present invention. As shown in FIG. 38, the diffusion plate 23a serving as a support medium is provided with a warp. For example, this warp is provided in such a way as to protrude the incident surface side of the diffusion plate 23. For example, the incident surface and the transmission surface of the diffusion plate 23a have predetermined curvatures in the longitudinal direction (vertical direction) and an infinite curvature in the transverse direction (horizontal direction).

(16) Sixteenth Embodiment

The sixteenth embodiment corresponds to the fourth embodiment in which a corner portion of at least one of the support medium 23 and the optical element 24 is allowed to take the shape of a curved surface, an inclined surface, or a composite shape of combination thereof. That is, an end surface of at least one of the support medium 23 and the optical element 24 is allowed to take the shape of a curved surface, a polygon, or a composite shape of combination thereof. It is preferable that the above-described shape is provided to the member having the largest thickness among the support medium 23 and the optical element 24 and, for example, is provided to the support medium 23, e.g., a transparent plate or a diffusion plate. The above-described shape is provided to, for example, a part of or all interface portions between the principal surface and end surfaces, and preferably is provided to the interface portion in contact with the covering member 22. The curved surface provided to this interface portion is, for example, an R-face and the inclined surface provided to the interface portion is, for example, a C-face.

Figure 39:
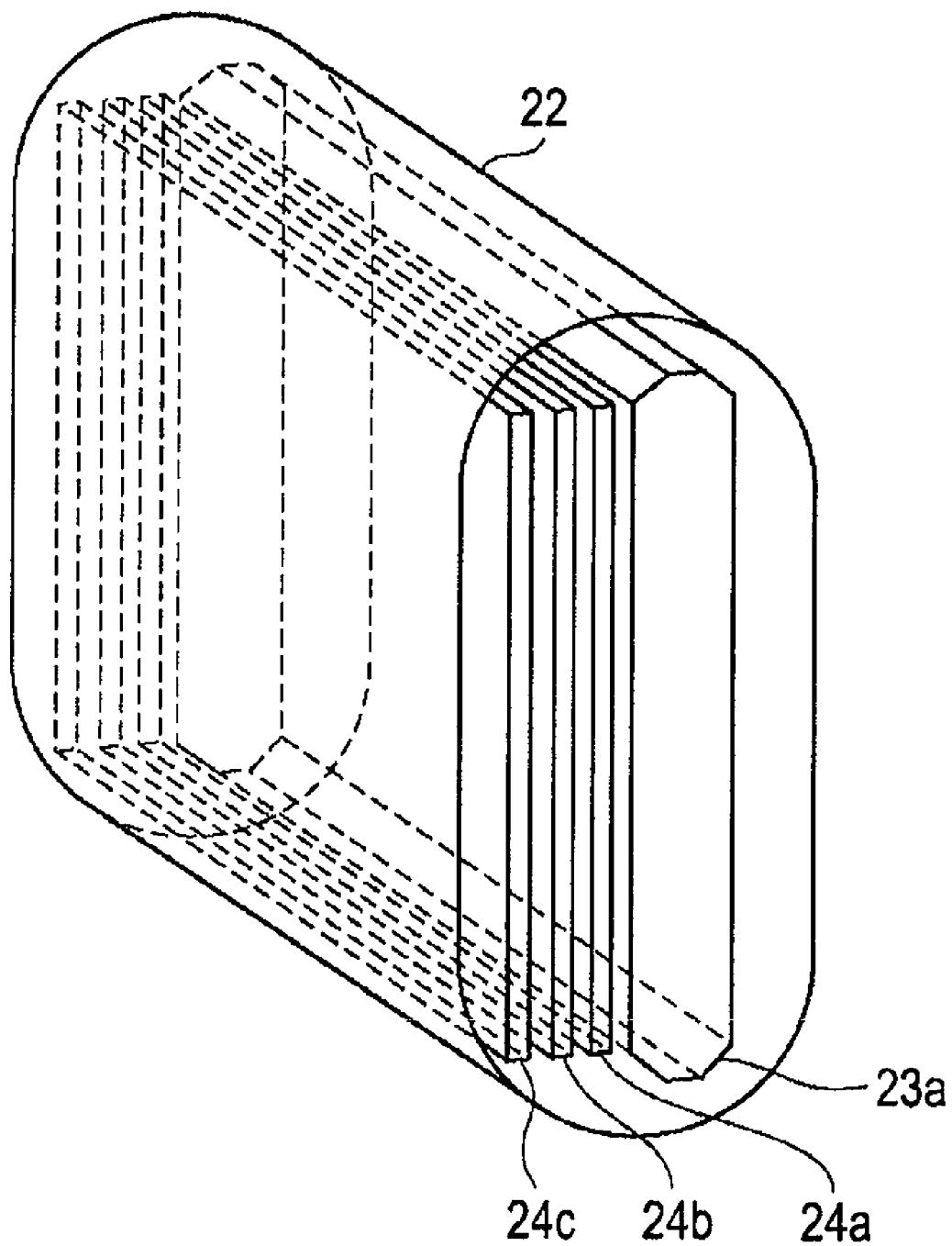
FIG. 39 is a perspective view showing a configuration example of an optical element covering member according to a sixteenth embodiment of the present invention.

FIG. 39 shows a configuration example of an optical element covering member according to the sixteenth embodiment of the present invention. As shown in FIG. 39, in this configuration example, among the interface portions of individual surfaces of the diffusion plate 23a serving as a support medium, the interface in contact with the covering member 22 is provided with an inclined surface, e.g., a C-face. That is, the cross-section in a thickness direction of the end portion of the diffusion plate 23a is in the shape of a trapezoid, for example.

(17) Seventeenth Embodiment

The seventeenth embodiment corresponds to the fourth embodiment in which a taper is provided to an end surface of at least one of the support medium 23 and the optical element 24. It is preferable that among the support medium 23 and at least one optical element 24, the member disposed on the incident surface side and/or the transmission surface side is provided with the taper. For example, the taper is provided to a part of or all end surfaces between the incident surface and the transmission surface, and preferably is provided to the end surface covered with the covering member 22.

Figure 40:
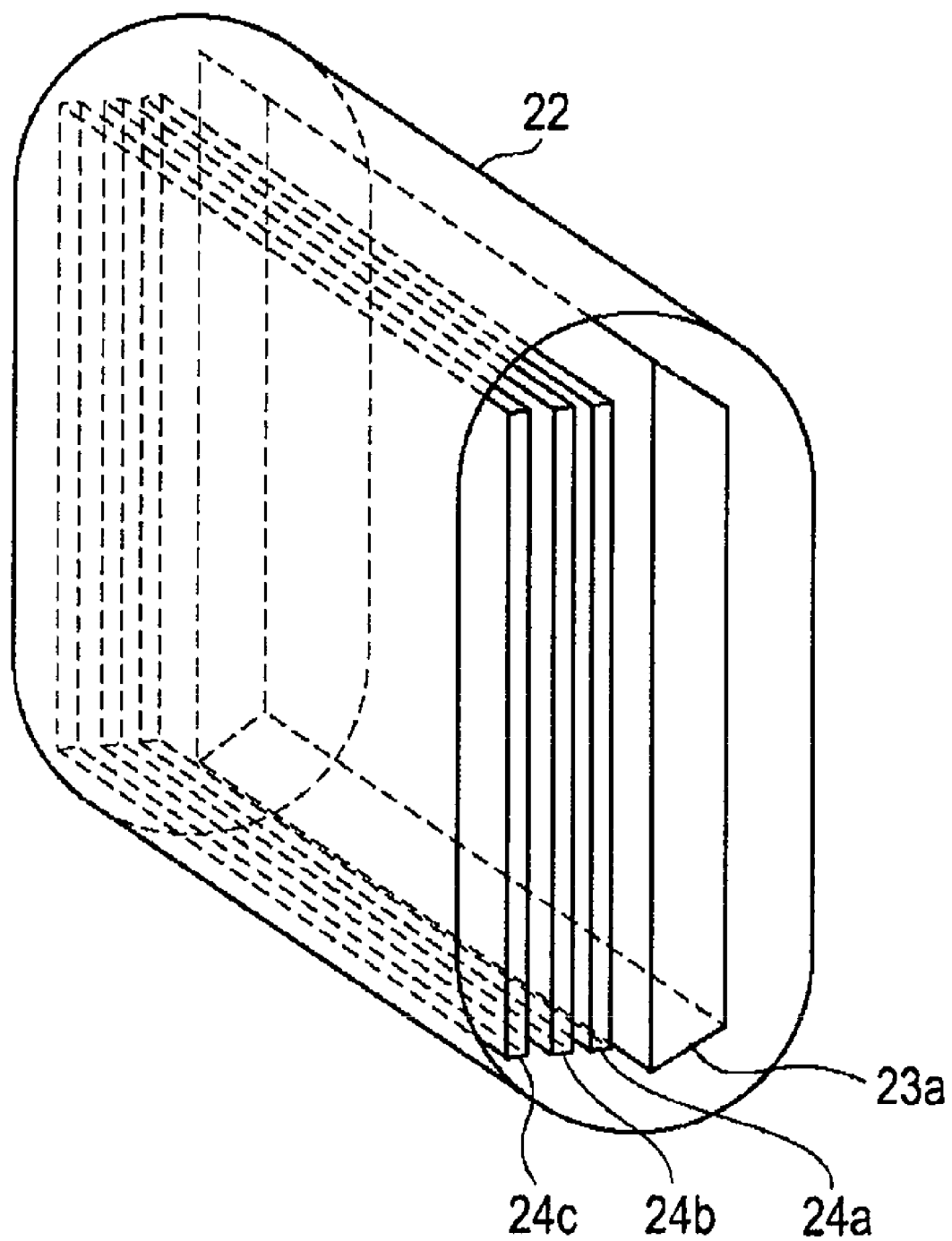
FIG. 40 is a perspective view showing a configuration example of an optical element covering member according to a seventeenth embodiment of the present invention.

FIG. 40 shows a configuration example of the optical element covering member according to the seventeenth embodiment of the present invention. As shown in FIG. 40, the end surface of the diffusion plate 23a which is disposed on the incident surface side and which serves as a support medium is provided with a taper. This taper is provided to an end surface covered with the covering member 22 among the end surfaces of the diffusion plate 23a.

(18) Eighteenth Embodiment

The eighteenth embodiment corresponds to the fourth embodiment in which the support medium 23 is provided with a storage portion 23b for storing at least one optical element 24. This storage portion 23b is provided to at least one of the incident surface and the transmission surface of the support medium 23. A frame portion 23c is disposed on a part of or all the peripheral portion of the incident surface or the transmission surface of the support medium 23, and the region surrounded by this frame portion 23c serves as the storage portion 23b. It is enough that the frame portion 23c can regulate the position of the optical element 24. The frame portion 23c may be a protrusion in which the peripheral portion of the incident surface or the transmission surface is partly protruded.

Figure 41A:
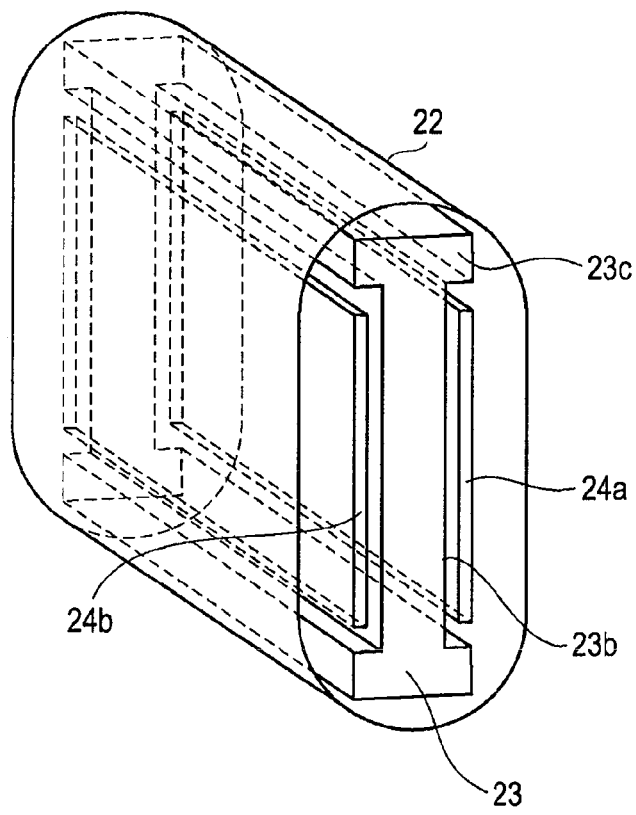
FIG. 41A and FIG. 41B are perspective views showing a configuration example of an optical element covering member according to an eighteenth embodiment of the present invention.
Figure 41B:
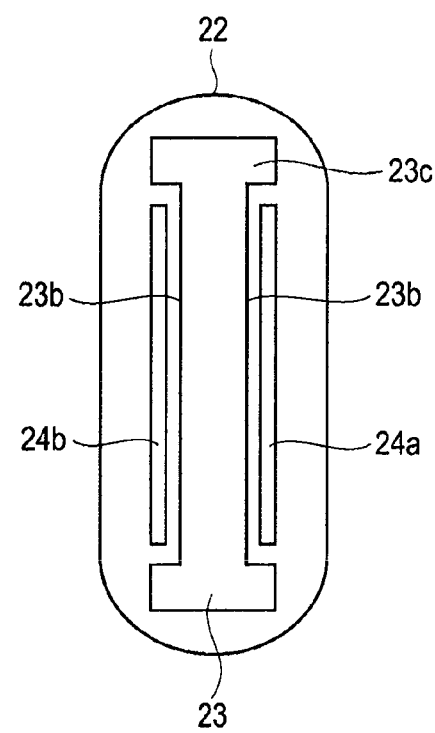

FIG. 41A and FIG. 41B show a configuration example of the optical element covering member according to the eighteenth embodiment of the present invention. As shown in FIG. 41A and FIG. 41B, the support medium 23 stores optical elements 24 in, for example, both the incident surface and the transmission surface of the support medium 23. Specifically, for example, the support medium 23 stores a diffusion film 24a in the storage portion 23b of the incident surface and stores a lens film 24b in the storage portion 23b of the transmission surface. The incident surface and the transmission surface of the support medium 23 are in the shapes of rectangles having, for example, different aspect ratios. The frame portion 23c is disposed along opposite short sides or long sides of the incident surface and the transmission surface. The position of the optical element 24 is regulated by this frame portion 23c.

(19) Nineteenth Embodiment

The nineteenth embodiment corresponds to the eighteenth embodiment in which a holding portion for holding the peripheral portion of the optical element 24 stored in the storage portion 23b is further provided. This holding portion is provided to at least one of the incident surface and the transmission surface of the support medium 23.

Figure 42A:
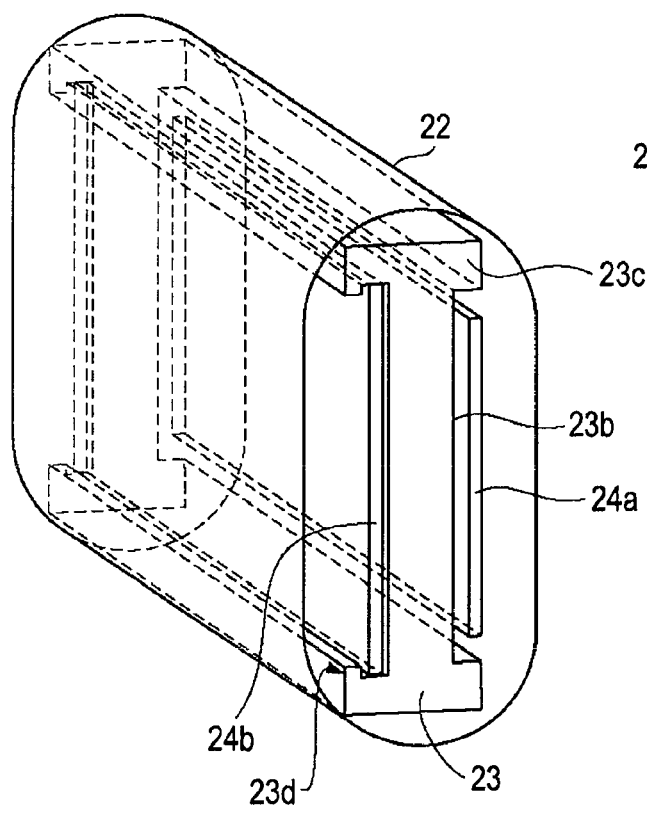
FIG. 42A and FIG. 42B are perspective views showing a configuration example of an optical element covering member according to a nineteenth embodiment of the present invention.
Figure 42B:
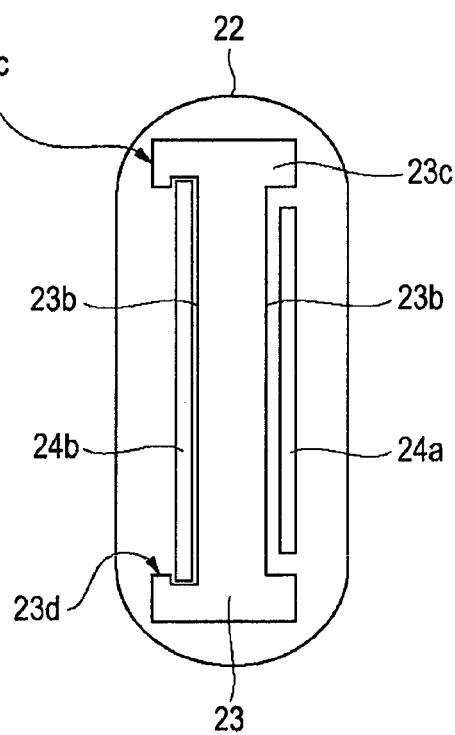

FIG. 42A and FIG. 42B show a configuration example of an optical element covering member according to the nineteenth embodiment of the present invention. As shown in FIG. 42A and FIG. 42B, the frame portion 23c on the incident surface side is provided with a holding portion 23d which is parallel to the incident surface and which extends from the end of the frame portion 23c toward the inside of the incident surface. The peripheral portion of the optical element 24 stored in the storage portion 23b is held by this holding portion 23d.

(20) Twentieth Embodiment

The twentieth embodiment corresponds to the fourth embodiment in which a part of or all the at least one optical element 2 is disposed outside the optical element covering member 2. The optical element 24 outside the optical element covering member 2 is disposed, for example, between the optical element covering member 2 and the liquid crystal panel 3 and/or between the optical element covering member 2 and the illumination device 1. The optical element 24 disposed outside the optical element covering member 2 may be joined to, for example, the incident surface or the transmission surface of the optical element covering member with an adhesive. As for the optical element 24 disposed outside the optical element covering member 2, for example, a light diffusion element, a light collection element, a reflective polarizer, a polarizer, or a light splitting element can be used.

Figure 43:
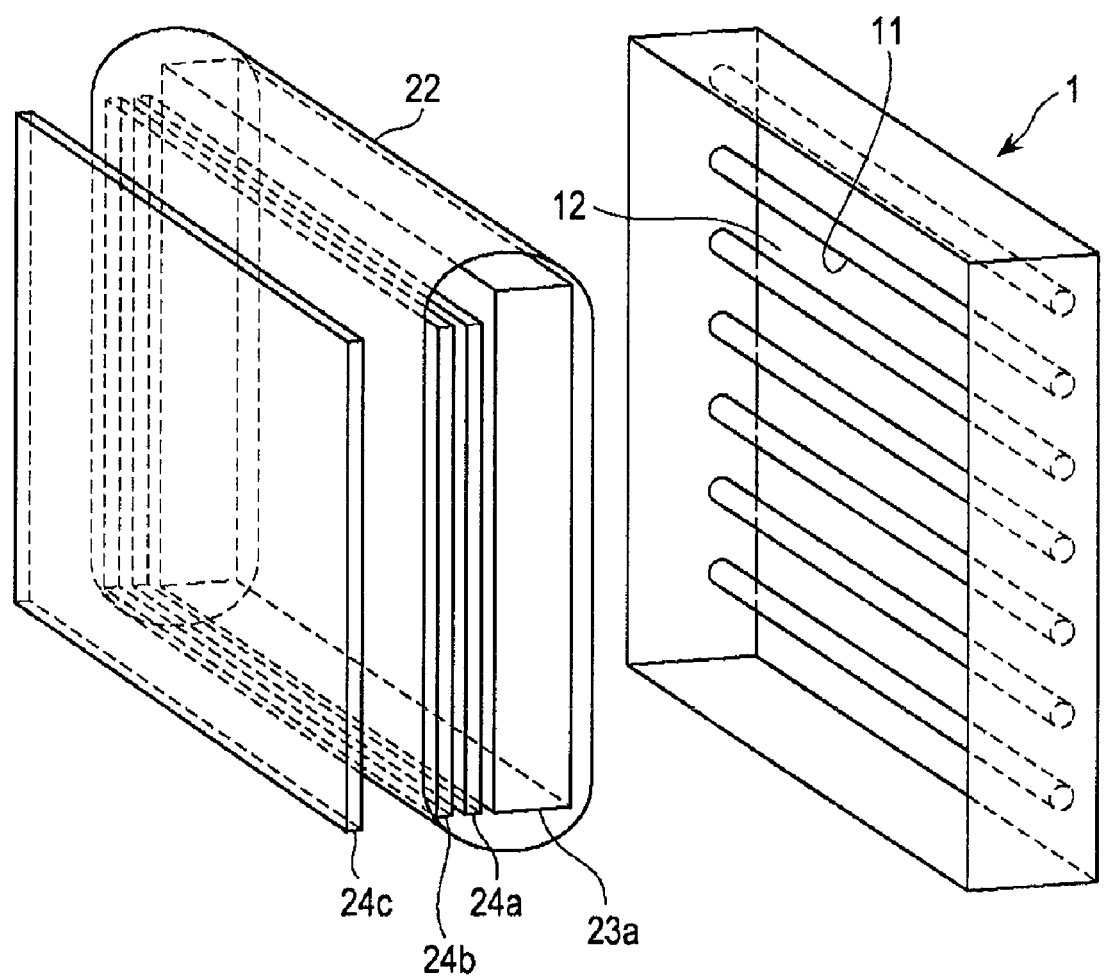
FIG. 43 is a perspective view showing a configuration example of a backlight according to a twentieth embodiment of the present invention.

FIG. 43 shows a configuration example of a backlight according to the twentieth embodiment of the present invention. As shown in FIG. 43, for example, the optical element covering member 2 and a reflective polarizer 24c serving as an optical element are disposed in that order from the illumination device 1 toward the liquid crystal panel 3. In the optical element covering member 2, a diffusion plate 23a, a diffusion film 24a, and a lens film 24b are covered with a covering member 22 so as to be integrated.

In the twentieth embodiment, since the optical element 24, e.g., a reflective polarizer, is disposed outside the optical element covering member 2, the light transmitted from the optical elements 24, e.g., the reflective polarizer, can be entered into the liquid crystal panel 3 without changing the retardation.

(21) Twenty-First Embodiment

The twenty-first embodiment corresponds to the fourth embodiment in which a surface structured member and an optical function are disposed on at least one of the inside surface and the outside surface of the covering member 22. This optical function is disposed on, for example, at least one of the incident surface side and the transmission surface side of the optical element covering member 2. The surface structured member and the optical function improve the characteristics of the light incident from the illumination device 1. As for the surface structured member, various lenses, e.g., a cylindrical lens, a prism lens, and a fly-eye lens, can be used. Furthermore, wobble may be applied to the surface structured members, e.g., the cylindrical lens and the prism lens. This surface structured member is formed by, for example, a melt-extrusion method or a thermal transfer method. As for the optical function, an ultraviolet protection function (UV cut function), an infrared protection function (IR cut function), or the like can be used.

Figure 44:
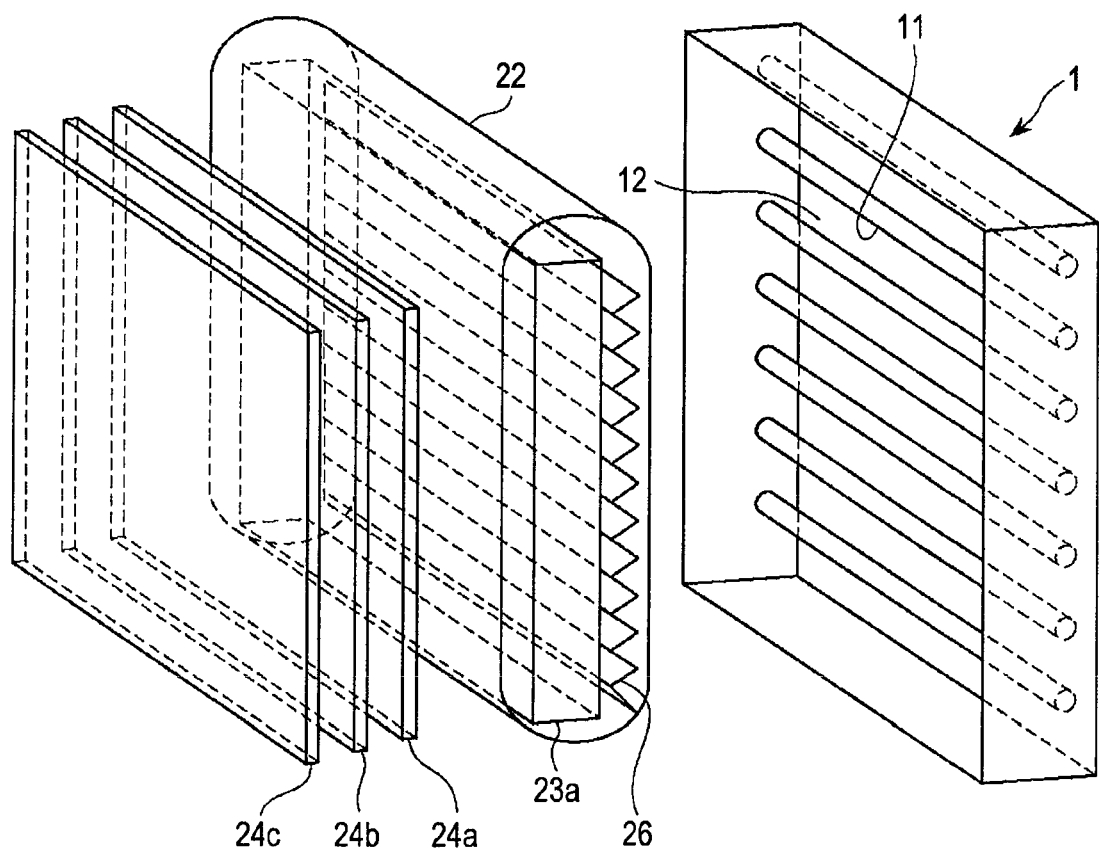
FIG. 44 is a perspective view showing a configuration example of a backlight according to a twenty-first embodiment of the present invention.

FIG. 44 shows a configuration example of a backlight according to the twenty-first embodiment of the present invention. As shown in FIG. 44, for example, a diffusion plate 23a, a diffusion film 24a, a lens film 24b, and a reflective polarizer 24c are disposed in that order from the illumination device 1 toward the liquid crystal panel 3. The diffusion plate 23a is covered with a covering member 22, and a surface structured member 26 having a irregularity-reducing function and the like is disposed on a portion on the incident side of the inside surface of the covering member.

(22) Twenty-Second Embodiment

The twenty-second embodiment corresponds to the fourth embodiment in which a reflection portion for reflecting the light transmitted from an end surface of the optical element covering member 2 is disposed on a part of or all the end surface the optical element covering member 2. The position for disposition of the reflection portion is, for example, at least one of the positions on an inside surface and an outside surface of the covering member 22, the positions between the covering member 22 and the optical element stack 21, and the positions on an end surface of the optical element stack 21. As for the reflection portion, for example, at least one type of inorganic multilayer reflection films, e.g., a metal reflection film, a metal oxide film, and a metal multilayer film; organic multilayer reflection films, e.g., a polymer multilayer film; polymer resin layers containing fillers; polymer resin layers containing holes; and reflection surface structured members can be used. Specifically, for example, white PET films containing fillers, e.g., titanium oxide, and bubbles can be used. As for the reflection surface structured members, for example, surface structured members nearly in the shape of a prism can be used.

Figure 45:
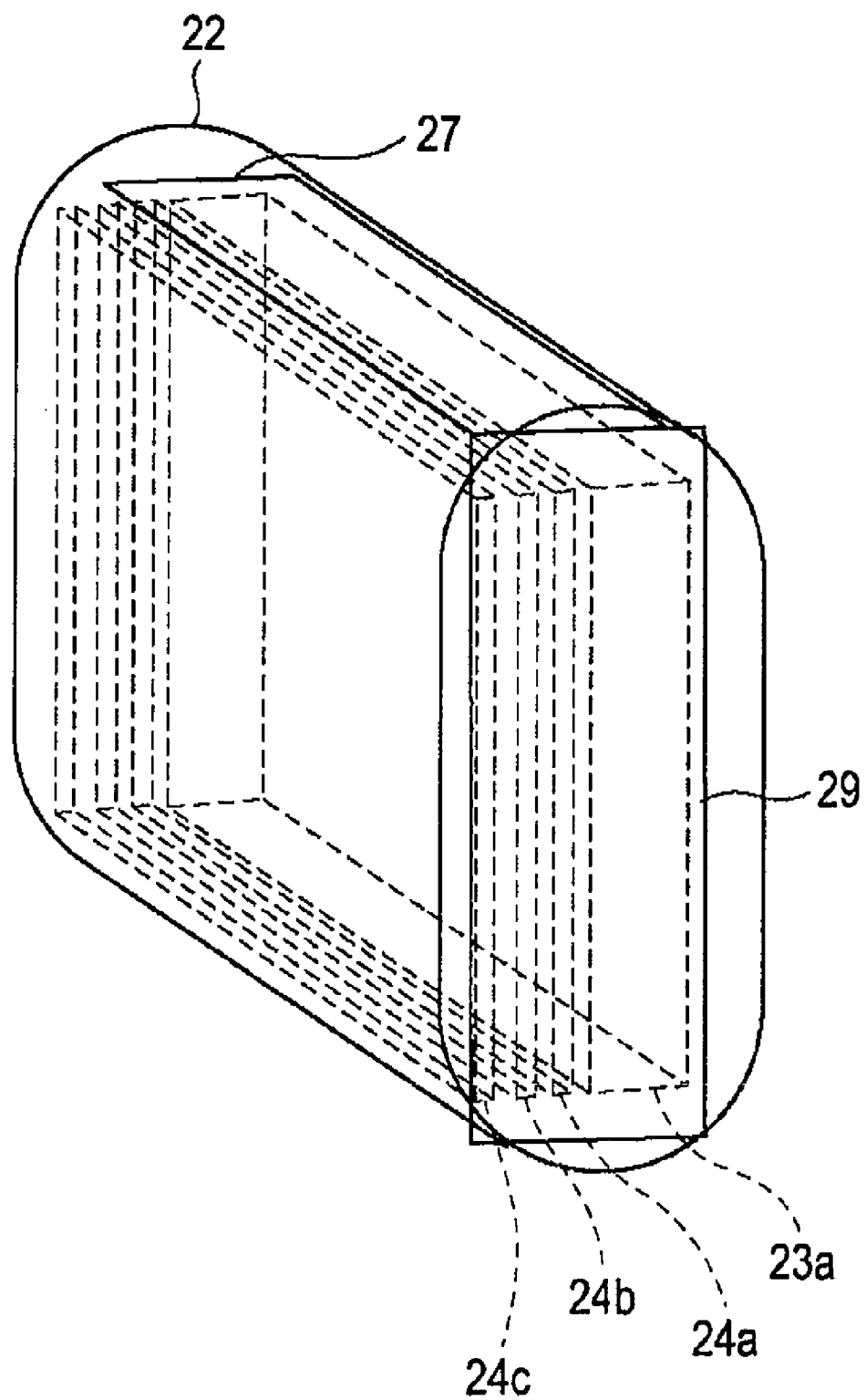
FIG. 45 is a perspective view showing a first configuration example of an optical element covering member according to a twenty-second embodiment of the present invention.

FIG. 45 shows a first configuration example of an optical element covering member according to the twenty-second embodiment of the present invention. As shown in FIG. 45, in the first configuration example, a reflection film, e.g., a white PET film, is disposed on the end surface of the optical element stack 21. This reflection film is joined to, for example, the end surface of the optical element stack 21 with an adhesive or the like.

Figure 46:
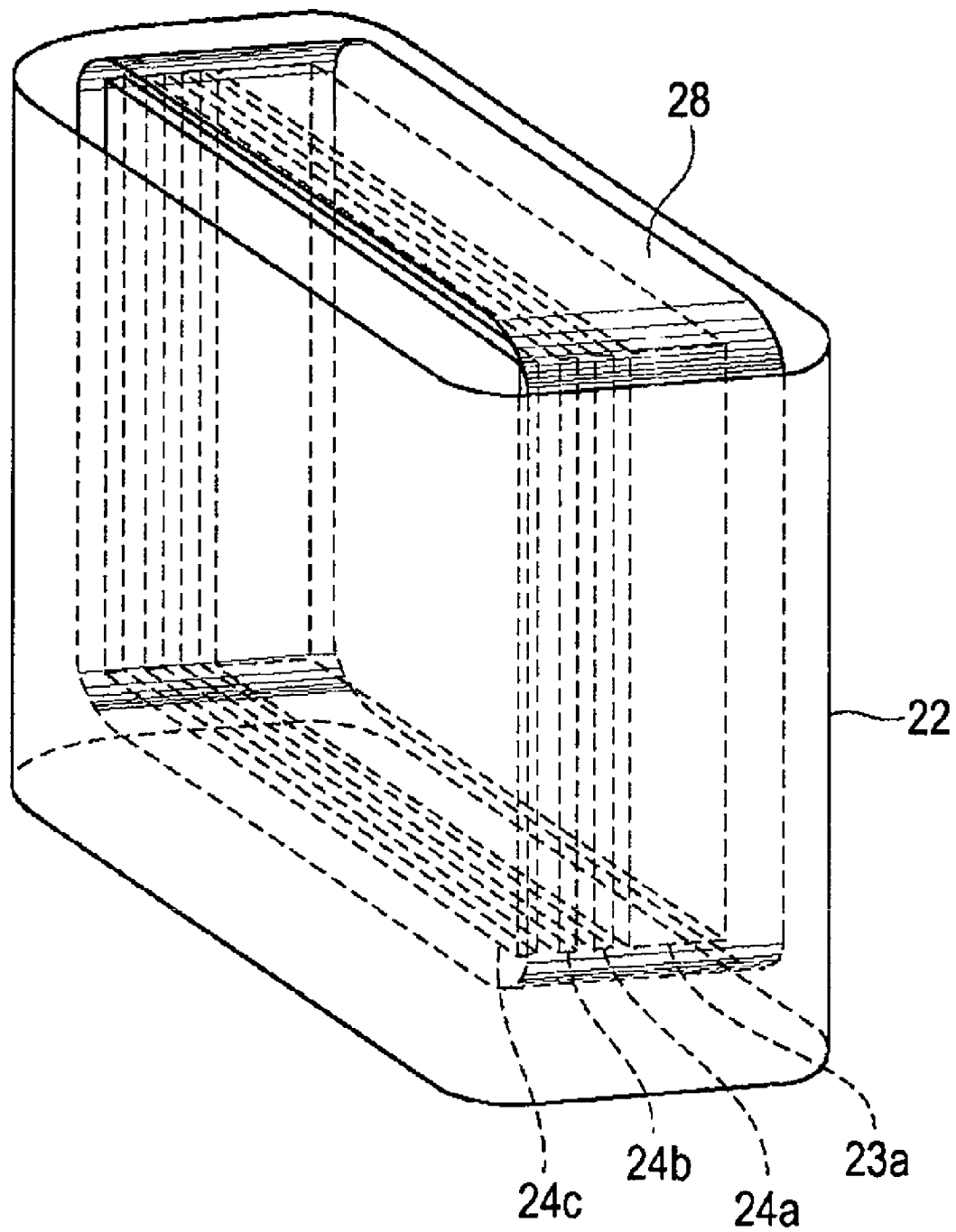
FIG. 46 is a perspective view showing a second configuration example of an optical element covering member according to the twenty-second embodiment of the present invention.

FIG. 46 shows a second configuration example of the optical element covering member according to the twenty-second embodiment of the present invention. As shown in FIG. 46, in the second configuration example, the end surface of the optical element stack 21 is covered with a reflection band 27. The reflection band 27 is a sheet-shaped reflection film, for example, and end portions in a longitudinal direction thereof are joined to each other. For example, methods for joining the covering member 22 in the fourth embodiment can be used as the joining method. For example, materials having the heat shrinkability can be used as the base material for the reflection band 27.

In the twenty-second embodiment, since the reflection portion is disposed on the end surface of the optical element covering member 2, the light from the illumination device 1 can be reflected at the end surface of the optical element covering member 2. Therefore, the light from the illumination device 1 can be used effectively.

(23) Twenty-Third Embodiment

In a liquid crystal display device according to the twenty-third embodiment, an edge type illumination device is used as the illumination device 1. This illumination device allows the light from a light source 11 disposed on the side of one end of a liquid crystal panel 3 to spread all over the liquid crystal panel through a light guide plate 13.

Figure 47:
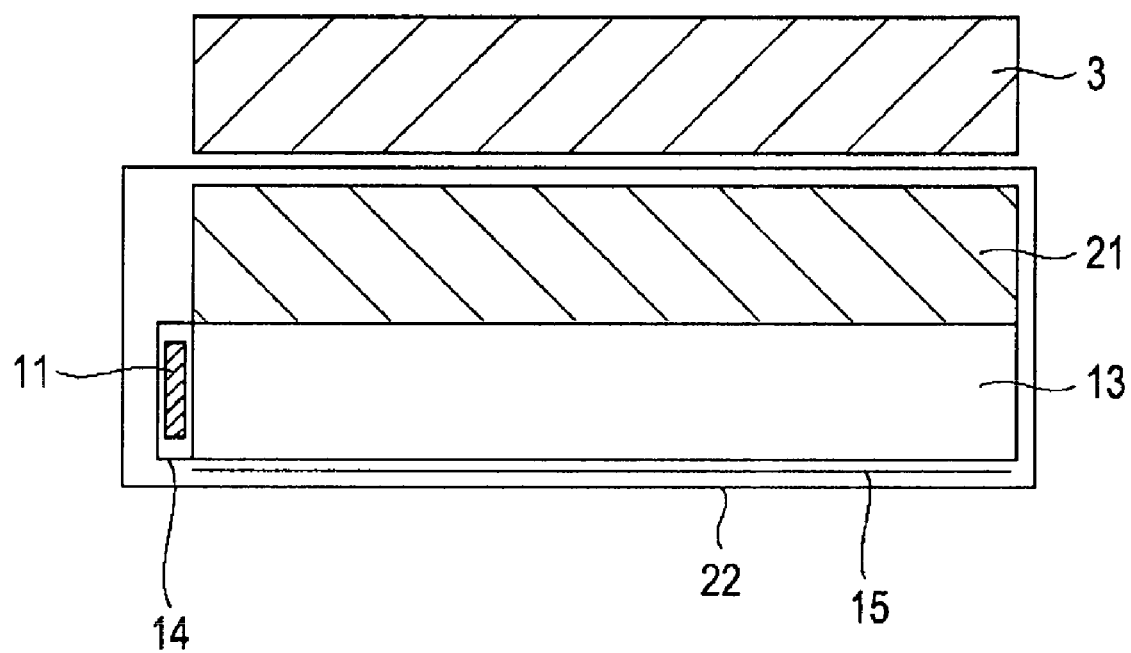
FIG. 47 is a schematic diagram showing a configuration example of a liquid crystal display device according to a twenty-third embodiment of the present invention.

FIG. 47 shows a configuration example of the liquid crystal display device according to the twenty-third embodiment of the present invention. As shown in FIG. 47, this liquid crystal display device includes the optical element covering member 2 for transmitting light and the liquid crystal panel 3 for displaying images on the basis of the light transmitted from the optical element covering member 2. As for the liquid crystal panel 3, for example, the same panel as that in the fourth embodiment can be used.

The optical element covering member 2 include the light guide plate 13, the light source 11 disposed on one end portion of the light guide plate 13, a lamp reflector 14 disposed on one end portion of the light guide plate 13 in such a way as to cover the light source 11, a reflection sheet 15 disposed at the back of the light guide plate 13, an optical element stack 21 disposed on the light guide plate 13, and a covering member 22 covering at least the reflection sheet 15, the light guide plate 13, and the optical element stack 21 so as to integrate these members.

The optical element stack 21 is constructed by stacking at least two optical elements. Specifically, for example, the optical element stack 21 is constructed by stacking a diffusion sheet, a prism sheet, a prism sheet, and a diffusion sheet in that order on the light guide plate 13. As for the covering member 22, for example, the same member as that in the fourth embodiment can be used.

The present invention will be specifically described below with reference to examples. However, the present invention is not limited to only these examples.

Example 1

Preparation of Transparent Covering Film

Regarding an olefinic shrink film serving as a covering film, a composition containing polypropylene/polyethylene-polypropylene system/polypropylene as a primary component was subjected to sequential biaxial drawing composed of vertical drawing and horizontal drawing by co-extrusion and a heat-fixing treatment was applied, so that a heat-shrinkable film having a thickness of 29 µm after molding was obtained.

(Evaluation of Heat Shrinkage Characteristic)

The covering film obtained as described above was cut into the size measuring 300 mm per side (300 mm×300 mm) with a metal straightedge. The amount of change due to heat shrinkage based on a treatment with a blow dryer at 100° C. for 10 minutes was measured. The results thereof are as described below. In the present example, the longitudinal axis direction is expressed as an MD (machine direction) direction and the width direction is expressed as a TD (transverse direction) direction.

MD direction: 12%
TD direction: 15%

(Optical Characteristics of Diffusion Function)

The optical characteristics of the covering film obtained as described above were checked. Haze Meter HM-150 produced by MURAKAMI COLOR RESEARCH LABORATORY was used for the measurement (haze value: JIS-K-7136, total light transmittance: based on JIS-K-7316). The results thereof are as described below.

Haze value: 6%
Total light transmittance: 91%

(Preparation of Optical Element Covering Member)

A diffusion plate (500 mm×890 mm×2 mm) containing polycarbonate as a primary component was prepared as a support medium, and a commercially available diffusion sheet (BS-912 produced by KEIWA Incorporated: 205 µm×498×888 mm) and a lens sheet (produced by Sony Corporation, polycarbonate resin, lens pitch 185 µm, hyperboloidal shape, size 450 µm×498×888 mm) were prepared. The diffusion plate, the diffusion sheet, the lens sheet, and the diffusion sheet were stacked in that order so as to prepare an optical element stack. The resulting optical element stack was placed on a covering film, and the covering film was further placed thereon. The periphery was joined by heat fusion and cutting was conducted by fusion in such a way that the total size became 540 mm×950 mm. Holes having a diameter of 0.5 mm were made in the end portion of the covering film at intervals of 50 mm.

The resulting optical element stack covered with the covering film was heated in the blow dryer heated to 100° C.

Cooling was conducted while air was exhausted through the holes in the end portion of the covering film in order to allow the covering film to shrink and adhere to the included optical element stack. Thereafter, excess air was exhausted by application of the pressure roller through sandwiching with rollers, so that the diffusion plate serving as a support medium was adhered to the diffusion sheet, the lens sheet, and the diffusion sheet serving as optical elements.

In this manner, an optical element covering member was obtained.

(Evaluation of Reliability)

In a preliminary experiment, the temperature of a diffusion plate surface between the diffusion plate incorporated in a backlight of a 40-inch liquid crystal television produced by Sony Corporation and CCFL serving as a light source was measured with a thermocouple. As a result, the temperature at the center portion of the diffusion plate surface was 63° C. Furthermore, the temperature at the center portion of the diffusion plate surface was measured in a constant temperature bath at 40° C., which was assumed to be an upper limit temperature in an actual operating environment, in a manner similar to that in the above-described measurement. As a result, the temperature at the center portion of the diffusion plate surface was 68° C.

In consideration of the above-described measurement results, the evaluation was conducted while the optical element covering member was held in the following simulated environment. That is, the optical element covering member was preserved in a high-temperature, dry environment at 70° C. and, thereafter, the amount of warp of the diffusion plate was measured with a metal straightedge. The results thereof are shown in Table 1.

(Evaluation By Mounting on TV)

Optical elements, e.g., a diffusion plate, were taken out of a 40-inch liquid crystal television produced by Sony Corporation. Instead, the optical element covering member was mounted, the resulting liquid crystal TV was lit on, and the luminance and the image quality were evaluated. The results thereof are shown in Table 1.

The luminance irregularity was evaluated on the basis of the following criteria.

Grade 5: front no irregularity, oblique no irregularity
Grade 4: front no irregularity, oblique irregularity can be observed slightly
Grade 3: front slight irregularity, oblique slight irregularity
Grade 2: front a little irregularity, oblique a little irregularity
Grade 1: front clear irregularity, oblique much irregularity Regarding the evaluation of luminance, the luminance was measured with CS-1000 produced by Konica Minolta Opto, Inc., and the evaluation was conducted on the basis of relative values with reference to the luminance in Comparative example 1 described below.

Comparative Example 1

Figure 48A:
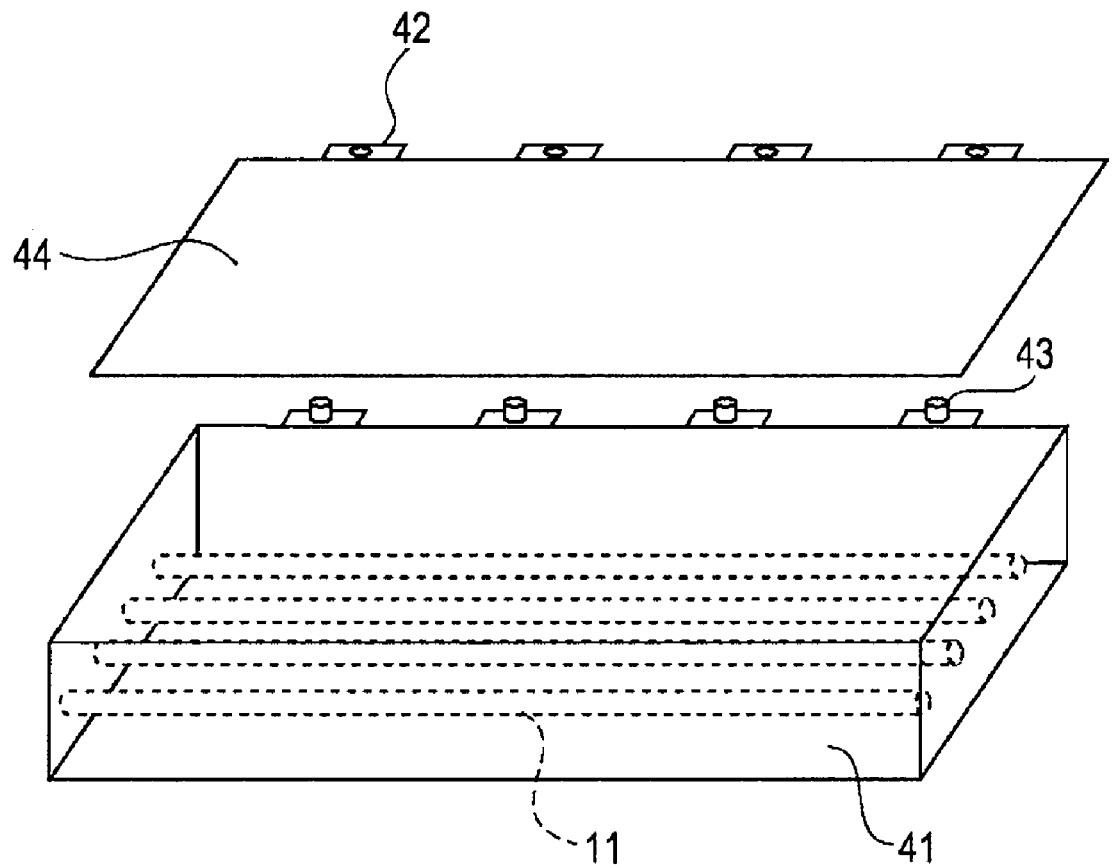
FIG. 48A and FIG. 48B are a perspective view and a magnified view showing the configuration of a backlight according to Comparative example 1.
Figure 48B:
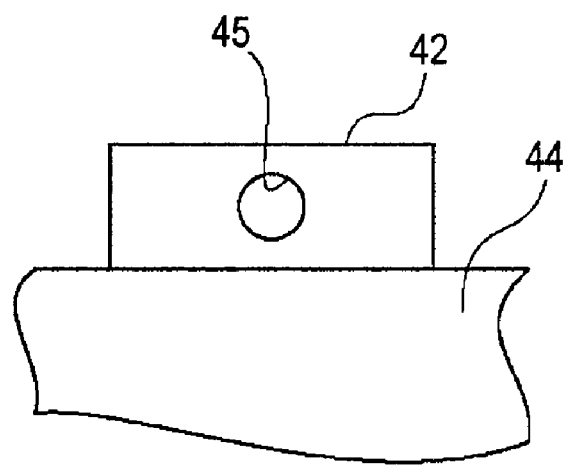

Comparative example 1 will be described below with reference to FIG. 48A and FIG. 48B.

A diffusion plate, a diffusion sheet, a lens sheet, and a diffusion sheet were prepared, while they were the same as those in Example 1 except that tabs 42 were disposed on the side of one long side. The diffusion plate, the diffusion sheet, the lens sheet, and the diffusion sheet were stacked in that order in such a way that the directions of the tabs 42 became the same and, thereby, an optical element stack was prepared. The reliability of the resulting optical element stack was evaluated as in Example 1. The results thereof are shown in Table 1. The optical element stack was mounted on the liquid crystal TV in such a way that pins 43 of a backlight chassis 41 were engaged with holes 45 of tabs 43, and the evaluation by mounting on TV was conducted as in Example 1. The results thereof are shown in Table 1.

Comparative Example 2

A diffusion plate, a diffusion sheet, a lens sheet, and a diffusion sheet were prepared as in Example 1. Individual optical elements were bonded to each other with a transparent acrylic adhesive so as to be integrated and, thereby, an optical element stack was obtained. The evaluation of reliability and the evaluation by mounting on TV were conducted as in Example 1 except that the resulting optical element stack was used. The results thereof are shown in Table 1.

(Evaluation Results)

The following are clear from Table 1.

Each sheet of Comparative example 1 was evaluated by mounting. As a result, the included sheet was thermally expanded because of the heat due to the light source in the backlight and changes in dimensions occurred so as to cause movement to relax. However, since the dimension was regulated by the tabs disposed outside the display area of the display device, it was observed that waviness occurred locally. Consequently, the evaluation of appearance was Grade 2.

In the case where the method in which the individual sheets were integrated by using the pressure sensitive adhesive so as to eliminate the insufficiency in rigidity was employed as in Comparative example 2 including no tab portion, the plate was very rigid just after the bonding. However, warping tends to occur when the temperature is increased by preservation of a single member after bonding. Warping occurs in a plate produced by bonding because of a bimetal effect due to thermal expansion and release of a residual stress of polyethylene terephthalate used for the base material of the diffusion sheet (heat shrinkage). In the actual mounting, a warp stress due to a bimetal occurred, and defects in image quality, e.g., partial peeling, occurred (image quality Grade 1).

Regarding the optical characteristics, the on-axis luminance was reduced by 18% because of bonding as compared with that in Comparative example 1. It is believed that relative to the plate produced by bonding, upper surfaces of the lens sheet and the diffusion sheet were not embedded with the pressure sensitive adhesive, the incident light became easy to transmit because the light incident side of the lens sheet was joined, the light collection effect became easy to reduce, so as to cause reduction of the on-axis luminance.

On the other hand, in Example 1 in which optical elements were integrated without using the bonding method, the single member had excellent heat resistance and warping hardly occurred. Furthermore, influences of individual optical elements on the direction of light on the incident-transmission side were very little, and were similar to those in the simply stacked state, so that the interface reflection loss due to the transparent covering film was able to be reduced to 5% in terms of a luminance loss. In Comparative example 1, bending of the optical sheet, which was assumed to be caused by the tab, did not occur, and no luminance irregularity was observed in a broad view. In Example 1 in which the optical element covering member was used, an excellent result was obtained regarding the image quality of display.

Example 2

An example in which the function of the diffusion sheet disposed on the light transmission side in Example 1 was provided to a covering film on the light transmission side will be described below.

(Covering Film in Second Region (Transmission Side): Preparation of Covering Film for Diffusion)

A heat-shrinkable transparent covering film was obtained as in Example 1. An optical functional layer for diffusion was formed on the resulting covering film as described below so as to obtain a covering film in the second region. The raw material indicated by the following paint composition was formulated. Mixing was conducted with Disper for 3 hours so as to obtain a diffusion paint. The covering film was subjected to a bonding facilitation treatment with corona treatment, the prepared diffusion paint was applied by a gravure coating method, followed by smoothing. Thereafter, drying was conducted at a maximum dryer temperature of 70° C. In this manner, a diffusion function having a thickness of 6 μm was formed on the covering film.

Acrylic resin containing polymethylmethacrylate as a primary component: 100 parts by weight Acrylic beads (diameter 5 μm, spherical core): 30 parts by weight Methyl ethyl ketone solvent: 300 parts by weight (Evaluation of Heat Shrinkage Characteristics)

Heating of the thus obtained covering film having the diffusion function was conducted at 100° C. for 10 minutes, and the heat shrinkage characteristics were measured as in Example 1. The results thereof are as described below.

MD direction: 11%

TD direction: 13%

It is clear from these results that the film provided with the diffusion functional layer has the heat-shrinkability similarly to the film before being provided with the diffusion functional layer.

(First Region (Incident Side): Preparation of Covering Film)

A covering film was obtained in a manner similar to the above-described preparation of the covering film for diffusion except that the application of the diffusion paint was omitted. That is, the transparent covering film was subjected only to a drying treatment so as to obtain a covering film having the same heat history.

(Evaluation of Heat Shrinkage Characteristics)

Heating of the thus obtained covering film was conducted at 100° C. for 10 minutes, and the heat shrinkage characteristics were measured as in Example 1. The results thereof are as described below.

MD direction: 11%

TD direction: 12%

(Evaluation of Optical Characteristics of Diffusion Function)

The optical characteristics of the covering film having the above-described diffusion function were evaluated. Haze Meter HM-150 produced by MURAKAMI COLOR RESEARCH LABORATORY was used for the measurement (haze value: JIS-K-7136, total light transmittance: based on JIS-K-7316).

Haze value: 92%

Total light transmittance: 76%

(Preparation of Optical Element Covering Member)

A diffusion plate (500 mm×890 mm×2 mm) containing polycarbonate as a primary component was prepared as a support medium, and a commercially available diffusion sheet (BS-912 produced by KEIWA Incorporated: 205 μm×498 mm×888 mm) and a lens sheet (produced by Sony Corporation, polycarbonate resin, lens pitch 185 μm, hyperboloidal shape, size 450 μm×498 mm×888 mm) were prepared. The diffusion plate, the diffusion sheet, and the lens sheet were stacked in that order and were placed on a covering film having the same heat history as that of the covering film including the diffusion layer. The covering film provided with the diffusion functional layer was placed thereon. The periphery was joined by heat fusion and cutting was conducted by fusion in such a way that the total size became 540 mm×950 mm.

Corner cutting was conducted in such a way that four corner portions of the resulting covering film were opened. Heating was conducted in a blow dryer heated to 100° C. The covering film was allowed to shrink and cool so that the diffusion plate serving as a support medium was adhered to the diffusion sheet and the lens sheet serving as optical elements. In this manner, an optical element covering member having the diffusion functional layer on the outermost surface was obtained.

The evaluation of reliability of the optical element covering member obtained as described above was conducted as in Example 1. As a result, an occurrence of warping was not observed. Subsequently, the evaluation of image quality based on the mounting on TV was conducted as in Example 1. As a result, waviness due to bending did not occur, the luminance irregularity was good, and the luminance loss, which occurred in Example 1, was improved, so that the relative luminance increased by 4%. Furthermore, the decrease in the relative luminance was able to be reduced to −1% as compared with Comparative example 1 in which the covering film was not included.

Since the corner portions of the optical element covering member were opened, the optical element covering member in which a shrinkage angle did not occur was able to be produced because the production was conducted in the state in which no corner portion was included, whereas regarding the appearance of the optical element covering member, the shrinkage angle slightly remained at corner portions and slight distortion occurred because this corner came into contact during mounting in Example 1. Since an operation for exhausting the air becomes unnecessary, production can be conducted by a simple process. Moreover, in the actual mounting on the TV, it was favorable that there was no slack in the corner portion.

Example 3

An example will be described, wherein the function of lens sheet in Example 1 was provided to a covering film on the light transmission side so as to improve the bending of a lens having high directivity.

A covering film was obtained by changing the material for the covering film in Example 1 from the olefinic material to 50 μm of polyethylene naphthalate film and conducting sequential biaxial drawing under a heating state.

(Evaluation of Heat Shrinkage Characteristics)

Heating of the thus obtained covering film was conducted at 100° C. for 10 minutes, and the heat shrinkage characteristics were measured as in Example 1. The results thereof are as described below.

MD direction: 12%

TD direction: 12%

(Covering Film in Second Region (Transmission Side): Covering Film Provided with Prism Sheet Shape)

A pattern in which prism shapes having a vertex angle of 90° were arranged in a plane was formed by heat-transfer to the polyethylene naphthalate film before the above-described drawing operation. Thereafter, the above-described sequential biaxial drawing was conducted similarly so as to obtain a covering film provided with the prism shapes.

(First Region (Incident Side): Preparation of Covering Film)

The above-described heat shrinkable film provided with the prism shapes was used. As in Example 1, a diffusion plate and a diffusion sheet were sandwiched by the covering film provided with the prism shapes and a film not provided with the prism shapes, joining was conducted by fusion-bonding the end portions, and cutting was conducted by fusion.

Corner cutting was conducted in such a way that four corner portions of the resulting covering film were opened. Heating was conducted in a blow dryer heated to 120° C. The covering film was allowed to shrink and cool so that the diffusion plate serving as a support medium was adhered to the diffusion sheet and the lens sheet serving as optical elements. In this manner, an optical element covering member having the lens function on the light transmission side surface was obtained.

The evaluation of reliability of the optical element covering member obtained as described above was conducted as in Example 1. As a result, an occurrence of warping was not observed.

Subsequently, a commercially available diffusion sheet was put on the optical element covering member obtained as described above, and the evaluation by mounting on the TV was conducted as in Example 1. Luminance irregularity due to the optical sheet and due to bending was not observed, and very good image quality was obtained. It is believed that the directivity of the included lens was high and slight bending generated the luminance irregularity in Example 1 and Example 2. However, it is believed that the lens is disposed on the covering film, the mounting is conducted with tension and, thereby, the bending of the lens itself is eliminated.

Here, it is clear that the covering film is provided with the optical functional layer and, thereby, a decrease in luminance due to the interface loss is reduced and the bending can be improved because a tension can be lightly applied to the whole as compared with the technique according to the related art in which bending is reduced by increasing the thickness. Furthermore, it is clear that the thickness of a single optical film is specified to be about 30 to 50 μm and, thereby, light weight-low profile, material cost reduction effects can be expected as compared with the previously employed thickness of 450 μm.

Example 4

An example will be described, wherein a ultraviolet curable resin is applied to the surface on the light transmission side of the optical element covering member, and a shape is transferred to the ultraviolet curable resin.

The optical element covering member was obtained as in Example 1 except that only the diffusion plate and the diffusion sheet were covered with the covering film. A pattern of transparent polyolefin resin (ZEONOR resin produced by ZEON Corporation) in which 90° prism shapes were arranged on a plane was prepared. A UV resin (refractive index after curing 1.57) was applied to this surface. This was transferred to a surface subjected to a corona treatment on the light transmission side of the above-described optical element covering member. Thereafter, curing was conducted by UV irradiation, and the pattern was peeled off, so that an optical element covering member provided with the prism shapes was obtained. The other operations are the same as those in Example 3.

The evaluation of reliability of the optical element covering member obtained as described above was conducted as in Example 1. As a result, an occurrence of warping was not observed.

Subsequently, a commercially available diffusion sheet was put on the optical element covering member obtained as described above, and the evaluation by mounting on the TV was conducted as in Example 1. Luminance irregularity due to the optical sheet and due to bending was not observed, and very good image quality was obtained. It is also believed as in Example 3 that the lens is disposed on the covering film, the mounting is conducted with tension and, thereby, the bending of the lens itself is eliminated.

TABLE 1

| | | Covering member | | Single member heat stability | Evaluation by molding on TV | | |
|---|---|---|---|---|---|---|---|
| | | | | 70° C. × 100 h | Relative | Image | |
| | Configuration | Material | Functional layer | preservation warp (mm) | luminance (%) | quality evaluation | Remarks |
| Example 1 | [diffusion plate + diffusion sheet + lens sheet + diffusion sheet] | olefinic heat shrink film | — | 3 | 95 | 4 | |
| Comparative example 1 | diffusion plate + diffusion sheet + lens sheet + diffusion sheet | — | — | 3 | 100 | 2 | tab portion bending |
| Comparative example 2 | diffusion plate/ diffusion sheet/ lens sheet/ diffusion sheet | — | — | 87 | 82 | 1 | occurrence of peeling irregularity |
| Example 2 | [diffusion plate + diffusion sheet + lens sheet] diffusion function | olefinic heat shrink film | diffusion function | 4 | 99 | 5 | |

TABLE 1-continued

| | | Covering member | | Single member heat stability | Evaluation by molding on TV | | |
|---|---|---|---|---|---|---|---|
| | Configuration | Material | Functional layer | 70° C. × 100 h preservation warp (mm) | Relative luminance (%) | Image quality evaluation | Remarks |
| Example 3 | [diffusion plate + diffusion sheet] lens function + diffusion function | polyethylene anaphthalate | lens function (heat molding) | 2 | 105 | 5 | |
| Example 4 | [diffusion plate + diffusion sheet] lens function + diffusion function | olefinic heat shrink film | lens function (UV resin) | 4 | 102 | 5 | |

Example 5

An example will be described, wherein the number of CCFL to be used as a light source of a liquid crystal TV was reduced from 20 to 16, and an electric power applied to CCFL was increased.

Figure 49:
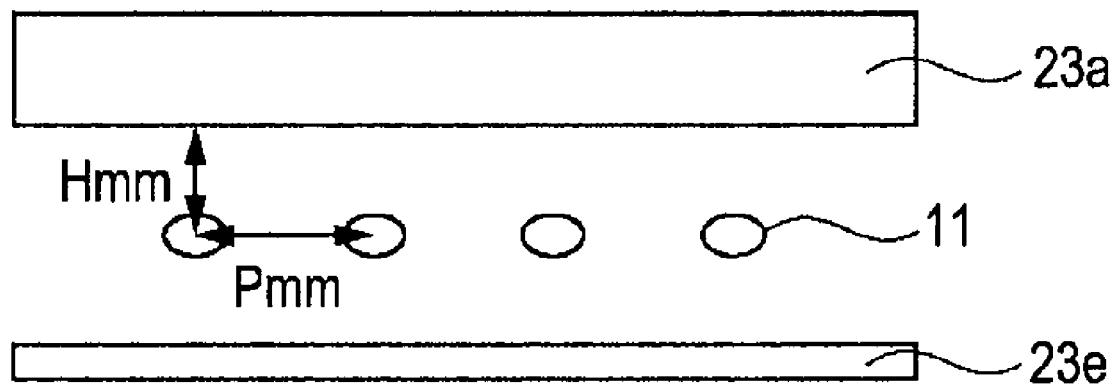
FIG. 49 is a schematic diagram showing the configuration of a backlight of Example 5.

In the present example, as shown in FIG. 49, the distance between an optical element covering member 2 and a light source 11 is defined as a distance H, and a pitch between the light sources 11 is defined as a pitch P.

A light control film was prepared by heat molding. In the light control film, a shape in which an arc-shaped portion having a radius of 200 μm and a width of 320 μm was protruded and 5 μm of flat region were periodically repeated in a plane. This film equalizes the amount of light source incident into the diffusion plate and has a thickness of 300 μm. An optical element covering member was obtained as in Example 2 except that the resulting light control film was disposed between the diffusion plate and a covering film in a first region (light source side).

(Evaluation of Reliability)

The evaluation of reliability of the optical element covering member obtained as described above was conducted as in Example 1. As a result, an occurrence of warping was not observed.

(Evaluation By Mounting on TV)

A 40-inch liquid crystal television produced by Sony Corporation was prepared. The number of CCFL of a backlight thereof was reduced from 20 to 16, and a pitch P between CCFL was increased so as to adjust the pitch P. Specifically, the pitch P of 23.7 mm (CCFL: 20) was increased to 29.3 mm (CCFL: 16). At this time, the distance H which was the distance between the diffusion plate and the center of the CCFL tube was 14.5 mm, and this was employed without changing except that the pitch was changed. The optical element covering member obtained as described above was mounted on this backlight and the evaluation by mounting on the TV was conducted as in Example 1. As a result, light source irregularity was not observed.

Comparative Example 3

An optical element stack was obtained by stacking a diffusion plate, a diffusion sheet, a lens sheet, and a diffusion sheet sequentially on a light control film. The evaluation of reliability and the evaluation by mounting on the TV were conducted as in Example 5 except that the resulting optical element stack was used. As a result, light source irregularity was observed.

Comparative Example 4

An optical element stack was prepared by stacking a diffusion plate, a diffusion sheet, a lens sheet, and a diffusion sheet sequentially on a light control film. The evaluation of reliability and the evaluation by mounting on the TV were conducted as in Example 5 except that the resulting optical element stack was used. As a result, light source irregularity was observed. The reason for this is believed that the light control film between the diffusion plate and the light source was not closely adhered by the covering film and the light control film deformed freely because of the heat.

Comparative Example 5

The evaluation of reliability and the evaluation by mounting on the TV were conducted as in Comparative example 3 except that the number of the diffusion sheets on the diffusion plate was increased from 1 to 2. As a result, the irregularity was not improved.

Comparative Example 6

The evaluation of reliability and the evaluation by mounting on the TV were conducted as in Comparative example 3 except that the number of the diffusion sheets on the diffusion plate was increased from 2 to 3. As a result, the irregularity was not improved.

(Evaluation Results)

In Comparative example 3, the light source irregularity was not eliminated. In Comparative examples 5 and 6 in which the diffusion sheet was added in order to reduce the light source irregularity, the light source irregularity was not improved. On the other hand, it is clear that the light source irregularity is improved in Example 5 in which the light control film disposed on the light source was included in the optical element covering member. However, the optical element covering member is necessary as a precondition. If it is used alone, as in Comparative example 4, deformation occurs by the heat energy generated from the light source, and as a result, the light source irregularity occurs. Consequently, it is clear that the optical elements which are usually disposed on the light transmission side of the diffusion plate can also be disposed between the diffusion plate and the light source and unprecedented optical functional layers can be additionally disposed between the diffusion plate and the light source.

TABLE 2

| | Configuration | covering member Material | Functional layer | Single member heat stability 70° C. × 100 h preservation warp (mm) | Evaluation by molding on TV | | Remarks |
|---|---|---|---|---|---|---|---|
| | | | | | Relative luminance (%) | Image quality evaluation | |
| Example 5 | [light control film + diffusion plate + diffusion sheet + lens sheet] diffusion function | olefinic heat shrink film | diffusion function | 3 | 96 | 5 | |
| Comparative example 3 | diffusion plate + diffusion sheet + lens sheet + diffusion sheet | — | — | 3 | 100 | 1 | tab portion bending light source irregularity |
| Comparative example 4 | light control film + diffusion plate + diffusion sheet + lens sheet + diffusion sheet | — | — | 3 | 97 | 1 | light source irregularity |
| Comparative example 5 | diffusion plate + 2 × diffusion sheet + lens sheet + diffusion sheet | — | — | 3 | 97 | 2 | tab portion bending light source irregularity |
| Comparative example 6 | diffusion plate + 3 × diffusion sheet + lens sheet + diffusion sheet | — | — | 3 | 96 | 2 | tab portion bending light source irregularity |

[ ]: Configuration in covering member (in that order from the light source side)
Examples 1 to 4, Comparative examples 1 and 2: CCFL 20 units 40 inches
Example 5, Comparative examples 3 to 6: CCFL 16 units 40 inches From the above-described results, it is clear that the following effects are obtained by using the optical element covering member.

(1) Bending due to thermal expansion previously generated by fixing with the tabs and the like is eliminated. The number of tabs has increased as the size has become larger because the size and the self weight have increased. This influence can be improved.

(2) The function of the optical element is provided to the covering film and, thereby, the luminance loss due to interface reflection of the covering film itself is reduced, and the thickness reduction and the weight reduction of the optical functional layer before substitution can be performed.

(3) Regarding the covering film provided with the optical functional layer, flattening is facilitated by a tension and an influence of bending and the like on the luminance irregularity can be improved.

(4) The optical elements which have been previously able to be disposed on only one surface of the diffusion plate serving as a support medium can be disposed on both surfaces of the diffusion plate. Therefore, a new optical design can be conducted. For example, direct light source control can be conducted by disposing the light control film and the like, and, for example, a design can be conducted in such a way that the number of light sources is reduced and the distance between the light source and the diffusion plate and the like can be reduced.

(5) In a method for manufacturing the optical element covering member, a design to open the corner portion is employed and, thereby, the shrinkage angle and the like can be restricted and even slight bending and the like can be eliminated.

Up to this point the embodiments according to the present invention have been specifically described. However, the present invention is not limited to the above-described embodiments, and various modification can be made on the basis of the technical concept of the present invention.

For example, the values described in the above embodiments are no more than examples, and values different from them may be employed, if necessary.

Each configuration of the above-described embodiments may be combined with each other within the bounds of the gist of the present invention.

In the above-described embodiments, a part of the optical elements or a part of the optical element and the support medium may be joined in such a way that the optical function is not impaired, and disposition at the end portion is preferable from the viewpoint of prevention of deterioration of the display function.

In the above-described embodiments, the optical element covering member may be further provided with a brightness-irregularity-reducing film. This brightness-irregularity-reducing film is disposed, for example, between the incident surface of the support medium and the covering member.

In the above-described embodiments, the explanation is based on the use of the film-shaped or sheet-shaped covering member as an example. However, a case or the like having the rigidity to some extent may be used as the covering member.

What is claimed is:
1. An optical element covering member comprising:
at least one optical element in shape of a film or a sheet;
a support medium for supporting the at least one optical element; and
a covering member for covering the at least one optical element and the support medium, the covering member having heat shrinkability,
wherein at least one optical element and the support medium constitute a stack, the stack has an incident surface into which the light from a light source enters, a transmission surface which transmits the light incident from the incident surface, and end surfaces located between the incident surface and the transmission surface, the covering member adheres to the stack and covers the incident surface, the transmission surface, and all the end surfaces, and the covering member has an opening portion and the opening portion is disposed at least at one of a corner portion and a side portion of the stack.

2. The optical element covering member according to claim 1, wherein at least one optical element is disposed between the covering member and the support medium.

3. The optical element covering member according to claim 2, wherein at least one optical element is disposed on the light source side.

4. The optical element covering member according to claim 2, wherein at least one optical element is disposed on the transmission side.

5. The optical element covering member according to claim 1, wherein end sides of the covering member are overlapped and joined to each other on the end surface in such a way as to follow the end surface.

6. The optical element covering member according to claim 1, wherein end portions of end sides of the covering member are joined to each other on an end surface in such a way as to follow the end surface.

7. The optical element covering member according to claim 1, wherein a size of the at least one optical element is smaller than the support medium.

8. The optical element covering member according to claim 1, wherein a groove or a hole is disposed in an end portion or in a vicinity of the end portion of the stack.

9. The optical element covering member according to claim 1, wherein material for the covering member is selected from a single or a mixed resin of polyolefin resins, polyester resins, vinyl bond resins, polycarbonate (PC) resins, cycloolefin resins, and vinyl chloride resins.

10. The optical element covering member according to claim 1, wherein the covering member comprises a phase difference.

11. The optical element covering member according to claim 1, wherein the support medium is a transparent plate or a diffusion plate.

12. The optical element covering member according to claim 1, wherein the covering member comprises:

an incident surface into which the light from the light source enters; and a transmission surface which transmits the light incident from the incident surface toward a liquid crystal panel, wherein the incident surface and the transmission surface have different optical functions.

13. The optical element covering member according to claim 1, wherein the covering member is joined to at least one of the optical element and the support medium.

14. The optical element covering member according to claim 12, wherein the optical function is disposed so as to correspond to a display area.

15. The optical element covering member according to claim 12, wherein at least one of the two surfaces of the incident surface and the transmission surface comprises the optical function.

16. A backlight comprising:

a light source for emitting light; and an optical element covering member for transmitting the light emitted from the light source, wherein the optical element covering member includes at least one optical element in a shape of a film or a sheet;

a support medium for supporting the at least one optical element; and a covering member for covering the at least one optical element and the support medium, the covering member having heat shrinkability, wherein at least one optical element and the support medium constitute a stack, the stack has an incident surface into which the light from the light source enters, a transmission surface which transmits the light incident from the incident surface, and end surfaces located between the incident surface and the transmission surface, the covering member adheres to the stack and covers the incident surface, the transmission surface, and all the end surfaces, and the covering member has an opening portion and the opening portion is disposed at least at one of a corner portion and a side portion of the stack.

17. The backlight according to claim 16, further comprising an optical element adjacent to an outside of the covering member and in a shape of a film or a sheet.

18. A liquid crystal display device comprising:

a light source for emitting light;

an optical element covering member for transmitting the light emitted from the light source; and a liquid crystal panel for displaying an image on the basis of the light transmitted through the optical element covering member, wherein the optical element covering member includes at least one optical element in a shape of a film or a sheet;

a support medium for supporting the at least one optical element; and a covering member for covering the at least one optical element and the support medium, the covering member having heat shrinkability, wherein at least one optical element and the support medium constitute a stack, the stack has an incident surface into which the light from the light source enters, a transmission surface which transmits the light incident from the incident surface, and end surfaces located between the incident surface and the transmission surface, the covering member adheres to the stack and covers the incident surface, the transmission surface, and all the end surfaces, and the covering member has an opening portion and the opening portion is disposed at least at one of a corner portion and a side portion of the stack.

19. The liquid crystal display device according to claim 18, wherein the light source is disposed just below the optical element covering member.

* * * * *